(12) United States Patent
De Wind et al.

(10) Patent No.: US 11,970,110 B2
(45) Date of Patent: Apr. 30, 2024

(54) FRAMELESS INTERIOR REARVIEW MIRROR ASSEMBLY

(71) Applicant: MAGNA MIRRORS OF AMERICA, INC., Holland, MI (US)

(72) Inventors: Darryl P. De Wind, West Olive, MI (US); Donald S. Rawlings, Caledonia, MI (US); John T. Uken, Jenison, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/456,572

(22) Filed: Aug. 28, 2023

(65) Prior Publication Data
US 2023/0398934 A1 Dec. 14, 2023

Related U.S. Application Data

(60) Continuation of application No. 18/167,923, filed on Feb. 13, 2023, now Pat. No. 11,738,686, which is a
(Continued)

(51) Int. Cl.
*B60R 1/04* (2006.01)
*B24B 9/02* (2006.01)
(Continued)

(52) U.S. Cl.
CPC .................. *B60R 1/04* (2013.01); *B24B 9/02* (2013.01); *B24B 9/08* (2013.01); *B24B 13/00* (2013.01);
(Continued)

(58) Field of Classification Search
CPC ....... G02B 5/04; G02F 1/163; G02F 1/13338; G02F 1/161; G02F 1/157; B60R 1/12; B60R 1/088; B60R 1/04; B60R 2001/1223
See application file for complete search history.

(56) References Cited

U.S. PATENT DOCUMENTS 1,949,138 A 2/1934 Bell
2,616,335 A 11/1952 Mazur
(Continued)

FOREIGN PATENT DOCUMENTS

DE 2254511 A1 5/1974
DE 2362191 A1 6/1975
(Continued)

OTHER PUBLICATIONS

International Search Report and Written Opinion dated Jun. 21, 2010 for corresponding PCT Application No. PCT/US2010/032017.
(Continued)

*Primary Examiner* — Jack Dinh
(74) *Attorney, Agent, or Firm* — HONIGMAN LLP

(57) ABSTRACT

A vehicular frameless interior rearview mirror assembly includes a mirror head and a mounting portion. The mirror head includes a mirror reflective element and a mirror casing. The mirror reflective element includes a glass substrate having a planar front side and a planar rear side. No portion of the mirror casing overlaps the planar front side of the glass substrate of the mirror reflective element. A camera is disposed within the mirror casing. With the mounting portion of the mirror assembly mounted at an in-cabin side of a windshield of a vehicle, the camera views a driver of the vehicle, and when the mirror head is moved by the driver of the vehicle to adjust the rearward view provided by the mirror reflective element to the driver, the camera moves in tandem with movement of the mirror head. The camera is part of a driver monitoring system of the vehicle.

22 Claims, 31 Drawing Sheets

Related U.S. Application Data continuation of application No. 17/662,446, filed on May 9, 2022, now Pat. No. 11,577,648, which is a continuation of application No. 15/929,570, filed on May 11, 2020, now Pat. No. 11,325,533, which is a continuation of application No. 16/186,962, filed on Nov. 12, 2018, now Pat. No. 10,647,258, which is a division of application No. 15/583,114, filed on May 1, 2017, now Pat. No. 10,124,732, which is a continuation of application No. 14/809,540, filed on Jul. 27, 2015, now Pat. No. 9,637,055, which is a continuation of application No. 14/572,020, filed on Dec. 16, 2014, now Pat. No. 9,090,212, which is a division of application No. 14/280,870, filed on May 19, 2014, now Pat. No. 8,922,867, which is a division of application No. 13/498,597, filed as application No. PCT/US2010/051741 on Oct. 7, 2010, now Pat. No. 8,730,553, said application No. 13/498,597 is a continuation-in-part of application No. 13/265,613, filed as application No. PCT/US2010/032017 on Apr. 22, 2010, now Pat. No. 8,508,831.

(60) Provisional application No. 61/261,839, filed on Nov. 17, 2009, provisional application No. 61/249,300, filed on Oct. 7, 2009, provisional application No. 61/187,112, filed on Jun. 15, 2009, provisional application No. 61/172,022, filed on Apr. 23, 2009.

(51) Int. Cl.

| | | |
|---|---|---|
| *B24B 9/08* | (2006.01) | |
| *B24B 13/00* | (2006.01) | |
| *B24B 49/00* | (2012.01) | |
| *B60R 1/08* | (2006.01) | |
| *B60R 1/12* | (2006.01) | |
| *C03C 17/06* | (2006.01) | |
| *G02B 5/04* | (2006.01) | |
| *G02B 7/182* | (2021.01) | |
| *G02F 1/1333* | (2006.01) | |
| *G02F 1/153* | (2006.01) | |
| *G02F 1/157* | (2006.01) | |
| *G02F 1/161* | (2006.01) | |
| *G02F 1/163* | (2006.01) | |
| *B24B 51/00* | (2006.01) | |
| *G02B 5/08* | (2006.01) | |

(52) U.S. Cl.
CPC ............. *B24B 49/00* (2013.01); *B60R 1/086* (2013.01); *B60R 1/088* (2013.01); *B60R 1/12* (2013.01); *C03C 17/06* (2013.01); *G02B 5/04* (2013.01); *G02B 7/182* (2013.01); *G02F 1/13338* (2013.01); *G02F 1/153* (2013.01); *G02F 1/157* (2013.01); *G02F 1/161* (2013.01); *G02F 1/163* (2013.01); *B24B 51/00* (2013.01); *B60R 1/1207* (2013.01); *B60R 2001/1223* (2013.01); *C03C 2217/25* (2013.01); *C03C 2218/31* (2013.01); *G02B 5/08* (2013.01)

(56) References Cited

U.S. PATENT DOCUMENTS

| | | |
|---|---|---|
| 2,962,933 A | 12/1960 | Hezler, Jr. |
| 3,280,701 A | 10/1966 | Donnelly et al. |
| 3,837,129 A | 9/1974 | Losell |
| 4,435,042 A | 3/1984 | Wood et al. |
| 4,436,371 A | 3/1984 | Wood et al. |
| 4,530,571 A | 7/1985 | Connor |
| 4,712,879 A | 12/1987 | Lynam et al. |
| 4,826,289 A | 5/1989 | Vandenbrink et al. |
| 4,902,108 A | 2/1990 | Byker |
| 4,948,242 A | 8/1990 | Desmond et al. |
| 5,052,163 A | 10/1991 | Czekala |
| 5,066,112 A | 11/1991 | Lynam et al. |
| 5,069,535 A | 12/1991 | Baucke et al. |
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,158,638 A | 10/1992 | Osanami et al. |
| 5,179,471 A | 1/1993 | Caskey et al. |
| 5,253,109 A | 10/1993 | O'Farrell et al. |
| 5,327,288 A | 7/1994 | Wellington et al. |
| 5,379,146 A | 1/1995 | Defendini |
| 5,421,940 A | 6/1995 | Cornils et al. |
| 5,448,397 A | 9/1995 | Tonar |
| 5,525,264 A | 6/1996 | Cronin et al. |
| 5,530,240 A | 6/1996 | Larson et al. |
| 5,550,677 A | 8/1996 | Schofield et al. |
| 5,552,094 A | 9/1996 | Kubota |
| 5,555,136 A | 9/1996 | Waldmann et al. |
| 5,575,552 A | 11/1996 | Faloon et al. |
| 5,582,383 A | 12/1996 | Mertens et al. |
| 5,610,756 A | 3/1997 | Lynam et al. |
| 5,649,756 A | 7/1997 | Adams et al. |
| 5,668,663 A | 9/1997 | Varaprasad et al. |
| 5,669,698 A | 9/1997 | Veldman et al. |
| 5,671,996 A | 9/1997 | Bos et al. |
| 5,680,263 A | 10/1997 | Zimmermann et al. |
| 5,724,187 A | 3/1998 | Varaprasad et al. |
| 5,790,298 A | 8/1998 | Tonar |
| 5,796,094 A | 8/1998 | Schofield et al. |
| 5,808,778 A | 9/1998 | Bauer et al. |
| 5,818,625 A | 10/1998 | Forgette et al. |
| 5,877,897 A | 3/1999 | Schofield et al. |
| 5,910,854 A | 6/1999 | Varaprasad et al. |
| 5,923,457 A | 7/1999 | Byker et al. |
| 5,984,482 A | 11/1999 | Rumsey et al. |
| 6,002,511 A | 12/1999 | Varaprasad et al. |
| 6,064,508 A | 5/2000 | Forgette et al. |
| 6,068,380 A | 5/2000 | Lynn et al. |
| 6,102,546 A | 8/2000 | Carter |
| 6,111,683 A | 8/2000 | Cammenga et al. |
| 6,124,886 A | 9/2000 | DeLine et al. |
| 6,154,306 A | 11/2000 | Varaprasad et al. |
| 6,170,956 B1 | 1/2001 | Rumsey et al. |
| 6,178,034 B1 | 1/2001 | Allemand et al. |
| 6,193,379 B1 | 2/2001 | Tonar et al. |
| 6,195,194 B1 | 2/2001 | Roberts et al. |
| 6,227,675 B1 | 5/2001 | Mertens et al. |
| 6,239,899 B1 | 5/2001 | DeVries et al. |
| 6,249,369 B1 | 6/2001 | Theiste et al. |
| 6,315,421 B1 | 11/2001 | Apfelbeck et al. |
| 6,317,248 B1 | 11/2001 | Agrawal et al. |
| 6,318,870 B1 | 11/2001 | Spooner et al. |
| 6,329,925 B1 | 12/2001 | Skiver et al. |
| 6,331,066 B1 | 12/2001 | Desmond et al. |
| 6,369,804 B1 | 4/2002 | Sandbach |
| 6,396,397 B1 | 5/2002 | Bos et al. |
| 6,407,468 B1 | 6/2002 | LeVesque et al. |
| 6,407,847 B1 | 6/2002 | Poll et al. |
| 6,439,755 B1 | 8/2002 | Fant, Jr. et al. |
| 6,452,479 B1 | 9/2002 | Sandbach |
| 6,499,850 B2 | 12/2002 | Waldmann |
| 6,502,970 B1 | 1/2003 | Anderson et al. |
| 6,535,126 B2 | 3/2003 | Lin et al. |
| 6,598,980 B2 | 7/2003 | Marusawa et al. |
| 6,606,183 B2 | 8/2003 | Ikai et al. |
| 6,614,579 B2 | 9/2003 | Roberts et al. |
| 6,619,955 B2 | 9/2003 | Cardarelli |
| 6,650,457 B2 | 11/2003 | Busscher et al. |
| 6,690,268 B2 | 2/2004 | Schofield et al. |
| D493,131 S | 7/2004 | Lawlor et al. |
| D493,394 S | 7/2004 | Lawlor et al. |

(56) References Cited

U.S. PATENT DOCUMENTS

| | | |
|---|---|---|
| 6,774,810 B2 | 8/2004 | DeLine et al. |
| 6,781,738 B2 | 8/2004 | Kikuchi et al. |
| 6,870,656 B2 | 3/2005 | Tonar et al. |
| 7,004,593 B2 | 2/2006 | Weller et al. |
| 7,012,729 B2 | 3/2006 | Tonazzi et al. |
| 7,042,616 B2 | 5/2006 | Tonar et al. |
| 7,064,882 B2 | 6/2006 | Tonar et al. |
| 7,093,965 B2 | 8/2006 | Veldman |
| 7,110,156 B2 | 9/2006 | Lawlor et al. |
| 7,184,190 B2 | 2/2007 | McCabe et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,287,868 B2 | 10/2007 | Carter et al. |
| 7,289,037 B2 | 10/2007 | Uken et al. |
| 7,324,261 B2 | 1/2008 | Tonar et al. |
| 7,338,177 B2 | 3/2008 | Lynam |
| 7,360,932 B2 | 4/2008 | Uken et al. |
| 7,370,983 B2 | 5/2008 | DeWind et al. |
| 7,372,611 B2 | 5/2008 | Tonar et al. |
| 7,420,756 B2 | 9/2008 | Lynam |
| 7,510,311 B2 | 3/2009 | Romas et al. |
| 7,526,367 B2 | 4/2009 | Schofield et al. |
| 7,532,149 B2 | 5/2009 | Banko et al. |
| 7,542,193 B2 | 6/2009 | McCabe et al. |
| 7,570,413 B2 | 8/2009 | Tonar et al. |
| 7,599,108 B2 | 10/2009 | Lawlor et al. |
| 7,602,542 B2 | 10/2009 | Tonar et al. |
| 7,612,929 B2 | 11/2009 | Tonar et al. |
| 7,626,749 B2 | 12/2009 | Baur et al. |
| 7,706,046 B2 | 4/2010 | Bauer et al. |
| 7,710,631 B2 | 5/2010 | McCabe et al. |
| 7,719,750 B2 | 5/2010 | Tonar et al. |
| 7,817,020 B2 | 10/2010 | Turnbull et al. |
| 7,821,697 B2 | 10/2010 | Varaprasad et al. |
| 7,826,123 B2 | 11/2010 | McCabe et al. |
| 7,855,755 B2 | 12/2010 | Weller et al. |
| 7,864,399 B2 | 1/2011 | McCabe et al. |
| D633,019 S | 2/2011 | De Wind |
| D633,423 S | 3/2011 | De Wind |
| 7,926,960 B2 | 4/2011 | Skiver et al. |
| 7,937,667 B2 | 5/2011 | Kramer et al. |
| 7,978,094 B2 | 7/2011 | Uken et al. |
| 7,980,711 B2 | 7/2011 | Takayanagi et al. |
| 8,004,741 B2 | 8/2011 | Tonar et al. |
| 8,018,440 B2 | 9/2011 | Townsend et al. |
| D647,017 S | 10/2011 | De Wind |
| 8,047,667 B2 | 11/2011 | Weller et al. |
| 8,048,085 B2 | 11/2011 | Peterson et al. |
| 8,049,640 B2 | 11/2011 | Uken et al. |
| 8,050,551 B2 | 11/2011 | Peterson et al. |
| 8,154,418 B2 | 4/2012 | Peterson et al. |
| D660,208 S | 5/2012 | De Wind |
| 8,169,684 B2 | 5/2012 | Bugno et al. |
| 8,179,586 B2 | 5/2012 | Schofield et al. |
| D661,234 S | 6/2012 | De Wind |
| 8,194,133 B2 | 6/2012 | DeWind et al. |
| 8,237,909 B2 | 8/2012 | Ostreko et al. |
| 8,277,059 B2 | 10/2012 | McCabe et al. |
| 8,339,526 B2 | 12/2012 | Minikey, Jr. et al. |
| 8,465,161 B2 | 6/2013 | DeWind et al. |
| 8,508,831 B2 | 8/2013 | De Wind et al. |
| 8,922,867 B2 | 12/2014 | De Wind et al. |
| 9,090,212 B2 | 7/2015 | De Wind et al. |
| 9,637,055 B2 | 5/2017 | De Wind et al. |
| 10,124,732 B2 | 11/2018 | De Wind et al. |
| 10,647,258 B2 | 5/2020 | De Wind et al. |
| 11,325,533 B2 | 5/2022 | De Wind et al. |
| 11,577,648 B2 | 2/2023 | De Wind et al. |
| 11,738,686 B2 | 8/2023 | De Wind et al. |
| 2002/0057494 A1 | 5/2002 | Lang |
| 2003/0007261 A1 | 1/2003 | Hutzel et al. |
| 2005/0195488 A1 | 9/2005 | McCabe et al. |
| 2005/0281043 A1 | 12/2005 | Eisenbraun |
| 2006/0050018 A1 | 3/2006 | Hutzel et al. |
| 2006/0061008 A1 | 3/2006 | Karner et al. |
| 2006/0164230 A1 | 7/2006 | DeWind et al. |
| 2007/0081350 A1 | 4/2007 | Huang |
| 2007/0139751 A1 | 6/2007 | Kuiper et al. |
| 2008/0042938 A1 | 2/2008 | Cok |
| 2008/0087797 A1 | 4/2008 | Turnbull et al. |
| 2009/0213480 A1 | 8/2009 | Li |
| 2009/0237820 A1 | 9/2009 | McCabe et al. |
| 2009/0237821 A1 | 9/2009 | Li |
| 2009/0243824 A1 | 10/2009 | Peterson et al. |
| 2009/0251785 A1 | 10/2009 | Bruhnke et al. |
| 2009/0251913 A1 | 10/2009 | Bruhnke et al. |
| 2010/0290141 A1 | 11/2010 | Huang |
| 2010/0321758 A1 | 12/2010 | Bugno et al. |
| 2011/0176323 A1 | 7/2011 | Skiver et al. |
| 2011/0317242 A1 | 12/2011 | Tonar et al. |
| 2012/0026571 A1 | 2/2012 | Uken et al. |
| 2012/0038964 A1 | 2/2012 | De Wind et al. |
| 2012/0236388 A1 | 9/2012 | De Wind et al. |

FOREIGN PATENT DOCUMENTS

| | | |
|---|---|---|
| DE | 3049169 A1 | 7/1982 |
| EP | 0744321 A2 | 11/1996 |
| EP | 1103420 A2 | 5/2001 |
| EP | 1345071 A1 | 9/2003 |
| EP | 2106970 A1 | 10/2009 |
| FR | 1525709 A | 5/1968 |
| WO | 2001001192 A1 | 1/2001 |
| WO | 2003004245 A1 | 1/2003 |
| WO | 2004026633 A2 | 4/2004 |
| WO | 2004031840 A2 | 4/2004 |
| WO | 2004042457 A2 | 5/2004 |
| WO | 2005096069 A1 | 10/2005 |
| WO | 2008013499 A1 | 1/2008 |
| WO | 2010124064 A1 | 10/2010 |
| WO | 2011044312 A1 | 4/2011 |
| WO | 2012051500 A1 | 4/2012 |
| WO | 2013071070 A1 | 5/2013 |

OTHER PUBLICATIONS

International Search Report and Written Opinion dated Nov. 26, 2010 for corresponding PCT Application No. PCT/US2010/051741.
International Search Report and Written Opinion dated Feb. 8, 2012 for corresponding PCT Application No. PCT/US2011/056295.
International Search Report and Written Opinion dated Mar. 19, 2013 for corresponding PCT Application No. PCT/US2012/064398.
European Search Report dated Feb. 12, 2013 from EP Application No. 10822656.4.
Chinese Office Action dated Apr. 18, 2013 from CN Application No. 201080028490.6.

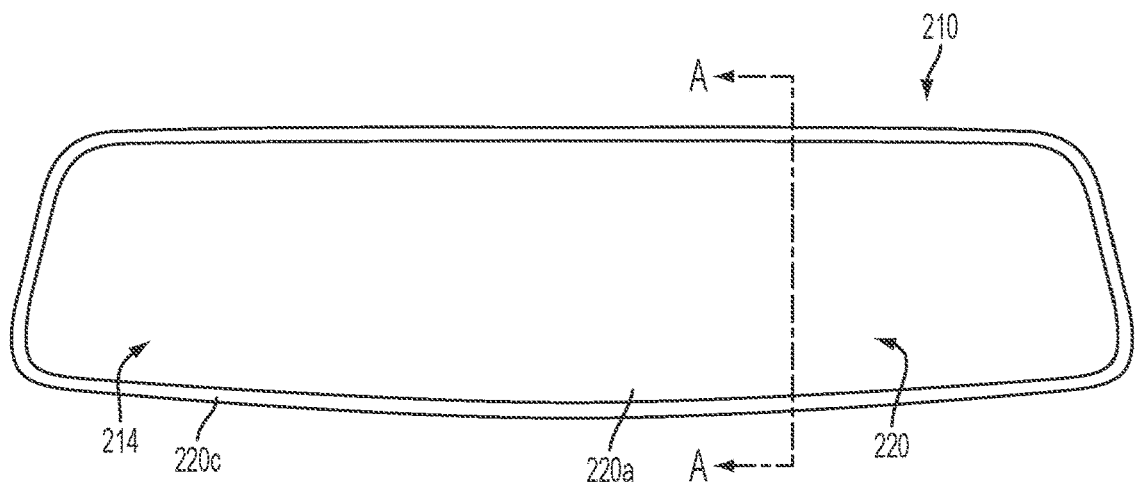
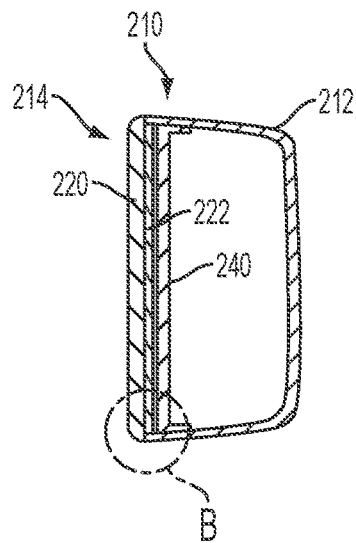
FIG. 7A
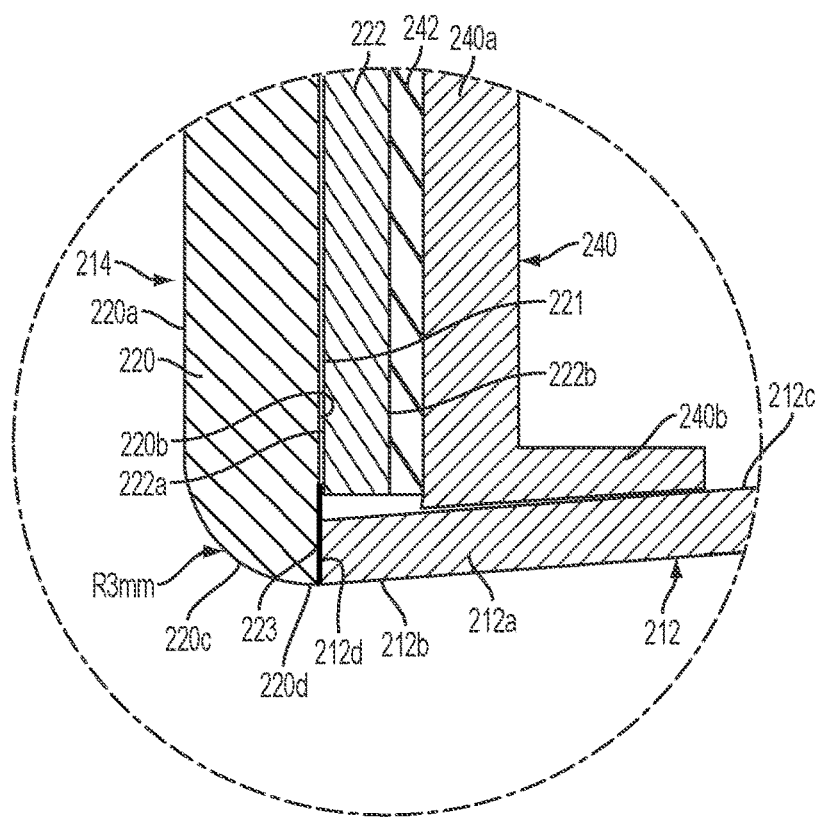
FIG. 7B

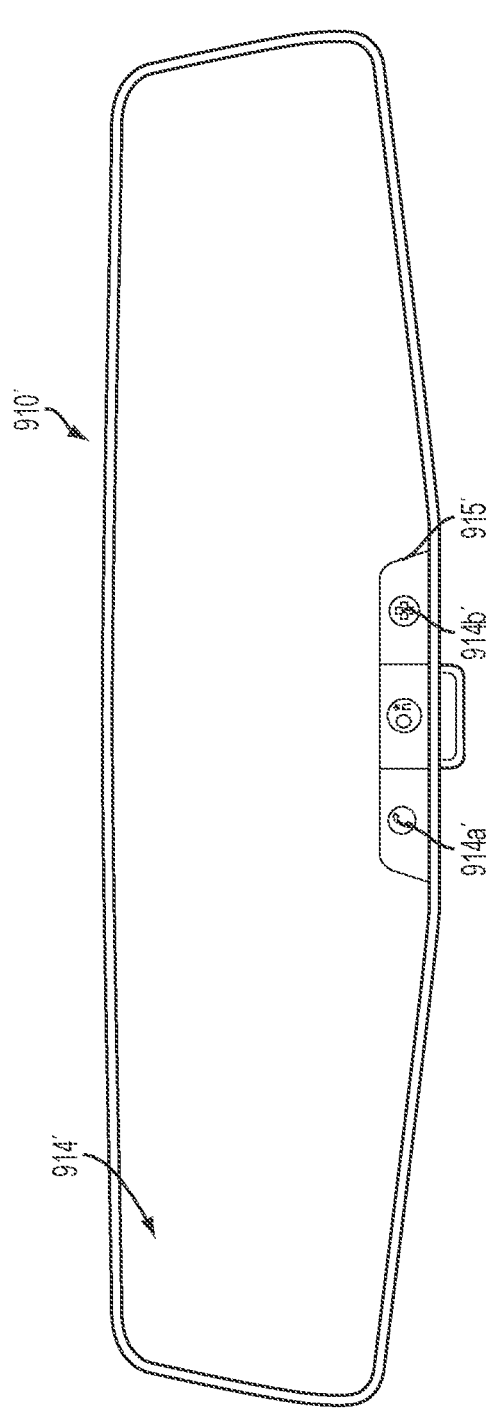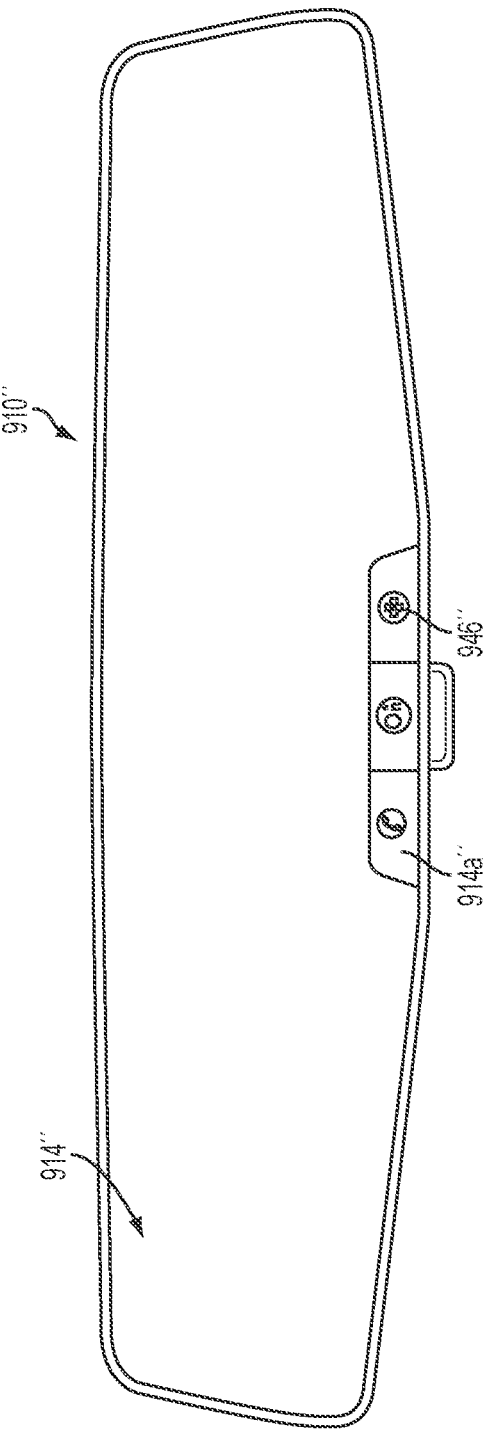

FRAMELESS INTERIOR REARVIEW MIRROR ASSEMBLY

CROSS REFERENCE TO RELATED APPLICATIONS

The present application is a continuation of U.S. patent application Ser. No. 18/167,923, filed Feb. 13, 2023, now U.S. Pat. No. 11,738,686, which is a continuation of U.S. patent application Ser. No. 17/662,446, filed May 9, 2022, now U.S. Pat. No. 11,577,648, which is a continuation of U.S. patent application Ser. No. 15/929,570, filed May 11, 2020, now U.S. Pat. No. 11,325,533, which is a continuation of U.S. patent application Ser. No. 16/186,962, filed Nov. 12, 2018, now U.S. Pat. No. 10,647,258, which is a division of U.S. patent application Ser. No. 15/583,114, filed May 1, 2017, now U.S. Pat. No. 10,124,732, which is a continuation of U.S. patent application Ser. No. 14/809,540, filed Jul. 27, 2015, now U.S. Pat. No. 9,637,055, which is a continuation of U.S. patent application Ser. No. 14/572,020, filed Dec. 16, 2014, now U.S. Pat. No. 9,090,212, which is a division of U.S. patent application Ser. No. 14/280,870, filed May 19, 2014, now U.S. Pat. No. 8,922,867, which is a division of U.S. patent application Ser. No. 13/498,597, filed May 30, 2012, now U.S. Pat. No. 8,730,553, which is a 371 national phase application of PCT Application No. PCT/US2010/051741, filed Oct. 7, 2010, which claims the benefit of U.S. provisional applications, Ser. No. 61/261,839, filed Nov. 17, 2009, and Ser. No. 61/249,300, filed Oct. 7, 2009, which are hereby incorporated herein by reference in their entireties. U.S. patent application Ser. No. 13/498,597 is also a continuation-in-part of U.S. patent application Ser. No. 13/265,613, filed Oct. 21, 2011, which is a 371 national phase application of PCT Application No. PCT/US2010/032017, filed Apr. 22, 2010, which claims the benefit of U.S. provisional applications, Ser. No. 61/187,112, filed Jun. 15, 2009, and Ser. No. 61/172,022, filed Apr. 23, 2009.

FIELD OF THE INVENTION

The present invention relates generally to the field of rearview mirror assemblies for vehicles and, more particularly, to an interior rearview mirror assembly that is adjustably mounted to an interior portion of a vehicle.

BACKGROUND OF THE INVENTION

Typically, an automatically dimming electro-optic interior rearview mirror assembly, such as an electrochromic interior rearview mirror assembly or the like, includes a mirror reflective element that is at least partially received in a casing, sometimes with a bezel portion of the casing snapped to or integral with the rest of the casing/housing so that the bezel portion of the casing overlaps or encompasses a perimeter edge of the reflective element and overlaps on/encroaches onto a portion or perimeter region of an outer or front surface of the reflective element (the surface facing the driver of the vehicle when the mirror assembly is normally mounted in the vehicle). The reflective element is adjustable by the driver to adjust the rearward field of view provided by the mirror reflective element.

SUMMARY OF THE INVENTION

The present invention provides an interior rearview mirror assembly that includes a casing and an electro-optic reflective element (such as an electrochromic reflective element) attached to or adhered to a surface or portion of the casing or bezel, with no bezel portion overlapping or encompassing a perimeter edge or front surface of the reflective element.

According to an aspect of the present invention, an interior rearview mirror assembly for a vehicle includes a mirror holder/casing/housing/shroud/cap and an interior rearview mirror reflective element. The reflective element comprises a glass substrate having a front surface and a rear surface. The reflective element comprises a mirror reflector established at a surface of the mirror reflective element other than the front surface of the glass substrate (and forming or establishing a mirror reflecting surface of the reflective element). The front surface of the glass substrate generally faces the driver of the vehicle when the interior rearview mirror assembly is normally mounted in the vehicle. The mirror holder/casing/housing/shroud/cap at least partially receives/accommodates the mirror reflective element therein and the mirror holder/casing/housing/shroud/cap comprises an element that protrudes beyond the rear surface of the glass substrate and towards the front surface of said glass substrate in order to enclose the reflecting surface of the reflective element in the mirror holder/casing/housing/shroud/cap when the mirror reflective element is at least partially received in the mirror holder. The glass substrate has a slanted rear perimeter edge-portion (formed such as by grinding or ablation) along the perimeter circumference of the rear surface of the glass substrate to accommodate the element of the mirror holder/casing/housing/shroud/cap and the glass substrate has a beveled front perimeter along the perimeter circumference of the front surface of the glass substrate. The beveled circumferential front perimeter is exposed to, is contactable by, and is viewable by, the driver of the vehicle when the interior rearview mirror assembly is normally mounted in the vehicle.

The mirror holder encloses the mirror reflector and the reflecting surface of the mirror reflective element when the mirror reflective element is at least partially received in the mirror holder/casing/housing/shroud/cap. Optionally, the circumferential beveled outboard or front perimeter of the glass substrate may have a radius of curvature of at least about 2.5 mm other than at the generally planar (flat) surface that constitutes the rest of the first or front surface of the glass substrate. Optionally, the beveled outboard or front perimeter of the glass substrate provides a convex-curved transition between the generally planar or flat front surface of the glass substrate and a side wall of the mirror holder/casing/housing/shroud/cap. Optionally, the formed or slanted rear or inboard perimeter edge-portion of the glass substrate is formed or slanted or angled or curved or chamfered to correspond to a formed or slanted or angled or curved or chamfered element established at the mirror holder/casing/housing/shroud/cap.

Optionally, the mirror reflective element may comprise a prismatic mirror reflective element and the reflecting surface of the mirror reflective element comprises the rear surface of the glass substrate. Optionally, the mirror reflective element may comprise an electro-optic reflective element and the glass substrate comprises the front substrate of the electro-optic reflective element and the reflecting surface comprises a surface of a rear substrate of the electro-optic reflective element.

According to another aspect of the present invention, an interior rearview mirror assembly for a vehicle comprises a casing and an electro-optic reflective element. The reflective element comprises a front substrate having a front or first surface (the surface that generally faces the driver of the vehicle when the mirror assembly is normally mounted in the vehicle) and a rear or second surface opposite the front surface, and a rear substrate having a front or third surface and a rear or fourth surface, with an electro-optic medium (such as an electrochromic medium) disposed between the second or rear surface of the front substrate and the third or front surface of the rear substrate and bounded by a perimeter seal. The second surface has a transparent electrically conductive coating established thereat. The front substrate has a substantially opaque perimeter band circumferentially established around and disposed at its periphery border region (such as along a perimeter region of the second surface of the front substrate) to hide or conceal the perimeter seal of the reflective element. The third surface of the rear substrate (i.e., the surface that opposes the second surface of the front substrate and with the electro-optic medium disposed therebetween) may have a reflective mirror reflector coated or established thereat. The rear or fourth surface of the reflective element is attached, such as adhered, to a mounting plate or attachment plate or the like (that may include a pivot connection for attaching to a mounting structure for mounting the mirror assembly at an interior portion of the vehicle), or to a mounting surface or portion of the casing or bezel (where the casing may include a pivot connection for attaching to a mounting structure for mounting the mirror assembly at an interior portion of the vehicle) or the like. When the reflective element is attached at the casing or bezel, the bezel encompasses the perimeter edge of the front substrate of the reflective element, but does extend over or encompass the perimeter region of the front surface of the reflective element.

Optionally, a perimeter portion of the rear substrate may be cutaway and/or the front substrate may overhang or extend beyond a corresponding perimeter portion of the rear substrate, and one or more capacitive switches or sensors may be established at the cutaway or overhang region. The transparent electrically conductive coating at the second surface may be laser etched or otherwise etched or scribed or locally removed to provide a switch portion at the overhang region that is electrically isolated from the rest of the transparent electrically conductive coating at the second surface of the front substrate. An electrical lead or wiring or trace may be electrically connected between circuitry within the mirror assembly and the electrically isolated transparent electrically conductive coating at the overhang region to detect the presence or touch of a person's finger at the switch region or overhang region.

These and other objects, advantages, purposes and features of the present invention will become apparent upon review of the following specification in conjunction with the drawings.

BRIEF DESCRIPTION OF THE DRAWINGS

FIG. 7 is a front elevation of an electrochromic interior rearview mirror assembly of the present invention;

FIG. 7A is a sectional view of the electrochromic interior rearview mirror assembly, taken along the line A-A in FIG. 7;

FIG. 7B is an enlarged view of the area B in FIG. 7A;

FIG. 18 is a front elevation of another interior rearview mirror assembly of the present invention;

FIG. 19 is a front elevation of another interior rearview mirror assembly of the present invention.

DESCRIPTION OF THE PREFERRED EMBODIMENTS

Figure 4:
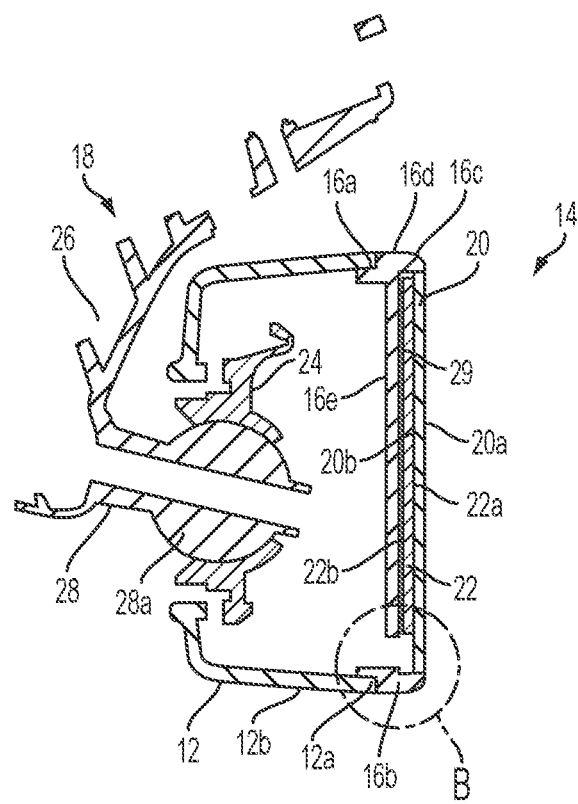
FIG. 4 is a sectional view of the interior rearview mirror assembly taken along the line A-A in FIG. 1.

Referring now to the drawings and the illustrative embodiments depicted therein, an interior rearview mirror assembly 10 for a vehicle includes a mirror casing or housing or shroud or cap or holder 12, a reflective element 14 positioned at a front portion of the mirror casing 12 and a bezel or front casing portion 16 disposed around a periphery of the reflective element. Mirror assembly 10 is adjustably mounted to an interior portion of a vehicle (such as to an interior surface of a vehicle windshield or a headliner of a vehicle or the like) via a mounting structure or mounting configuration or assembly 18. The bezel portion 16 receives the reflective element therein and encompasses the perimeter edges of the reflective element 14 and attaches to the non-bezel portion of the mirror casing 12, such as via snapping or otherwise attaching to a forward perimeter edge region 12a of mirror casing 12. As can be seen in FIG. 4, the bezel portion 16 does not overlap or encompass the perimeter regions of the front surface of the reflective element 14, so as to provide flush or generally coplanar surfaces across the front of the bezel portion and the front surface of the reflective element, as discussed below.

Reflective element 14 may comprise an electro-optic (such as electrochromic) reflective element or may comprise a prismatic or wedge-shaped reflective element. Reflective element 14 includes a front substrate 20 having a front or first surface 20a (the surface that generally faces the driver of a vehicle when the mirror assembly is normally mounted in the vehicle) and a rear or second surface 20b opposite the front surface 20a, and a rear substrate 22 having a front or third surface 22a and a rear or fourth surface 22b opposite the front surface 22a, with an electro-optic medium disposed between the second surface 20b and the third surface 22a and bounded by a perimeter seal of the reflective element (such as is known in the electrochromic mirror art). The second surface 20a has a transparent conductive coating established thereat, while the third surface 22a has a conductive coating (such as a metallic reflector coating for a third surface reflector mirror element or such as a transparent conductive coating for a fourth surface reflector mirror element) established thereat.

Reflective element 14 includes an opaque or substantially opaque or hiding perimeter layer or coating or band 23 (FIG. 1) disposed around a perimeter edge region of the front substrate 20 (such as at a perimeter region of the rear or second surface 20b of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or PCT Application No. PCT/US2010/032017, filed Apr. 22, 2010, and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

The reflective element 14 and mirror casing 12 are adjustable relative to the mounting arm or pivot assembly 18 to adjust the driver's rearward field of view when the mirror assembly is normally mounted at or in the vehicle. The mirror assembly includes a socket or pivot mount 24 that may receive a ball member of a mounting arm of the pivot assembly or mounting structure 18, such as a double pivot or double ball mounting structure or a single pivot or single ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628, filed Sep. 14, 2005 and published Mar. 23, 2006 as U.S. Pat. Pub. No. US-2006-0061008, and/or PCT Application No. PCT/US2010/028130, filed Mar. 22, 2010, which are hereby incorporated herein by reference in their entireties). The mounting assembly may have a ball or socket element mounted to or attached to or established at a mirror attachment plate or backing plate (which may optionally include or incorporate circuitry thereat or thereon) that is attached at the rear surface of the mirror reflective element (optionally with a mirror casing disposed over or receiving the attachment plate or with a cap portion of a mirror assembly attaching to the backing plate or the like, such as by utilizing aspects of the mirror assemblies described in U.S. Pat. No. 7,289,037, which is hereby incorporated herein by reference in its entirety), or the mounting assembly may have a ball or socket element mounted to or attached to or established at a portion of the mirror casing (or to an attachment element disposed at or in the mirror casing), where the ball or socket or pivot joint element pivotally attaches to a mounting arm or mounting structure that attaches to an interior portion of the vehicle, such as an inner surface of the vehicle windshield or the like.

In the illustrated embodiment, mounting assembly 18 comprises a single-ball or single-pivot mounting assembly whereby the reflective element and casing are adjustable relative to the vehicle windshield (or other interior portion of the vehicle) about a single pivot joint. Mounting assembly 18 includes a base portion or mounting base 26 and a mounting arm 28, with the reflective element 14 and mirror casing 12 pivotally mounted at ball end 28a of mounting arm 28 about a mirror ball pivot joint (such as a ball and socket joint or the like that allows for a driver of the vehicle to which mirror assembly 10 is mounted to adjust the reflective element to adjust the rearward field of view of the driver). Optionally, the mounting assembly may comprise other types of mounting configurations, such as a double-ball or double-pivot mounting configuration or the like, while remaining within the spirit and scope of the present invention.

In the illustrated embodiment, mounting base 26 is attached to an interior surface of a vehicle windshield (such as to a mounting button or attachment element adhered to the interior surface of the vehicle windshield). The mounting base may be mounted to a mounting button or attachment element at the vehicle windshield via a breakaway mounting construction, such as by utilizing aspects of the mounting constructions described in U.S. Pat. Nos. 5,820,097 and/or 5,100,095, which are hereby incorporated herein by reference in their entireties. Mounting arm 28 may comprise a molded (such as injection molded) polymeric mounting arm or may be otherwise formed, depending on the particular application of the mirror assembly (and may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628, filed Sep. 14, 2005 and published Mar. 23, 2006 as U.S. Pat. Pub. No. US-2006-0061008, and/or PCT Application No. PCT/US2010/028130, filed Mar. 22, 2010, which are hereby incorporated herein by reference in their entireties).

Mirror casing 12 comprises a plastic or polymeric molded casing that may attach to the pivot socket 24 via any suitable manner. The casing may comprise any suitable casing construction, and has a forward perimeter edge or attachment portion 12a for attaching to the bezel portion 16, as discussed below. Optionally, the mirror casing may have at least one generally planar front attachment surface or panel or wall for attaching to the reflective element, such as by utilizing aspects of the mirror assemblies described in PCT Application No. PCT/US2010/032017, filed Apr. 22, 2010, which is hereby incorporated herein by reference in its entirety. Optionally, the mirror casing may include cap portions that may include one or more accessories, such as by utilizing aspects of the mirror assemblies described in U.S. Pat. No. 7,289,037, which is hereby incorporated herein by reference in its entirety.

Figure 5:
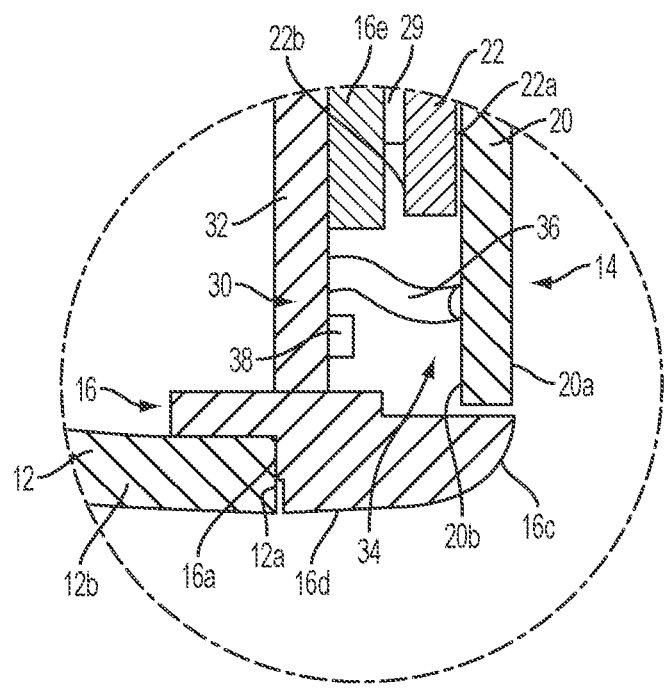
FIG. 5 is an enlarged perspective view of the area B in FIG. 4.

Bezel portion 16 comprises a plastic or polymeric molded bezel portion that has a rearward perimeter attachment portion 16a (that opposes the mirror casing when the bezel portion is attached to the mirror casing and that faces generally forwardly in the forward direction of travel of the vehicle when the mirror assembly is normally mounted in the vehicle) that attaches to the forward or front edge region 12a of the mirror casing 12 via any suitable manner, such as via a snap connection or welding or screwing or heat staking or adhering or the like. As can be seen in FIGS. 4 and 5, bezel portion 16 includes a perimeter portion or element 16b that has an outer curved front surface 16c that provides a smooth or curved transition surface (such as a convex-curved transition surface) between a side wall 16d of the perimeter portion 16b of bezel portion 16 (which is generally coplanar or generally flush with the side wall 12b of the mirror casing 12 when the bezel portion 16 is attached to the mirror casing) and the front surface 20a of the reflective element 14. Thus, the bezel portion 16 does not encompass the front surface 20a of the reflective element such that the entire front surface 20a of the reflective element 14 is exposed and viewable by the driver of a vehicle when the mirror assembly is normally mounted in the vehicle.

In the illustrated embodiment, the radius of curvature of the curved surface 16c of bezel portion 16 is about 2.5 mm, but may be greater than or less than this dimension depending on the particular application of the reflective element and mirror casing of the mirror assembly (such as, for example, a radius of curvature of about 3 mm or thereabouts). Typically, it is desired to have at least a 2.5 mm radius of curvature at the perimeter edges of a mirror assembly (typically at a bezel of a conventional mirror assembly) to meet the minimum safety standards for head impact with the mirror, such as during a sudden stop or collision of the equipped vehicle. Homologation radius approval may be achieved using a continuation of the glass plane into the bezel radius.

As shown in FIG. 4, the bezel portion 16 may be formed with a generally planar attachment panel or surface 16e that is disposed rearward of the perimeter bezel portion 16b. For example, the attachment panel 16e may extend at least substantially across the length and width dimensions of the perimeter portion 16b of bezel portion 16 to provide an attachment panel for attachment of the reflective element 14 to the bezel portion 16. The reflective element may be received into the bezel portion (such as in a partial pocket formed by the perimeter portion and the attachment panel) and attached or adhered (such as via a two-sided tape 29 or the like) or snapped to the attachment panel, whereby the front surface of the reflective element is generally coplanar or flush with the front surface of the perimeter bezel portion. Optionally, the bezel portion may comprise an injected molded plastic or polymeric bezel portion, with the attachment panel 16e integrally or unitarily molded with the perimeter portion 16b of the bezel portion, or the attachment panel may be formed separately from and attached to the perimeter portion, or the bezel portion may comprise a stamped metallic bezel portion or may be an otherwise formed plastic or polymeric or metallic bezel portion, while remaining within the spirit and scope of the present invention.

The reflective element 14 thus may be readily received in the bezel portion and attached to the front surface of the attachment panel 16e of bezel portion 16. Optionally, for example, the reflective element 14 may be attached via an adhesive tape, such as a double-sided adhesive tape disposed between the rear surface 22b of reflective element 14 and the front surface of the attachment panel 16e of bezel portion 16. The reflective element 14 thus may be fixedly attached to the bezel portion and the bezel portion and reflective element sub-assembly may be attached to the mirror casing as a unit and may be pivoted with the mirror casing 12 relative to the mounting assembly 18 to adjust the rearward field of view to the driver of the vehicle. When the reflective element 14 is attached to the attachment surface of the attachment panel 16e of bezel portion 16, the perimeter forward edges or regions of the perimeter portion 16b of bezel portion 16 are generally flush or coplanar with the front surface 20a of reflective element 14, and when the bezel portion 16 is attached to the forward edge portions 12a of mirror casing 12, the side wall 16d of bezel portion is generally flush or coplanar with the side wall 12b of mirror casing 12. The rear glass substrate of the reflective element thus may be attached to the attachment panel using a back plate construction similar to attachment of an exterior rearview mirror reflective element to an exterior rearview mirror back plate (and utilizing aspects known in the exterior rearview mirror art).

When the glass reflective element rear substrate is attached to the attachment panel of the bezel portion, the attachment panel functions like an attachment plate or back plate of an exterior rearview mirror assembly and provides impact resistance and enhanced image stability to the reflective element. Optionally, it is envisioned that a ball stud or ball member or pivot member may be attached to or formed with the bezel portion and attachment panel to further enhance the image stability provided by the mirror reflective element when the mirror assembly is normally mounted in the vehicle and when the vehicle is driven along a road. In such an application, the reflective element may be directly attached to the attachment panel and ball stud configuration and thus reduces vibration of the reflective element during vehicle operation.

Optionally, it is envisioned that the bezel portion and the mirror casing may be unitarily or integrally formed, such as via injection molding or the like. The mirror reflective element may then be received in the front opening or bezel portion of the unitary mirror casing and bezel and may be attached to an attachment panel of the mirror casing and bezel. Optionally, the mirror casing and bezel may be formed utilizing aspects of the mirror assemblies described in PCT Application No. PCT/US2010/032017, filed Apr. 22, 2010, which is hereby incorporated herein by reference in its entirety, and may have at least one generally planar front attachment surface or panel or wall for attaching to the reflective element when the reflective element is received in or through the front opening or bezel portion of the mirror casing and bezel structure.

Although shown and described as being adhesively attached to the attachment surface of the bezel portion, it is envisioned that the reflective element may be otherwise attached to the bezel portion, while remaining within the spirit and scope of the present invention. For example, the reflective element may include or may be adhered to a back plate structure that includes attachment elements for connecting to corresponding attachment elements of the bezel portion or mirror casing. For example, the back plate may include flexible tabs extending therefrom that flex to engage and snap to corresponding slots and tabs at the bezel portion and/or mirror casing to secure the reflective element to the bezel portion and/or mirror casing. The reflective element thus may be attached to the bezel portion and/or mirror casing via other suitable attachment means while the bezel portion does not encompass or overlap the perimeter edge region of the front surface of the reflective element.

Electrical connection to the reflective element (such as to the transparent electrically conductive coating at the second surface of the front substrate and to the electrically conductive coating at the third surface of the rear substrate) may be made via connectors or contacts established between circuitry of the mirror assembly and the respective electrically conductive coatings. Because the bezel portion does not overlap or encompass the front surface of the reflective element, the bezel portion substantially abuts the perimeter edge dimension of the front substrate of the reflective element to provide a finished appearance to the mirror assembly, and thus an electrode clip may not be suitable for electrically connecting to the transparent conductive coating at the second surface of the front substrate or for electrically connecting to the conductive coating or coatings at the third surface of the rear substrate. Thus, it is envisioned that electrical connection to the transparent electrically conductive coating at the second surface of the front substrate may be made via an electrical contact or connector contacting the rear surface of the front substrate at a portion where the rear substrate is removed or offset, and such contact may be enhanced or established via a conductive epoxy or the like, and may utilize aspects of the mirror assemblies described in U.S. Pat. Nos. 7,626,749; 7,274,501; 7,255,451; 7,195,381; 7,184,190 and/or 6,690,268, and/or U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, and/or PCT Application No. PCT/US2010/029173, filed Mar. 30, 2010, which are all hereby incorporated herein by reference in their entireties. The electrical connection to the conductive coating or coatings at the third surface of the rear substrate may be made via any suitable means, such as an electrical contact and/or conductive epoxy and/or a wrap-around coating and/or the like, such as by utilizing aspects of the above referenced patents and patent applications.

Figure 1:
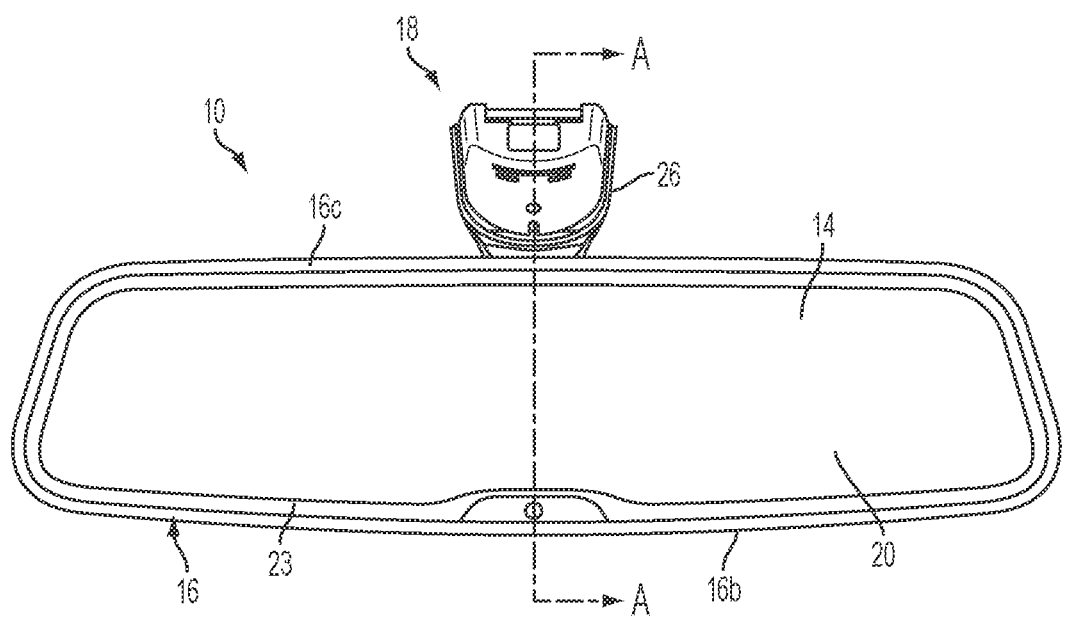
FIG. 1 is a front elevation of an interior rearview mirror assembly in accordance with the present invention.
Figure 2:
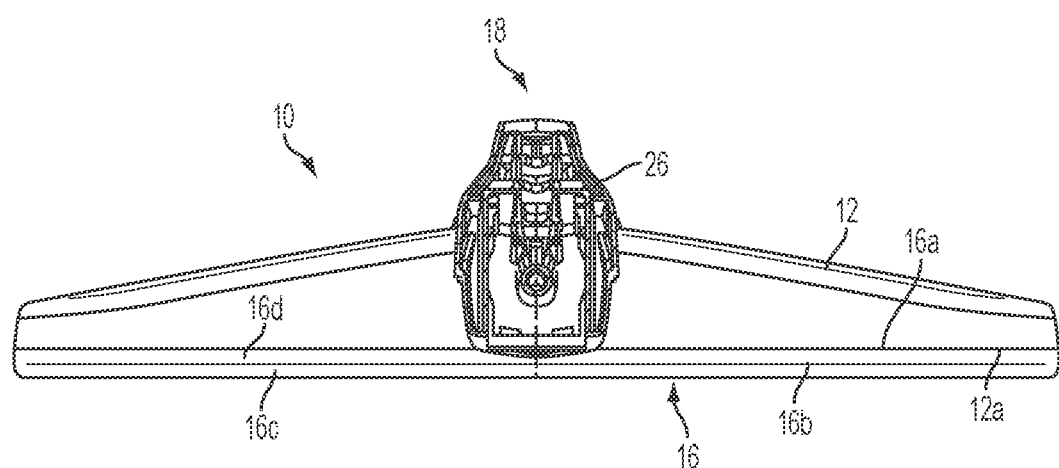
FIG. 2 is an upper plan view of the interior rearview mirror assembly of FIG. 1.
Figure 3:
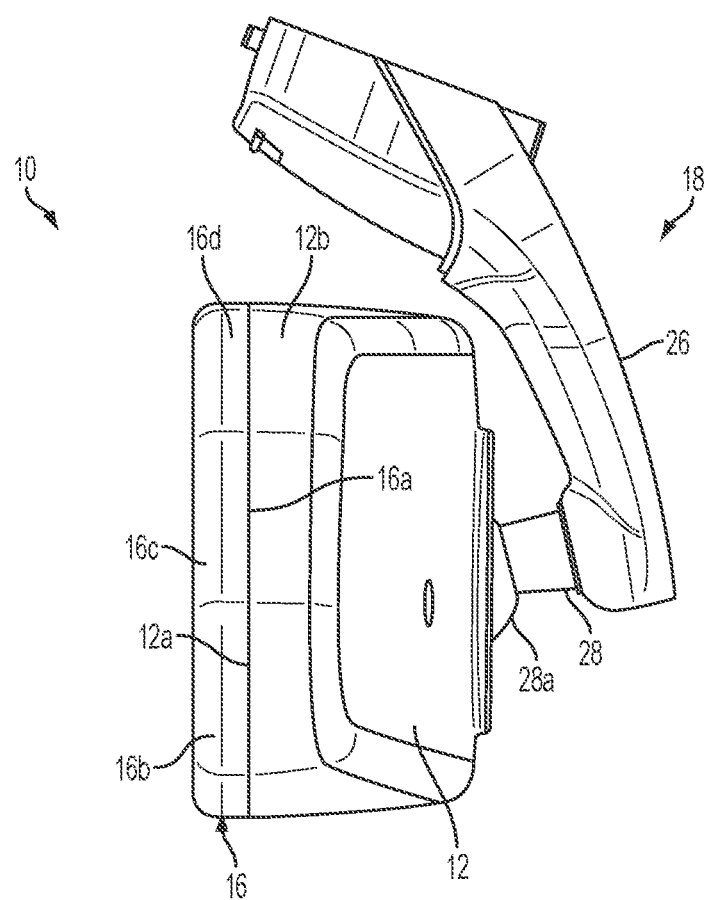
FIG. 3 is a side elevation of the interior rearview mirror assembly of FIG. 1.

Optionally, mirror assembly 10 may include at least one user actuatable input 30 for controlling at least one accessory of the mirror assembly and/or vehicle. In the illustrated embodiment (and as shown in FIG. 5), the mirror assembly 10 includes a circuit element 32, such as a printed circuit board or substrate or the like, disposed at a rear surface of the attachment panel 16e of bezel portion 16. As can be seen with reference to FIG. 5, the user actuatable input 30 may comprise a capacitive switch or sensor disposed or established at a perimeter region of the reflective element. In such an application, a perimeter portion of the rear substrate 22 may be cutaway or removed so that the front substrate is exposed or accessible from the rear of the reflective element at an overhang or cutaway or switch region 34 or the front substrate 20 may have a cross dimension (such as a height dimension) that is greater than a corresponding cross dimension of the rear substrate so as to establish the overhang or cutaway or switch region 34, such as at a lower, central region of the reflective element as shown in FIGS. 1 and 5 (although clearly the overhang or cutaway region may be provided at any other location at the reflective element while remaining within the spirit and scope of the present invention). The perimeter seal may be disposed around the shape of the switch area and the opaque perimeter band may be established to cover or conceal or hide the seal around the switch area.

The transparent electrically conductive coating (preferably indium tin oxide (ITO) or the like) at the rear or second surface 20b of the front substrate 20 may have a portion at the overhang region 34 that is electrically isolated (such as via laser etching at the boundary of the overhang region or around one or more switch or sensor locations at the overhang region) from the rest of the coating at the principal viewing area of the reflective element. Thus, the transparent electrically conductively coated rear surface 20b of the front substrate 20 at the overhang region 34 may function as part of a capacitive sensor. For example, an electrical lead 36 may be electrically connected between the circuit element 32 and the transparent electrically conductive coating at the rear surface 20b of front substrate 20. Thus, the circuitry may detect the presence or touch of a person's finger at the front surface 20a of the front substrate 20 at the switch region 34 and may activate/deactivate/control one or more accessories of the mirror assembly and/or vehicle responsive to such a detection. Thus, the transparent electrically conductive coating (such as ITO or the like) established at and across the rear of the front mirror glass substrate may be used to create half of a capacitive switch with the operator's finger completing the other half of the switch or capacitor. The switch or sensor area is electrically isolated from the rest of the transparent electrically conductive coating at the rear of the front mirror glass substrate, such as by using a laser etch boundary or isolation line or delineation line or the like. The capacitive touch sensor may function like any known touch sensor or capacitive sensor or may utilize aspects of the capacitive sensors and sensing systems discussed below.

Optionally, and as shown in FIG. 1, the switch area may have an icon 36 established thereat (such as via laser etching through or at least partially through the opaque coating or band at the switch area) so that a user may readily view and recognize the function of the switch. Optionally, and desirably, the switch icon may be illuminated or backlit, such as by using an illumination source 38 (such as a light emitting diode or the like) at the circuit element 32. The color of the icon may change responsive to actuation of the switch or sensor. For example, for an electrochromic (EC) function control (which allows the driver to manually activate or deactivate the automatic dimming function of the electrochromic mirror), the color of the icon may change (such as from red (off) to blue (on) or the like) when the EC function is toggled using the capacitive switch. Optionally, the switch icon may be one color (such as, for example, blue) at all times and a separate illumination source or light emitting diode (LED) or the like may be turned on and off at another location, and may be viewable by the driver of the vehicle looking through the mirror reflective element (and through the partially transmitting, partially reflecting transflective mirror reflector established at the third surface or front surface of the rear substrate). The indicator icon could be any shape or logo while remaining within the spirit and scope of the present invention.

Optionally, and desirably, the mirror assembly includes one or more photo-sensors, such as an ambient light sensor and a glare light sensor and/or the like. The rearward facing photo-sensor, such as a glare sensor, is disposed behind the reflective element and receives light through the mirror reflective element and transflective mirror reflector. Thus, the sensor senses light through the glass mirror substrates and transflective metallic mirror reflector and is not disposed at the bezel or chin area of the mirror assembly.

Optionally, the mirror assembly may include other accessories, such as, for example, a compass module with a display-on-demand (DoD) display that is viewable by the driver of the vehicle looking through the mirror reflective element and through the partially transmitting, partially reflecting transflective mirror reflector established at the third surface or front surface of the rear substrate. The calibration button functions could be programmed using the touch switch and an on-board microprocessor or the like or by an added flex button or input at the rear of the mirror housing, or a hole for a reset pin to be guided through or the like.

Therefore, the present invention provides a frameless mirror assembly that has a reflective element adhered or attached to a front or mounting surface of a bezel portion or mirror casing, with no mirror casing or bezel portion encompassing the perimeter edge region of the front surface of the mirror reflective element. For mirror applications with one or more mirror-based accessories, the accessory or accessories may be received in or disposed at or in the mirror casing and/or may be disposed at the mounting structure of the mirror assembly. The flush front surface of the reflective element and bezel portion provides a frameless and more modern appearance to the mirror assembly. Also, the opaque perimeter border band and bezel portion may contrast or match to further enhance the appearance, depending on the application and desired appearance of the mirror assembly. For example, the opaque border band may comprise a metallic appearance or may be light absorbing and thus may have a dark color, while the bezel portion may be a dark or black colored plastic or may be chrome plated or otherwise colored to provide the desired or selected appearance of the mirror assembly.

Optionally, an interior rearview mirror assembly of the present invention may have a mirror casing (which may have a bezel portion) that encompasses a perimeter edge dimension of the rear substrate of an electro-optic mirror reflective element, and that abuts at or is in close proximity to the rear surface of the front substrate, such as by utilizing aspects of the mirror assemblies described in U.S. Pat. No. 7,255,451 and/or PCT Application No. PCT/US2010/032017, filed Apr. 22, 2010, which are hereby incorporated herein by reference in their entireties. The front substrate has a curved outer or front perimeter edge to provide a smooth continuous convex-curved transition between the generally planar front surface of the front substrate and the generally planar exterior surface of the mirror casing. Thus, the interior rearview mirror assembly provides a frameless interior rearview mirror assembly, with no mirror casing or bezel portion encompassing and encroaching onto the front surface of the front substrate of the mirror reflective element.

Figure 6:
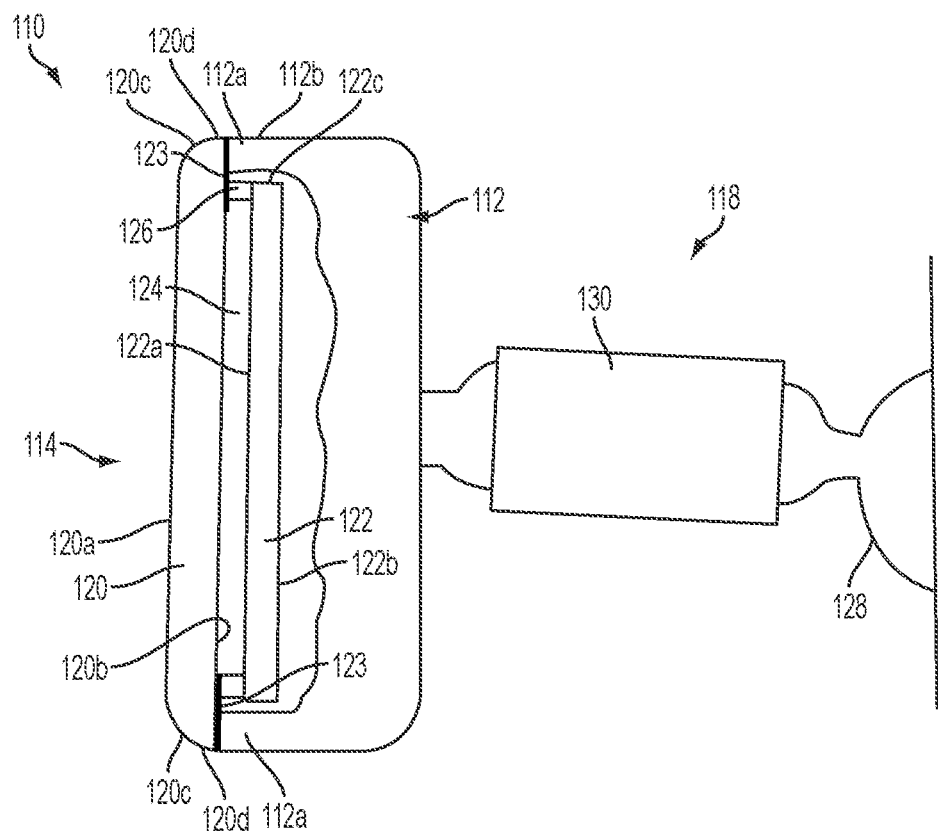
FIG. 6 is a side elevation and partial sectional view of another interior rearview mirror assembly in accordance with the present invention.

For example, and with reference to FIG. 6, an interior rearview mirror assembly 110 includes a mirror casing or housing or shroud or cap or holder 112, a reflective element 114 positioned at a front portion of the mirror casing 112 with a front casing portion 112a disposed around a periphery of the rear substrate 122 of the reflective element 114. Mirror assembly 110 is adjustably mounted to an interior portion of a vehicle (such as to an interior surface of a vehicle windshield or a headliner of a vehicle or the like) via a mounting structure or mounting configuration or assembly 118, such as described above. The front casing portion 112a (which may be part of or joined with a mirror attachment plate or backing plate or the like that is disposed at and attached at a rear surface or portion of the mirror reflective element) receives the rear substrate 122 of the reflective element therein and encompasses the perimeter edge 122c of the rear substrate 122 of the reflective element 114 (i.e., the circumferential edge surface adjoining, connecting and between the third or front surface of the rear substrate and the fourth or rear surface of the rear substrate). As can be seen in FIG. 6, the front casing portion 112 abuts or is in close proximity to the rear surface 120b of the front substrate 120 and does not overlap or encompass the perimeter edges of the front substrate 120 and does not overlap or encompass the perimeter regions of the front surface of the reflective element 114, and the front substrate 120 includes a curved or rounded surface or beveled or contoured outboard or front perimeter or curvature 120c at the front perimeter edge and side edge dimension to provide a smooth continuous transition between the generally planar principal front surface 120a of the front substrate 120 and the generally planar or beveled or contoured or curved exterior surface 112b of the front casing portion 112a of mirror casing 112, as discussed below.

Reflective element 114 may comprise an electro-optic (such as electrochromic) reflective element or may comprise a prismatic or wedge-shaped reflective element. Reflective element 114 includes a front substrate 120 having a front or first surface 120a (the surface that generally faces the driver of a vehicle when the mirror assembly is normally mounted in the vehicle) and a rear or second surface 120b opposite the front surface 120a, and a rear substrate 122 having a front or third surface 122a and a rear or fourth surface 122b opposite the front surface 122a, with an electro-optic medium 124 disposed between the second surface 120b and the third surface 122a and bounded by a perimeter seal 126 of the reflective element (such as is known in the electrochromic mirror art). The second surface 120a has a transparent conductive coating established thereat, while the third surface 122a has a conductive coating (such as a metallic reflector coating for a third surface reflector mirror element or such as a transparent conductive coating for a fourth surface reflector mirror element) established thereat.

Reflective element 114 includes an opaque or substantially opaque or hiding perimeter layer or coating or band 123 (FIG. 1) disposed around a perimeter edge region of the front substrate 120 (such as at a perimeter region of the rear or second surface 120b of the front substrate) to conceal or hide or the perimeter seal from viewing by the driver of the vehicle when the mirror assembly is normally mounted in the vehicle. Such a hiding layer or perimeter band may be reflective (such as specularly reflective) or not reflective and may utilize aspects of the perimeter bands and mirror assemblies described in U.S. Pat. Nos. 7,626,749; 7,274,501; 7,184,190; 7,255,451 and/or 5,066,112, and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

Optionally, the circumferential perimeter border layer or band may be established via any suitable means, such as by screen printing or vacuum deposition or the like (preferably by sputter deposition and utilization of a mask as is known in the sputter deposition art). Optionally, the perimeter or border band (either specularly reflecting or non-reflecting or the like) may be established at the front surface of the front substrate (such as over the curved perimeter edge and a perimeter region of the front surface of the front substrate).

Optionally, the front substrate may be frosted or diffused at the perimeter region so that the perimeter seal and mirror casing are concealed or rendered covert to a person viewing the mirror assembly and reflective element when the mirror assembly is normally mounted in a vehicle.

The reflective element 114 and mirror casing 112 are adjustable relative to the mounting arm or pivot assembly 118 to adjust the driver's rearward field of view when the mirror assembly is normally mounted at or in the vehicle. In the illustrated embodiment, mounting assembly 118 comprises a double-ball or double-pivot mounting assembly whereby the reflective element and casing are adjustable relative to the vehicle windshield (or other interior portion of the vehicle) about a pair of pivot joints. Mounting assembly 118 includes a base portion or mounting base 128 and a mounting arm 130, with the mounting arm 130 pivotally mounted at the mounting base 128 at a base or first ball pivot joint and the reflective element 114 and mirror casing 112 pivotally mounted at mounting arm 130 about a mirror or second ball pivot joint. Optionally, the mounting assembly may comprise other types of mounting configurations, such as a single-ball or single-pivot mounting configuration or the like, while remaining within the spirit and scope of the present invention.

Mirror casing 112 comprises a plastic or polymeric molded casing that may attach to the mounting assembly 118 via any suitable manner. The casing may comprise any suitable casing construction, and has a forward perimeter edge or receiving portion 112a for receiving the rear substrate 122 of the mirror reflective element 114 therein, as discussed below. Optionally, the mirror casing may have at least one generally planar front attachment surface or panel or wall for attaching to the reflective element, such as by utilizing aspects of the mirror assemblies described in PCT Application No. PCT/US2010/032017, filed Apr. 22, 2010, which is hereby incorporated herein by reference in its entirety. Optionally, the mirror casing may include cap portions that may include one or more accessories, such as by utilizing aspects of the mirror assemblies described in U.S. Pat. No. 7,289,037, which is hereby incorporated herein by reference in its entirety.

As can be seen in FIG. 6, front substrate 120 includes a perimeter portion or element that has an outer curved front bevel or edge or glass surface 120c (that may be ground or otherwise formed or established) that is formed around the perimeter of a generally planar main or principal front surface 120a and that provides a smooth or curved transition surface between the generally planar main or principal front surface 120a of the reflective element 114 and the exterior surface 112b of the front casing portion 112a of mirror casing 112 (which is generally coplanar or generally flush with the rear perimeter edge dimension 120d of front substrate 120 when the mirror reflective element 114 is received in front casing portion 112a of mirror casing 112). The beveled portion or beveled outboard or front perimeter 120c of front substrate 120 has a bevel radius of curvature of at least about 2.5 mm, such as 2.5 mm or 3.0 mm or thereabouts, and may be formed via any suitable beveling operation, such as a beveling operation involving the likes of diamond wheel grinding of the outboard or front perimeter of the glass substrate followed by a successive finer grind polish to reestablish a water clear glass like transparent bevel that, to the driver's eye, is substantially indistinguishable from the planar principal glass surface of the front substrate being viewed by the driver. The front casing portion 112a abuts or is in close proximity to the rear surface 120b of front substrate 120 to encompass the rear substrate 122 and the perimeter seal 126, and the perimeter band 123 hides or conceals the perimeter seal 126 from view by a person viewing the reflective element when the mirror assembly is normally mounted in a vehicle.

In the illustrated embodiment, the radius of curvature of the beveled outboard or front perimeter 120c of front substrate 120 is about 2.5 mm, but may be greater than or less than this dimension depending on the particular application of the reflective element and mirror casing of the mirror assembly. Typically, it is desired to have at least a 2.5 mm radius of curvature at the perimeter edges of a mirror assembly (typically at a bezel of a conventional mirror assembly) to meet the minimum safety standards for head impact with the mirror, such as during a sudden stop or collision of the equipped vehicle.

Thus, the bevel or contour or curvature or form of the curved edges or beveled outboard or front perimeter 120c of the front substrate 120 and the bevel or contour or curvature or form of surface 112b of the mirror casing 112 may generally align or match to provide a generally continuous surface or contour or curvature at the junction of the front substrate and the mirror casing. Any interface between the front substrate and the mirror casing may be reduced or minimized, such as by a close fit arrangement of the front substrate and mirror casing and/or by the glass front substrate slightly nesting into a the mirror casing (such as via a slight lip at the mirror casing that may overlap a slight portion of the side perimeter edge of mirror front substrate), or such as by affirmatively filling any gap between the front substrate and mirror casing with a gap closing or gap filling material or means.

Therefore, the mirror casing 112 receives or accommodates the rear substrate 122 of the reflective element therein and does not encompass or encroach onto the circumferential perimeter edges of the front substrate (i.e., the edge surface adjoining, connecting and between the first or front surface of the front substrate and the second or rear surface of the front substrate) or the front surface 120a of the reflective element such that the entire front surface 120a of the reflective element 114 is exposed and viewable by the driver of a vehicle when the mirror assembly is normally mounted in the vehicle. The convex-curved transition surface or beveled perimeter 120c of the front substrate 120 provides a smooth continuous curved transition between the generally planar front surface 120a of the front substrate 120 and the generally planar or curved or contoured or beveled exterior surface 112b of the mirror casing 112.

For vehicular interior rearview mirror assemblies, ECE Regulation No. 46, which is hereby incorporated herein by reference in its entirety, requires that an automotive or vehicular interior rearview mirror assembly have the edge of the reflecting surface enclosed in a protective housing (or holder, etc.) which, on its perimeter, must have a radius of curvature greater than or equal to 2.5 mm at all points and in all directions. If the reflecting surface projects beyond the protective housing, the radius of curvature on the edge of the projecting part must be not less than 2.5 mm and the reflecting surface must return into the protective housing under a force of 50 N applied to the point of greatest projection, relative to the protective housing, in a horizontal direction, approximately parallel to the longitudinal median plane of the vehicle.

The present invention satisfies such requirements by having the reflecting surface (such as the third surface or fourth surface reflecting surface of an electrochromic reflective element) received in the mirror housing or protective housing so that an outboard portion of the mirror housing or projecting portion or lip or protrusion or structure of or at the mirror housing or protective housing encloses the reflecting surface therein (see, for example, FIG. 8E, which illustrates an electro-optic mirror assembly, or FIG. 9B, which illustrates a prismatic mirror assembly), with the beveled front or outer or outboard edge or perimeter of the front substrate (that may be first impacted by an occupant of the vehicle during a vehicle collision) of the mirror having on its perimeter a radius of curvature greater than or equal to 2.5 mm (such as 3 mm or thereabouts) at all points and in all directions (such as shown, for example, in FIGS. 8E, 9B and 10A-E). Such a novel approach for an interior rearview mirror assembly provides an enhanced aesthetically pleasing appearance and may provide increased reflective/viewing area at the mirror assembly, since the mirror assembly does not include a conventional bezel portion or the like that overlaps and encroaches onto the perimeter region of the front surface of the front substrate of the reflective element. The mirror assembly of the present invention may also provide for a smaller mirror assembly and thus increased forward vision of the driver of the vehicle around the mirror (such as an increase of, for example, about 15-25 percent around the interior mirror assembly) while providing a given rearward field of view to the driver of the vehicle (and thus may provide a mass reduction (such as of, for example, about 10-12 percent) as compared to conventional mirror assemblies). Also, the polished glass edge or beveled outboard or front perimeter of the mirror reflective element of the present invention may provide a stronger reflective element substrate (such as about 65 percent stronger) as compared to a conventional cut edge glass substrate due to the removal or reduction of edge stress points and/or microfractures. The present invention may provide these enhancements in appearance and durability and size/weight, all while satisfying the requirements of the ECE Regulation No. 46.

In a conventional electrochromic mirror reflective element assembly, an electrochromic medium is disposed or sandwiched between a front substrate and rear substrate with a mirror reflector coating or layer established at or disposed at the front or rear surface of the rear substrate. The front substrate, around its perimeter, has an outboard leading edge and an inboard edge, where the outboard edge is the one that is generally towards the driver of the vehicle when the mirror assembly is normally mounted in the vehicle. In conventional interior rearview mirror assemblies, the outboard leading edge of the front substrate is typically encased or encompassed by a bezel portion of a mirror casing or housing or shroud or holder. For the mirror assembly of the present invention, because in particular the leading outboard edge of the reflective element may be directly contactable by a driver or occupant, the leading outboard edge of the reflective element is beveled so as to have a radius of curvature of at least about 2.5 mm, and, as indicated above, is typically diamond ground/polished so as to have a water clear glass like transparent appearance to the driver of the vehicle. Furthermore, the inboard edge of the reflective element may also be ground or formed, such as shown, for example, in FIG. 8E, so as to accommodate a portion of the mirror casing or housing or shroud or holder or frame that encloses the edge of the reflecting surface (that in the case of a laminate electrochromic mirror is typically the leading outboard edge of the rear substrate, commonly referred to as the perimeter edge of the third surface of the laminate electrochromic mirror reflective element assembly). The reflecting surface of the reflective element thus is received or disposed in or enclosed by the mirror housing or casing or holder or the like (and disposed rearward or inward of the outer end or protrusion or lip of the mirror casing or housing or shroud or holder or cap), with the outboard leading edge of the reflective element beveled to the desired or appropriate radius of curvature.

Optionally, and with reference to FIGS. 7, 7A and 7B, an interior electrochromic rearview mirror assembly 210 may have a mirror casing 212 that receives the rear substrate 222 of a reflective element 214 therein and does not encompass the perimeter edges of the front substrate 220 or the front surface 220a of the reflective element, such that the entire front surface 220a of the reflective element 214 is exposed and viewable by the driver of a vehicle when the mirror assembly is normally mounted in the vehicle, such as in a similar manner as discussed above. The front surface 220a of front substrate 220 includes a perimeter portion or element that has a beveled outboard or front perimeter or outer curved front edge or surface or bevel 220c (that may be ground or otherwise formed or established) that provides a smooth or convex-curved transition surface between the front surface 220a of the reflective element 214 and the exterior surface 212b of the front casing portion 212a of mirror casing 212 (which is generally coplanar or generally flush with the rear perimeter edge dimension 220d of front substrate 220 when the mirror reflective element 214 is received in front casing portion 212a of mirror casing 212). The reflective element 214 includes a mirror reflector 221 (such as any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties) disposed at the front surface 222a of rear substrate 222 (commonly referred to as the third surface of the reflective element) and opposing the electro-optic medium, such as an electrochromic medium disposed between the front and rear substrates and bounded by a perimeter seal, but the mirror reflector could be disposed at the rear surface 222b of rear substrate 222 (commonly referred to as the fourth surface of the reflective element), while remaining within the spirit and scope of the present invention.

In the illustrated embodiment, the mirror assembly 210 includes a backing plate or attachment plate 240, which may be adhered or otherwise attached at the rear surface of the rear substrate 222, such as at an anti-scatter tape 242 or the like adhered to the rear surface of the rear substrate in a known manner. As best shown in FIG. 7B, attachment plate 240 includes a generally planar attachment portion 240a that is attached at tape 242 and a perimeter flange or tab 240b that extends rearwardly from attachment portion 240a and is generally parallel to the inner surface 212c of the front portion 212a of mirror casing 212 when the rear substrate 220 and attachment plate 240 are received in mirror casing 212 (optionally, the attachment plate may be formed or established as part of the mirror casing or housing, or the mirror casing or housing or cap portion may be attached to the attachment plate via any suitable means, such as by utilizing aspects of the mirror assemblies described in U.S. Pat. No. 7,289,037, which is hereby incorporated herein by reference in its entirety). In the illustrated embodiment, the flange 240b of attachment plate 240 may be adhered or otherwise attached to or at the inner surface 212c of front portion 212a of mirror casing 212 to retain the attachment plate 240 and reflective element 214 relative to the mirror casing 212. Optionally, the housing may be attached to the attachment plate flange via any other suitable means, such as via sonic welding, solvents, laser welding and/or the like.

When so retained, a forward or outer edge or lip 212d of mirror casing 212 may be at or near or in contact with the rear surface 220b of front substrate 220 at the perimeter region of the front substrate. Optionally, an opaque or darkened layer or concealing or hiding perimeter layer 223 (such as a reflective layer or chrome layer or non-reflective layer or the like) may be disposed at the perimeter region of the rear surface of the front substrate to conceal or render covert the mirror casing 212 and the perimeter seal of the reflective element 214). The adhesive may comprise any suitable adhesive, and may provide a quick set or partial cure that holds the mirror casing to the attachment plate during the curing of the adhesive (or optionally, fixturing or a second rapid set, rapid cure adhesive may be disposed at the interface between the mirror casing and the attachment plate) to hold the attachment plate and mirror casing together until the adhesive is fully cured. Thus, the front casing portion 212a abuts or is in close proximity to the rear surface 220b of front substrate 220 (such as with a gap of less than about 1 mm or less than about 0.5 mm or less than about 0.25 mm), and the mirror casing 212 receives and/or encompasses the rear substrate 222 and the perimeter seal 226. As can be seen in FIG. 7B, the reflecting surface 221 is received in the mirror housing, with the edge of the front substrate of the mirror having on its perimeter a radius of curvature greater than or equal to 2.5 mm (such as 3 mm or thereabouts) at all points and in all directions, and thus the mirror assembly satisfies the requirements of ECE Regulation No. 46, incorporated by reference above, and the perimeter band hides or conceals the edge or lip 212d of mirror casing 212 and the perimeter seal from view by a person viewing the reflective element when the mirror assembly is normally mounted in a vehicle.

Figure 8A:
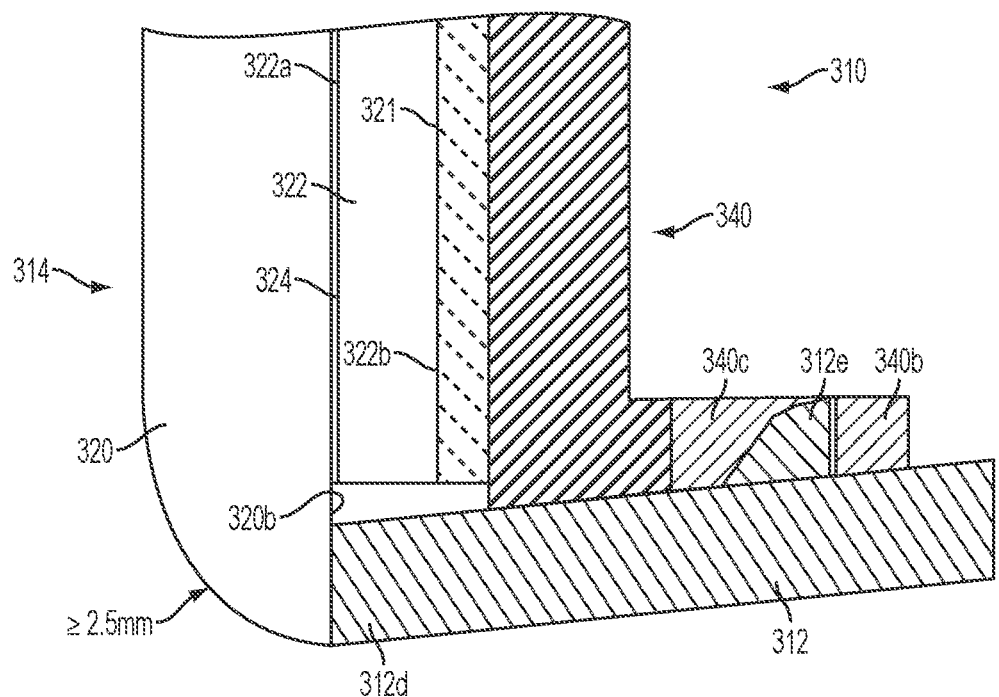
FIGS. 8A-E are enlarged views of the lower edge of other electrochromic interior rearview mirror assemblies of the present invention.

Optionally, and as shown in FIG. 8A, the attachment plate 340 of a mirror assembly 310 may have a notch or opening or aperture 340c established at or through flange 340b and the mirror casing 312 may have a tab or retaining element 312e protruding inboard therefrom. Thus, when the attachment plate 340 (and the rear substrate 322 and electrochromic medium 324 of the reflective element 314) is received in mirror casing 312 a sufficient amount, the retaining element 312e is received in aperture 340c to snap or lock or retain the attachment plate 340 and reflective element 314 relative to mirror casing 312 (with the outer edge 312d of mirror casing 312 being at or near or in contact with or spaced from the rear surface 320b of front substrate 320 of mirror reflective element 314, such as in a similar manner as described above). In the illustrated embodiment of FIG. 8A, the reflective element 314 includes a fourth surface mirror reflector 321 disposed at the rear surface 322b of rear substrate 322 (such as an environmentally stable coating or layer such as a coating or layer of silicon aluminum or other suitable coatings or layers, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties), but the mirror reflector could be disposed at the front surface 322a of rear substrate 322, while remaining within the spirit and scope of the present invention. The mirror assembly 310 may be otherwise similar in construction to mirror assembly 210, discussed above, such that a detailed discussion of the mirror assemblies need not be repeated herein.

Figure 8B:
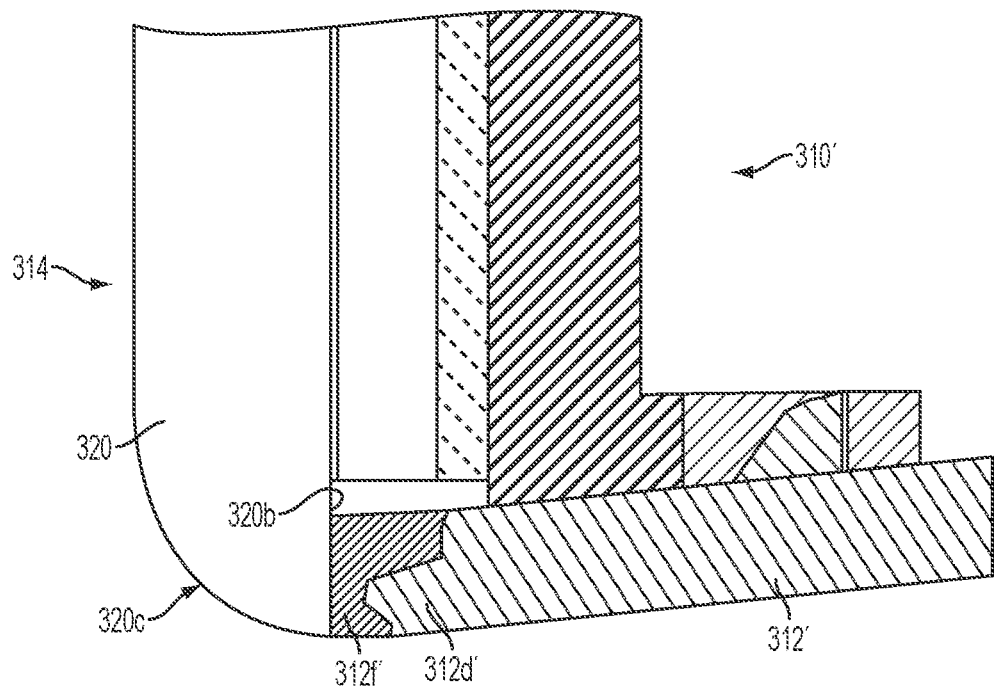

Optionally, the outer end or edge of the mirror casing may be formed or constructed to attach to or abut against or conform with the rear surface of the front substrate of the reflective element. For example, and as shown in FIG. 8B, the mirror casing 312' may have an overmolded end or front end or region 312d', with an elastomeric or resilient or spongy or soft rim portion 312f' (such as an overmolded santoprene material or the like) molded over end region 312d' to provide a cushion and/or seal between the end region 312d' and the rear surface 320b of front substrate 320 of reflective element 314. The resilient or soft portion 312f' may comprise any suitable softer or lower durometer hardness material as compared to the harder plastic mirror casing 312'. The overmolded portion 312f' of the front casing portion 312d' thus abuts or contacts (and may compress against) the rear surface 320b of front substrate 320 to seal against the rear surface 320b and provide a sealed gap-less transition between the mirror casing and the curved edge or surface or beveled outboard or front perimeter 320c of front substrate 320 of reflective element 314. The overmolded resilient portion may provide a resilient seal between the reflective element and the mirror casing or housing and may function to absorb or reduce shock or vibration at the reflective element. The mirror assembly 310' may be otherwise similar in construction to mirror assemblies 210, 310 discussed above, such that a detailed discussion of the mirror assemblies need not be repeated herein.

Figure 8C:
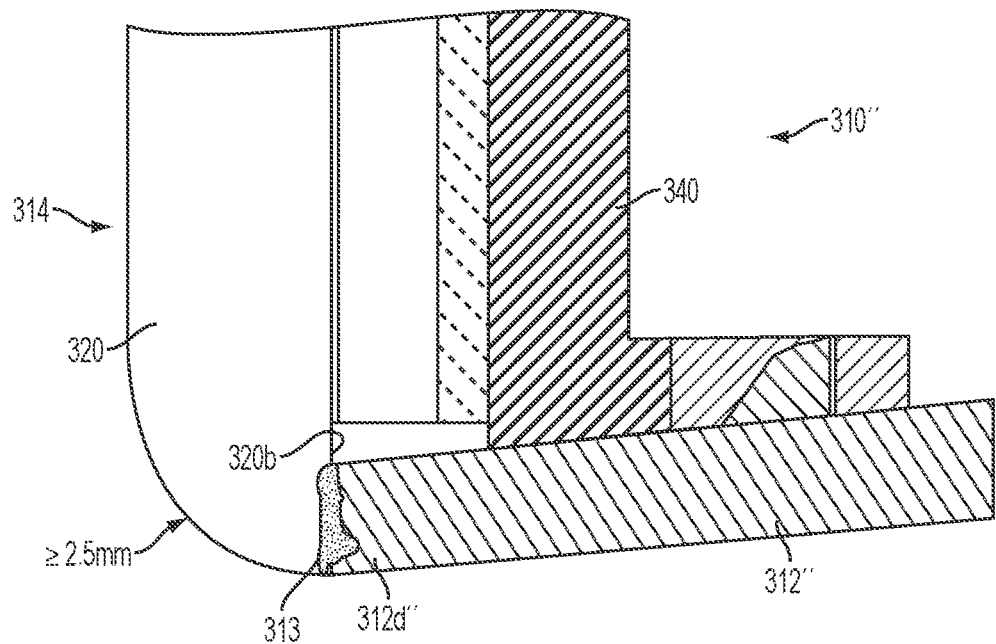
Figure 8D:
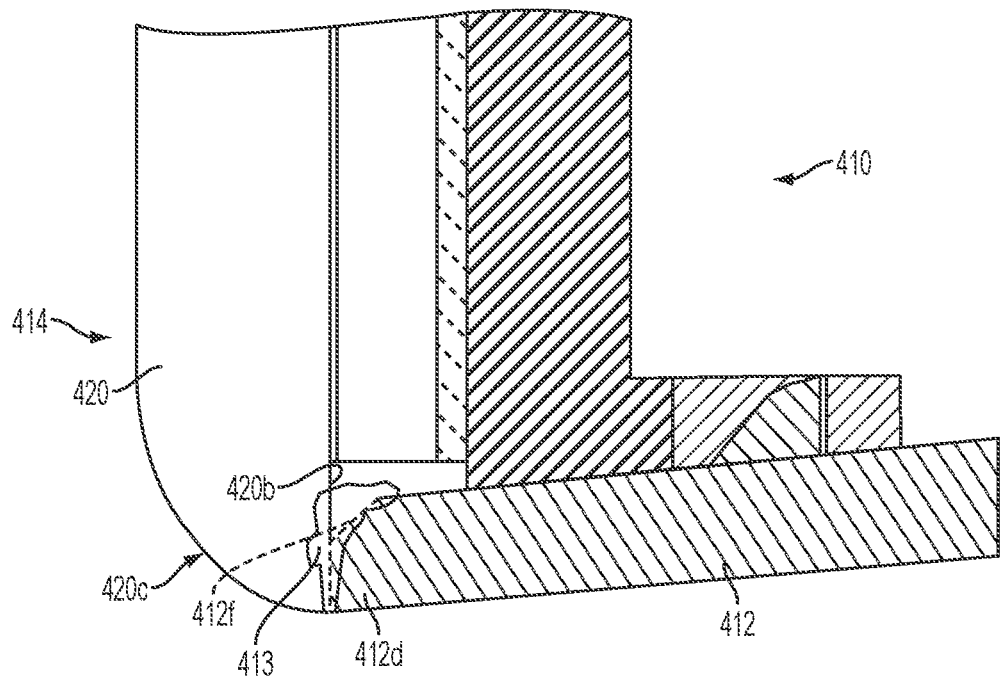

Optionally, and with reference to FIG. 8C, a mirror assembly 310" may include a mirror casing 312" that has an adhesive layer 313 disposed or dispensed at its outer edge or end region 312d" to adhere to the second or rear surface 320b of front substrate 320 of reflective element 314 when the attachment plate 340 is attached or snapped to the mirror casing 312". The adhesive may comprise any suitable adhesive, and may provide a quick set or partial cure that holds the mirror casing to the glass surface of the front substrate during the curing of the adhesive (or optionally, fixturing or a second rapid set, rapid cure adhesive may be disposed at the interface between the mirror casing and the glass) to hold the substrate and mirror casing together until the adhesive 313 is fully cured. Optionally, and with reference to FIG. 8D, a mirror assembly 410 may include a mirror casing 412 that has a notch or chamfer 412f formed at its outer end region 412d and the notch may be filled with a gap filler material 413 (such as a soft elastomeric material or an adhesive or the like) disposed between the notched end region of the mirror casing and the rear surface 420b of the front substrate 420 of the mirror reflective element 414. The front casing portions thus may abut or contact the rear surface of the front substrate with the adhesive or gap filler material disposed thereat and/or therebetween to seal the mirror casing at and against the rear surface of the front substrate and to provide a sealed gap-less transition between the outer surface of the mirror casing 412 and the beveled outboard or front perimeter or curved edge or surface 420c of the front substrate 420 of the reflective element 414. The mirror assemblies 310" and 410 may be otherwise similar in construction to mirror assemblies 210, 310, 310' discussed above, such that a detailed discussion of the mirror assemblies need not be repeated herein.

Figure 8E:
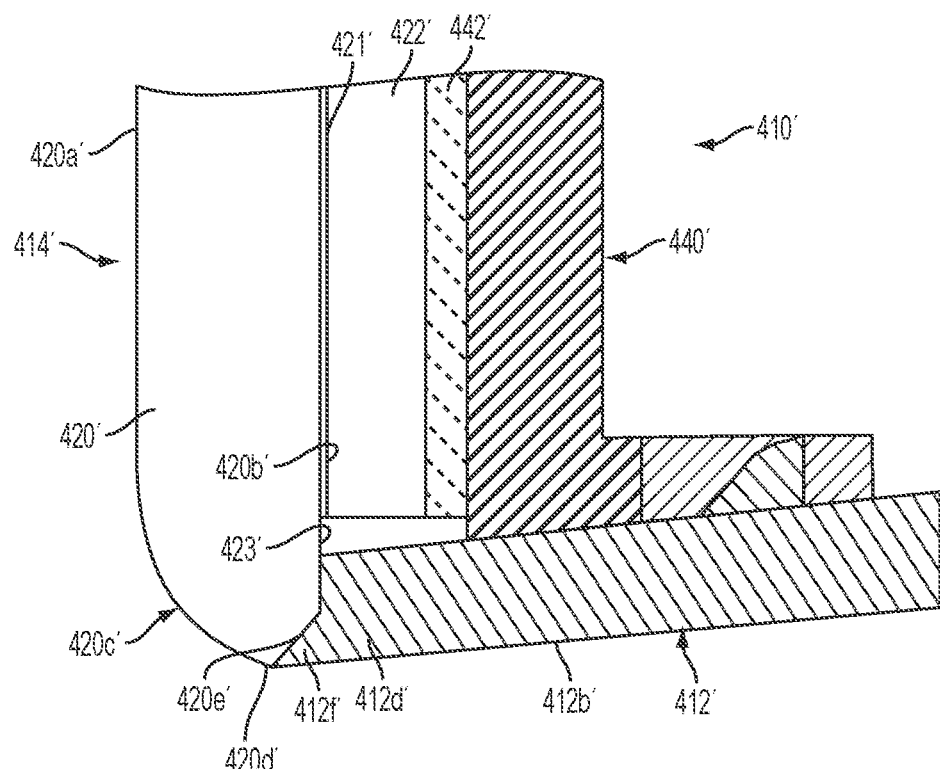

Optionally, and with reference to FIG. 8E, a mirror assembly 410' may include a mirror reflective element 414' adhered to or attached to a mirror casing 412', such as via an adhesive tape 442' disposed between the mirror reflective element and an attachment portion or surface 440 of the mirror assembly (such as an attachment portion that is formed as part of the mirror casing or that is attached to the mirror casing or the like). In the illustrated embodiment, the mirror casing 412' has a slanting edge configuration, such as a bevel or chamfer-like configuration or protrusion configuration 412f' formed at its outer end or front portion or region 412d', and the mirror reflective element 414' may include a front substrate 420' that has a formed or slanting inboard perimeter or slanting edge configuration or rear perimeter edge-portion 420e', such as a bevel or chamfer-like configuration or notch or recess or curvature or the like, established at the perimeter region of the rear surface 420b' of the mirror substrate. The slanted rear perimeter edge-portion 420e' of the substrate 420' and the slanted outer portion 412f' at mirror casing 412' correspond to one another or generally engage or mate with one another and allow the rear portion of the front substrate 420' to engage and nest or partially nest in or at the end region 412d' of mirror casing 412' when the attachment plate 440' is attached to mirror casing 412', such as in a similar manner as described above, with the rear substrate 422' and reflecting surface 421' disposed in or enclosed in the protective housing or mirror casing 412'. The front surface 420a' of front substrate 420' includes a beveled outboard or front perimeter or outer curved front edge or surface or bevel 420c' (that may be ground or otherwise formed or established) that provides a smooth or convex-curved transition surface between the front surface 420a' of the reflective element 414' and the exterior surface 412b' of the end formation 412f' of the mirror casing 412' (which is generally coplanar or generally flush with the rear perimeter edge dimension 420d' of front substrate 420' when the mirror reflective element 414' is partially received in the mirror casing 412' and when the formed inboard perimeter 420e' is received in or aligned with or mated with the formed end region 412d' of mirror casing 412').

As used herein, the term "slanted" or "slanting" for the slanted rear perimeter of the substrate and/or slanted outer element at the mirror casing is intended to encompass a straight slant or a curved slant (such as a convex curvature or concave curvature or multi-radius curvature) or any other form established at the rear perimeter of the glass substrate or the outer element at the mirror housing or casing. Such a slanting rear perimeter at the glass substrate can be formed, for example, by grinding (such as by using a glass-grinding diamond wheel or the like) the conventional straight edge of a substrate that conventionally connects or adjoins the second or rear surface of the substrate to the first or front surface of the substrate when a glass shape in the form of a typical interior rearview mirror is cut from a larger flat glass sheet that typically has a thickness in the range of about 1.1 mm thickness to about 2.3 mm thickness (typically having a thickness in the range of about 1.1 mm to about 1.6 mm or thereabouts) when the glass substrate is the front substrate of an electrochromic mirror construction.

Thus, when the reflective element is attached at or disposed at the mirror casing or housing or holder or shroud or cap or element, the edge of the reflecting surface 421' (at the front surface of the rear substrate of the reflective element) is enclosed in the protective housing 412' (or holder, etc.) and has, on its perimeter (at the beveled outboard leading perimeter edge or region 420c'), a radius of curvature greater than or equal to 2.5 mm at all points and in all directions. This is shown in FIG. 8E where the lip or protrusion 412f' of the formed outboard end 412d' of protective housing 412' extends or protrudes outward beyond the reflecting surface 421' so that the edge of the reflecting surface 421' is enclosed by and recessed in the mirror housing or casing and the lip or protrusion protruding therefrom. The reflecting surface is received within the mirror housing or protective housing and does not project beyond the end region 412d' of the protective housing. Optionally, an adhesive or gap filler may be disposed between the chamfered rear surface 420b' of front substrate 420' and the chamfered end region 412d' of mirror casing 412', such as in a similar manner as described above. The bevel 420c' of front substrate 420' provides a smooth curved transition between the generally planar principal surface 420a' of front substrate 420' and the outer surface 412b' of the mirror casing or housing 412', and optionally, the outer surface of the protruding end region of the mirror casing may be curved to correspond to or be generally flush with or coplanar with the curved surface of the bevel of the front substrate to provide a smooth transition between the mirror casing surface and the generally planar principal surface of the front substrate of the mirror reflective element. Optionally, the mirror assembly 410' may include a concealing layer or border layer or coating 423' along the perimeter of the rear surface 420b' of the front substrate 420' (and the concealing layer may be disposed over the perimeter region of the generally planar rear surface and over the chamfered or formed rear or inboard perimeter region of the mirror substrate) to conceal or render covert or hide the outer or forward edge or lip of the mirror casing and the perimeter seal from view by a person viewing the reflective element when the mirror assembly is normally mounted in a vehicle. The mirror assembly 410' may be otherwise similar in construction to mirror assemblies 210, 310, 310', 310", 410 discussed above, such that a detailed discussion of the mirror assemblies need not be repeated herein.

Thus, the present invention provides a mirror casing that partially receives an electrochromic reflective element therein (such as receiving the rear substrate and electrochromic medium and reflecting surface and the like in the mirror housing or casing), with a front substrate of the reflective element extending beyond the rear substrate along the periphery of the reflective element and with a rear surface of the front substrate at its periphery engaging or abutting or approaching the outer end region of the mirror casing. The front substrate includes a curved or rounded perimeter edge about the periphery of the front surface to satisfy regulation requirements and to provide a smooth transition between the generally planar front surface of the front substrate and the outer surface of the mirror casing. In the electrochromic mirror assemblies discussed above, the reflecting surface is received in the mirror housing, with the edge of the front substrate of the mirror having on its perimeter a radius of curvature greater than or equal to about 2.5 mm (such as about 3 mm or thereabouts) at all points and in all directions, and thus the mirror assemblies satisfy the requirements of ECE Regulation No. 46, incorporated by reference above, and the perimeter band may hide or conceal the outer or forward edge or lip of the mirror casing and the perimeter seal from view by a person viewing the reflective element when the mirror assembly is normally mounted in a vehicle.

Figure 9:
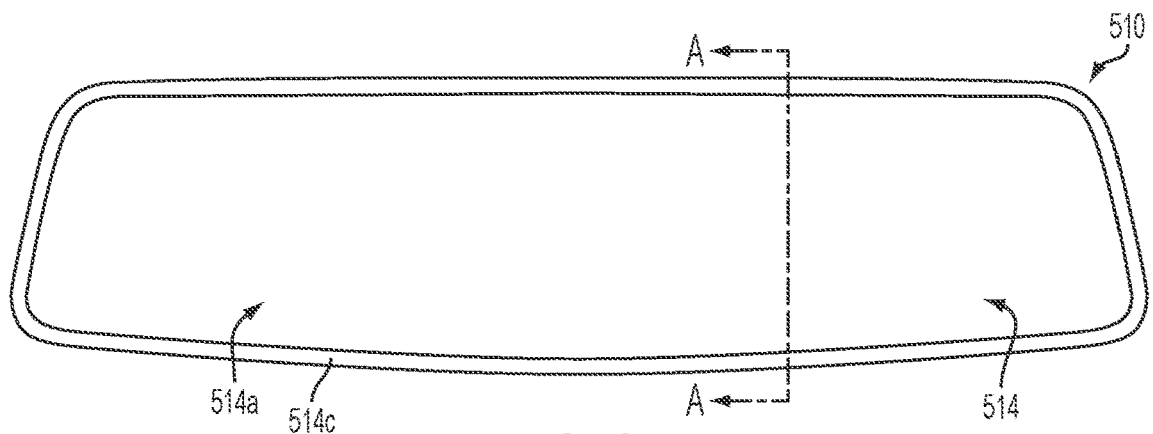
FIG. 9 is a front elevation of a prismatic interior rearview mirror assembly of the present invention.
Figure 9A:
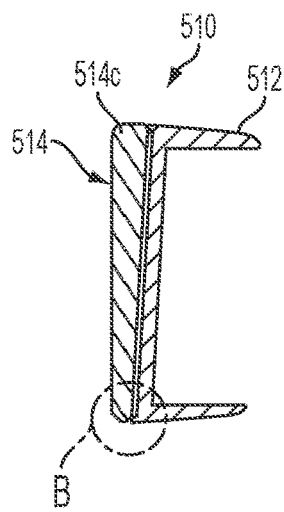
FIG. 9A is a sectional view of the prismatic interior rearview mirror assembly, taken along the line A-A in FIG. 9.

Optionally, an interior prismatic mirror assembly of the present invention may include a prismatic reflective element that has rounded or curved perimeter edges to provide a smooth transition between the generally planar front surface of the prismatic reflective element and the outer surface of the mirror casing (such as by utilizing aspects of the mirror assemblies described in PCT Application No. PCT/US2010/ 032017, filed Apr. 22, 2010, which is hereby incorporated herein by reference in its entirety). For example, and with reference to FIGS. 9, 9A and 9B, an interior prismatic mirror assembly 510 includes a mirror casing 512 and a prismatic reflective element 514 (having a prism or wedge-shaped glass substrate with a mirror reflector coating or layer or reflecting surface 521 disposed at its rear surface 514b and optionally with a perimeter layer or coating or band or concealing layer disposed about the perimeter to conceal or render cover the presence of the mirror casing to a person viewing the front surface 514a of the prismatic reflective element 514 of the mirror assembly). The perimeter edge of the prismatic reflective element 514 comprises a rounded or curved perimeter edge 514c to provide a smooth convex-curved transition between the generally planar front surface 514a of the reflective element and the outer surface 512b of the mirror casing 512, such as in a similar manner as described above and such as in a similar manner as described in PCT Application No. PCT/US2010/032017, filed Apr. 22, 2010, which is hereby incorporated herein by reference in its entirety. In the illustrated embodiment, the mirror casing 512 is formed with an attachment plate 540 that is attached or adhered at the rear surface 514b of reflective element 514, such as at an anti-scatter tape 542 or the like disposed at and/or adhered to the rear surface of the reflective element, such as in a known manner. The mirror casing and attachment plate may be unitarily or integrally formed or molded together, such as by utilizing aspects of the mirror assemblies described in PCT Application No. PCT/US2010/032017, filed Apr. 22, 2010, which is hereby incorporated herein by reference in its entirety.

Figure 9B:
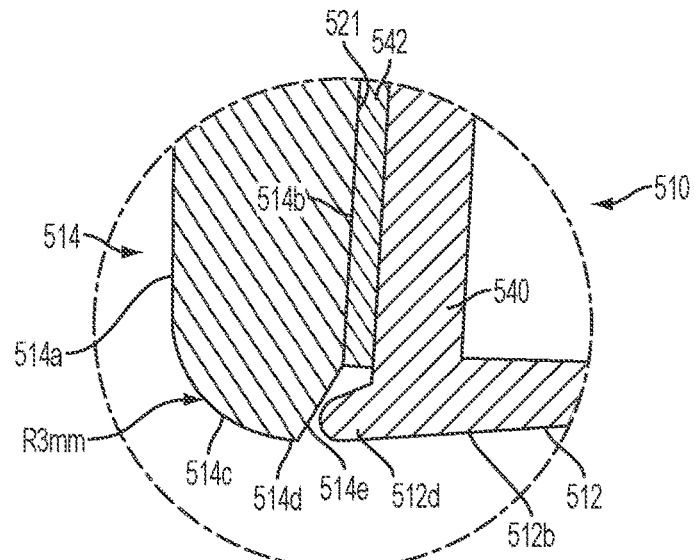
FIG. 9B is an enlarged view of the area B in FIG. 9A.

Optionally, and as shown in FIG. 9B, the outer end region of mirror casing 512 may include a protrusion or lip 512d that protrudes outwardly from the attachment surface of the attachment plate portion 540 of mirror casing 512, and the rear surface 514b of reflective element 514 may have a chamfer or notch or rear perimeter edge-portion 514e around its rear perimeter to accommodate the protrusion 512d when the reflective element 514 is attached or adhered to the mirror casing 512. The protrusion at the outer end or edge region of the mirror casing may be rounded to avoid having a sharp edge at the outer surface of the perimeter of the mirror casing, but optionally, other shapes may be established at the outer edge region of the mirror casing while remaining within the spirit and scope of the present invention. Optionally, the protrusion at the outer end or edge region of the mirror casing or protective housing may be formed to engage with the chamfered rear perimeter edge-portion of the reflective element (such as shown and described above with respect to FIG. 8E). The reflective element 514' may have a perimeter band or concealing layer about the perimeter region of its rear surface 514b' so that the mirror casing 512' and chamfered perimeter region 514e' are not discernible or viewable to a person viewing the front surface 514a' of reflective element 514' when the mirror assembly 510' is normally mounted in a vehicle. As can be seen in FIG. 9B, the reflecting surface 521 is received in the mirror housing (and inboard of or enclosed by the protrusion at the forward end of the mirror housing), with the edge of the prismatic mirror substrate of the mirror having on its perimeter a radius of curvature greater than or equal to about 2.5 mm (such as about 3 mm or thereabouts) at all points and in all directions.

Thus, the present invention provides a mirror casing that partially receives a prismatic reflective element therein (such as receiving a rear portion of the prism or substrate and reflecting surface in the mirror housing or casing), with a front portion of the reflective element extending beyond reflecting surface along the periphery of the reflective element and with a rear surface of the prism or substrate at its periphery engaging or abutting or approaching the outer end region of the mirror casing. The prism or substrate includes a curved or rounded perimeter edge or bevel about the periphery of the front surface to satisfy regulation requirements and to provide a smooth transition between the generally planar front surface of the mirror substrate and the outer surface of the mirror casing. In the prismatic mirror assembly discussed above, the reflecting surface is received in the mirror housing, with the edge of the prism or substrate of the mirror having on its perimeter a radius of curvature greater than or equal to about 2.5 mm (such as about 3 mm or thereabouts) at all points and in all directions, and thus the mirror assemblies satisfy the requirements of ECE Regulation No. 46, incorporated by reference above, and a perimeter band may hide or conceal the outer or forward edge or lip of the mirror casing from view by a person viewing the reflective element when the mirror assembly is normally mounted in a vehicle.

Figure 10A:
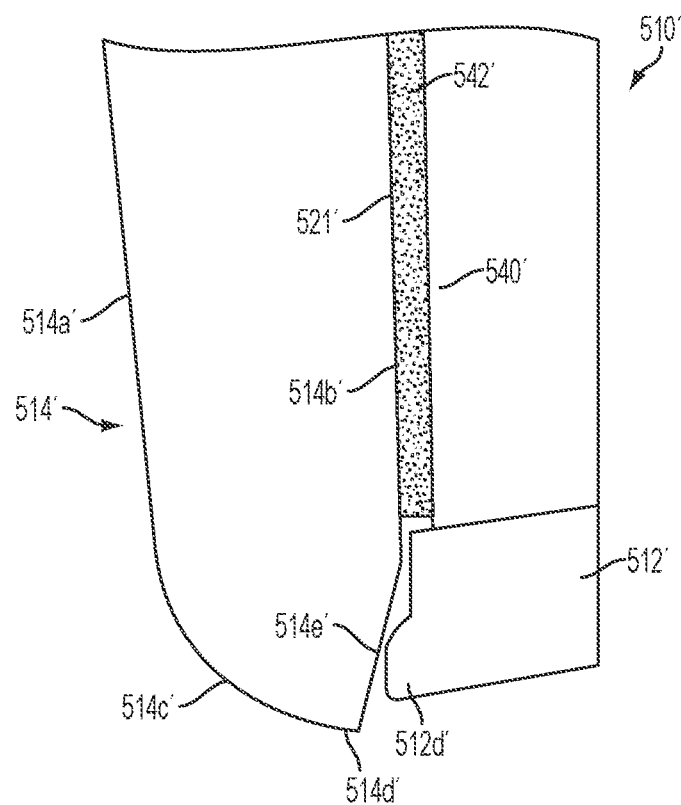
FIGS. 10A-E are enlarged views of the lower edge of other prismatic interior rearview mirror assemblies of the present invention.

Referring now to FIG. 10A, a mirror assembly 510' includes a mirror reflective element 514' that has its reflecting surface 521' at the rear surface 514b' of the reflective element received in the mirror casing 512', with the mirror casing 512' including a protrusion or lip 512d' that protrudes beyond the reflecting surface or reflector 521', such as in a similar manner as described above. Optionally, and as shown in FIG. 10A, the outer perimeter edge 514d' (at the outboard perimeter region of the curved perimeter region or bevel 514c') of the reflective element 514' may extend outwardly beyond or outboard of the protrusion or lip 512d' of mirror casing 512', or may be generally flush with the protrusion or lip of the mirror casing or protective housing, depending on the particular application and desired appearance of the mirror assembly. Optionally, and as also shown in FIG. 10A, the mirror reflective element 514' of mirror assembly 510' may be adhered to the mirror casing 512' (or to an attachment plate or the like that may be attached to or part of the mirror casing or protective housing) via a layer of urethane adhesive 542' or other suitable adhesive disposed between the rear surface 514b' of reflective element 514' and the attachment surface 540' of mirror casing 512'. The urethane adhesive may comprise a thermosetting moisture cured hot melt urethane adhesive or other suitable adhesive (such as a UV cured adhesive or the like) and may be disposed as a relatively thick layer between the rear surface 514a' of reflective element 514' and the attachment surface 540' of mirror casing 512' (or to a separate attachment plate of the mirror assembly or the like). The urethane adhesive may be applied to the attachment surface of the mirror casing or to the rear surface of the reflective element. The application of the urethane adhesive may obviate placement constraints and requirements typically implemented for accurate application of a foam adhesive or the like, and may reduce the costs associated with attaching the reflective element to the mirror casing or attachment plate.

Figure 10B:
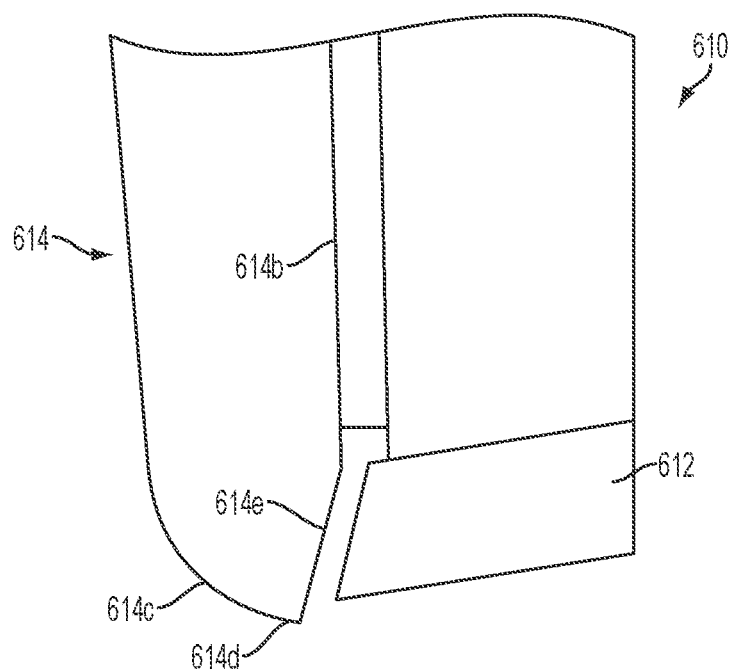
Figure 10C:
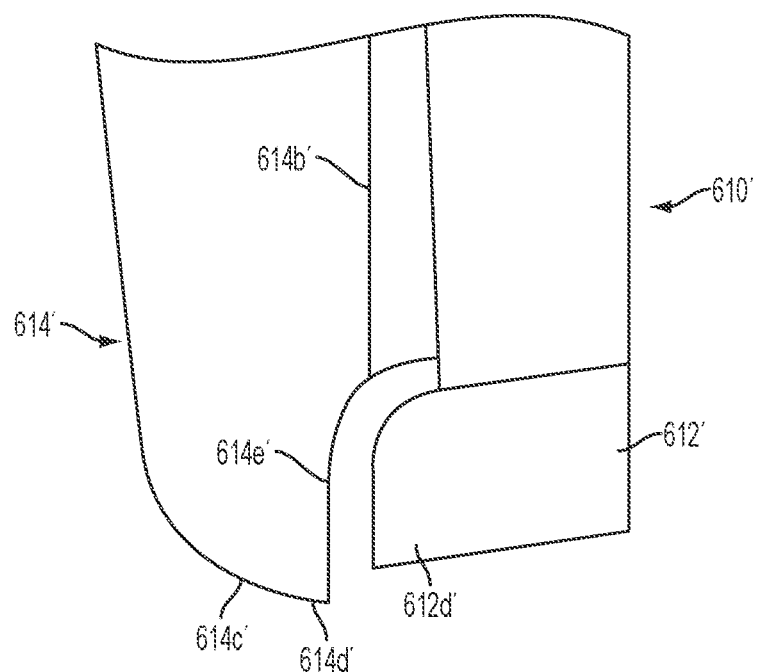

For example, and with reference to FIG. 10B, a mirror assembly 610 may include a mirror casing 612 with a chamfered or angled outer edge region or element 612d, with the angle of the chamfered edge region 612d of mirror casing 612 generally corresponding with a large angle or chamfer or rear perimeter edge-portion 614e of a chamfered or angled rear surface 614b of prismatic reflective element 614. Optionally, and with reference to FIG. 10C, a mirror assembly 610' may have a mirror casing 612' with a curved or rounded end or edge region 612d' and a prismatic reflective element 614' with a curved or rounded notch or recess or rear perimeter edge-portion 614e' established at its rear surface 614b' and around the perimeter region of the reflective element. The chamfered region of the reflective element may be slightly spaced from or may abut against the chamfered edge region of the mirror casing or protective housing, and optionally the mirror assembly may include an adhesive or sealant or resilient element disposed between the chamfered region of the reflective element and the chamfered edge region of the mirror casing or protective housing. Optionally, the outboard perimeter edge 614*d*, 614*d*' at the rear of the curved bevel 614*c*, 614*c*' of the reflective element 614, 614' may be outboard of the outer surface of the mirror casing 612, 612' (such as shown in FIGS. 10B and 10C) or the outboard perimeter edge at the rear of the curved bevel may be generally flush with the outer surface of the mirror casing. The chamfered or recessed region at the periphery of the rear surface of the reflective element may have the reflector coating removed therefrom during the forming or grinding process, and thus, a person (such as the driver of the vehicle when normally operating the vehicle) may see a darkened ring around the periphery of the reflective element due to the viewability of the end region of the mirror casing through the reflective element when the reflector coating is removed from the perimeter region of the reflective element. Optionally, a coating process may be performed after the chamfer or recess is formed at the rear of the reflective element to provide a reflective coating or layer or a concealing coating or layer around the perimeter of the rear surface of the reflective element, depending on the particular application and desired appearance of the mirror assembly.

Figure 10D:
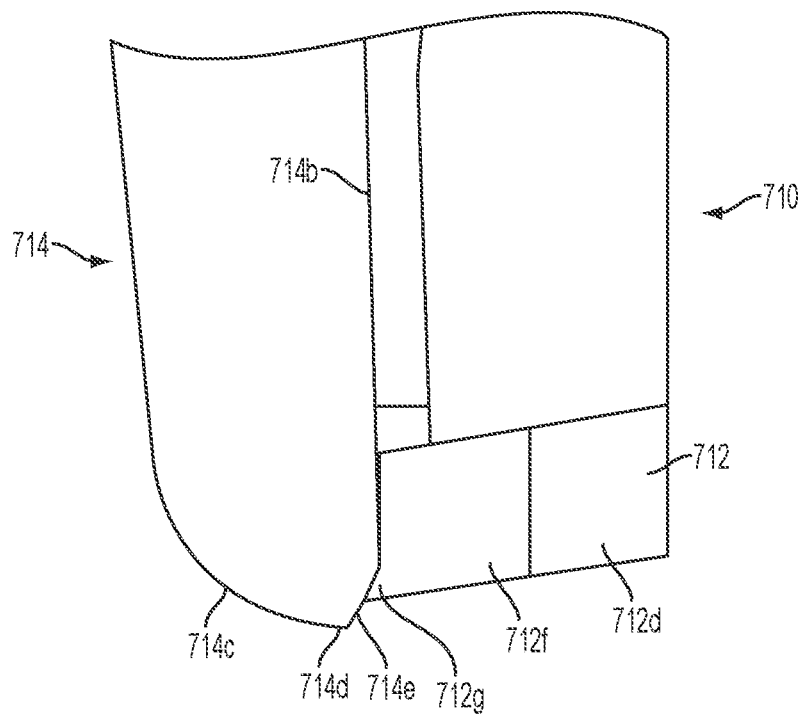

Optionally, the outer end or edge of the mirror casing may be formed or constructed to attach to or abut against or conform with the rear surface of the reflective element. For example, and as shown in FIG. 10D, the mirror casing 712 of a prismatic mirror assembly 710 may have an overmolded end or front region 712*d*, with an elastomeric or resilient rim portion 712*f* (such as an overmolded santoprene material or the like) molded over end region 712*d* to provide a cushion and/or seal between the end region 712*d* and the rear surface 714*b* of reflective element 714. The resilient or soft portion 712*f* may comprise any suitable softer or lower durometer hardness material as compared to the harder plastic mirror casing 712. The overmolded portion 712*f* of the front casing portion 712*d* thus abuts or contacts (and may compress against) the rear surface 714*b* of reflective element 714 to seal against the rear surface 714*d* and provide a sealed gap-less transition between the mirror casing and the curved edge or surface 714*c* of reflective element 714. Optionally, and as shown in FIG. 10D, the rear surface 714*d* of reflective element 714 may have a chamfer or notch or rear perimeter edge-portion 714*e* formed at its perimeter region and the overmolded portion 712*f* may have a protrusion or portion 712*g* that conforms with the notched or chamfered portion or rear perimeter edge-portion 714*e* of rear surface 714*b* of reflective element 714 to engage the rear surface of the reflective element when the reflective element is attached at the mirror casing. The chamfered region of the reflective element may be slightly spaced from or may abut against the chamfered resilient portion at the end region of the mirror casing or protective housing, and optionally the mirror assembly may include an adhesive or sealant or resilient element disposed between the chamfered region of the reflective element and the chamfered resilient portion at the end region of the mirror casing or protective housing. Optionally, the outboard perimeter edge 714*d* at the rear of the curved bevel 714*c* of the reflective element 714 may be outboard of the outer surface of the resilient element 712*f* and/or the mirror casing 712 (such as shown in FIG. 10D) or the outboard perimeter edge at the rear of the curved bevel may be generally flush with the outer surface of the resilient element and/or of the mirror casing.

Figure 10E:
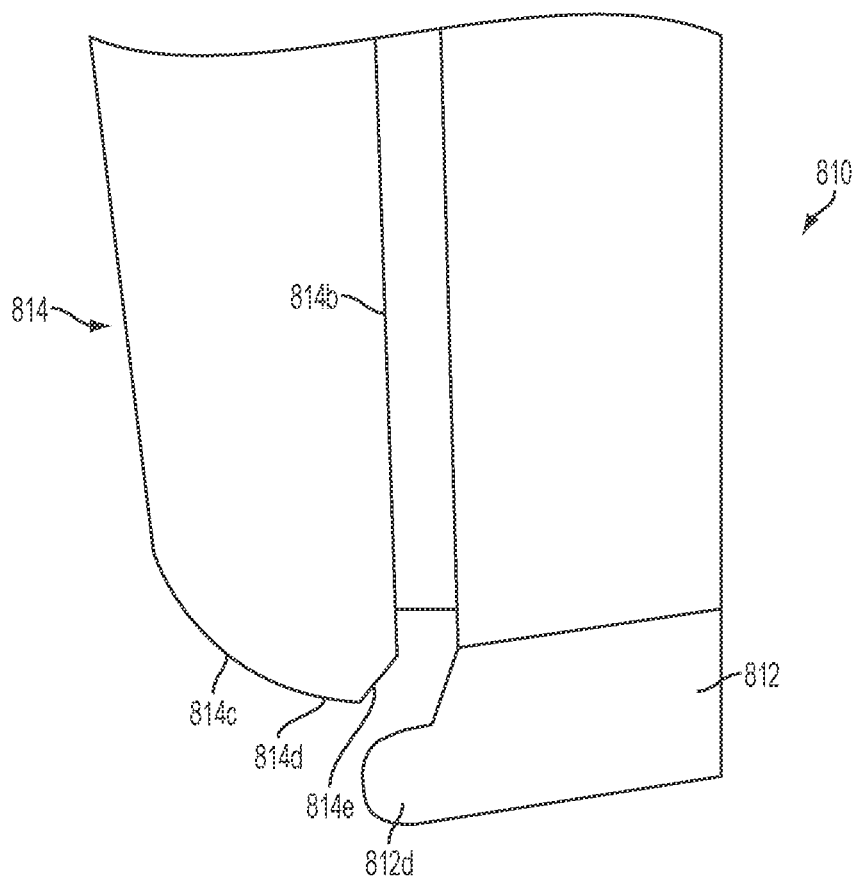

Optionally, and as shown in FIG. 10E, the mirror casing 812 of a mirror assembly 810 may extend outboard of the perimeter edge of the reflective element 814, with a protrusion or lip 812*d* extending partially around and along the perimeter edge 814*d* of the reflective element 814 (with the bevel 814*c* of reflective element 814 being inboard of the protrusion or lip 812*d*), which may include a chamfer or notch or rear perimeter edge-portion 814*e* formed at its perimeter region at its rear surface 814*b*. In such an embodiment, the prismatic reflective element may be cut smaller to fit within the perimeter lip 812*d* of mirror casing 812, and the thickness of the prismatic reflective element may be reduced, since a full radius may not be required, thus achieving a reduced weight for the mirror assembly. The chamfered region or rear perimeter edge-portion of the reflective element may be slightly spaced from or may abut against the protrusion at the end region of the mirror casing or protective housing, and optionally the mirror assembly may include an adhesive or sealant or resilient element disposed between the chamfered region of the reflective element and the protrusion at the end region of the mirror casing or protective housing. The mirror assemblies 710', 810 may be otherwise similar in construction to mirror assemblies 510, 310', 610, 710 discussed above, such that a detailed discussion of the mirror assemblies need not be repeated herein.

In the prismatic mirror embodiments discussed above, the reflecting surface is received in the mirror housing, with the edge of the prismatic mirror substrate of the mirror having on its perimeter a radius of curvature greater than or equal to about 2.5 mm (such as about 3 mm or thereabouts) at all points and in all directions. The present invention provides a mirror casing that partially receives a prismatic reflective element therein (such as receiving a rear portion of the prism or substrate and reflecting surface in the mirror housing or casing), with a front portion of the reflective element extending beyond reflecting surface along the periphery of the reflective element and with a rear surface of the prism or substrate at its periphery engaging or abutting or approaching the outer end region of the mirror casing. The prism or substrate includes a curved or rounded perimeter edge or bevel about the periphery of the front surface to satisfy regulation requirements and to provide a smooth convex-curved transition between the generally planar front surface of the mirror substrate and the outer surface of the mirror casing. In the prismatic mirror assembly discussed above, the reflecting surface is received in the mirror housing (and rearward of the outer end of the mirror casing and/or a protrusion protruding from the mirror casing), with the edge of the prism or substrate of the mirror having on its perimeter a radius of curvature greater than or equal to about 2.5 mm (such as about 3 mm or thereabouts) at all points and in all directions, and thus the mirror assemblies satisfy the requirements of ECE Regulation No. 46, incorporated by reference above, and optionally a perimeter band may be disposed at the perimeter region of the rear surface of the reflective element substrate to hide or conceal the outer or forward edge or lip or protrusion of the mirror casing from view by a person viewing the reflective element when the mirror assembly is normally mounted in a vehicle.

The interior rearview mirror assemblies of the present invention thus provide enhanced aesthetically pleasing appearances and may provide increased reflective/viewing areas at the mirror assemblies, since the mirror assemblies do not include a bezel portion or the like that overlaps the perimeter region of the front surface of the front substrate of the reflective element. The mirror assemblies of the present invention may also provide for smaller mirror assemblies and thus increased forward vision around the mirrors (such as, for example, an increase of about 15-25 percent around the interior mirror assembly) while providing a given rearward field of view to the driver of the vehicle (and thus may provide a mass reduction (such as, for example, of about 10-12 percent) as compared to conventional mirror assemblies), due to the frameless or non-bezel construction and/or due to the inclusion of capacitive sensors/buttons/inputs at and behind the reflective element instead of separate buttons at a chin portion of the bezel or mirror casing. For example, for two mirror assemblies providing a given rearward field of view or reflector size, the mirror assembly of the present invention (without any bezel or buttons outside of the reflecting surface or viewing area of the mirror assembly) may provide an overall mirror size decrease of about 3,000 square millimeters (which may provide about a 24 percent reduction in the mirror size). Also, the present invention provides unique styling resulting from the prismatic glass reflecting surface being bonded directly to the mirror case, thereby resulting in a one piece mirror head assembly. Also, the polished glass edge of the mirror reflective element of the present invention may provide a stronger reflective element substrate (such as about 65 percent stronger) as compared to a conventional cut edge glass substrate due to the removal or reduction of edge stress points and/or microfractures. The present invention may provide these enhancements in appearance and durability and size/weight, all while satisfying the requirements of the ECE Regulation No. 46. Although the substrates of the mirror assemblies discussed herein are described as glass substrates, clearly, the mirror substrates may be formed of a polymeric resin material, such as a transparent water clear optical plastic, such as a polycarbonate material or acrylic material or the like, while remaining within the spirit and scope of the present invention. In such polymeric substrate applications, the beveled front perimeter and slanted rear perimeter edge-portion can be established during the forming of the polymeric substrate, such as by injection molding in a suitably constructed and designed injection molding tool, such as in a manner known in the injection molding art.

Figure 20A:
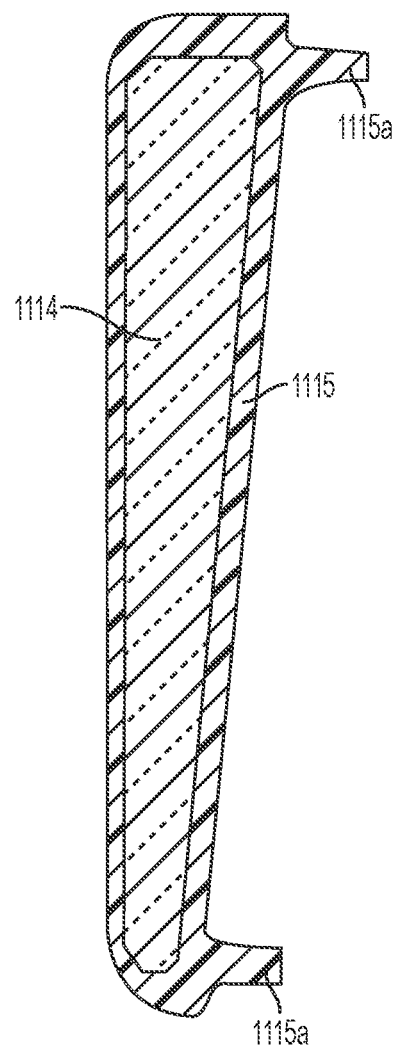
FIGS. 20A-N are sectional views of other interior rearview mirror assemblies of the present invention.
Figure 20B:
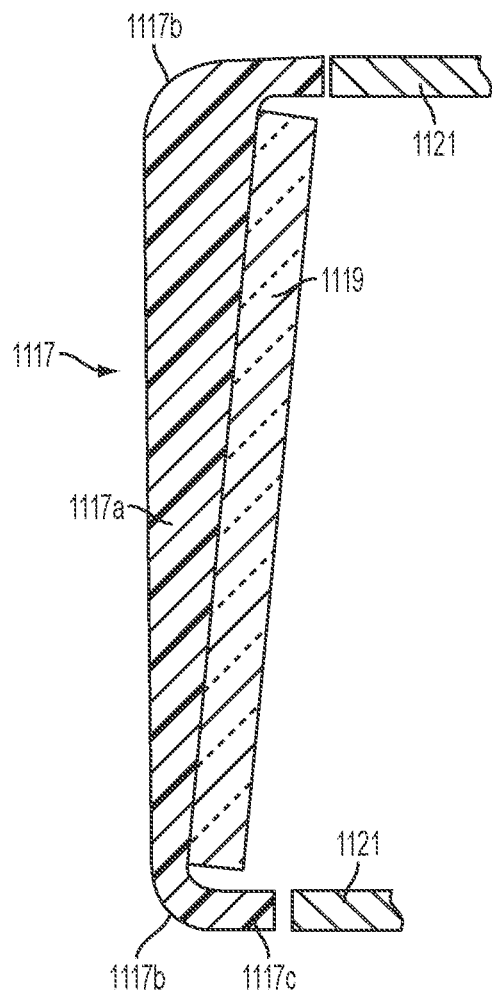
Figure 20C:
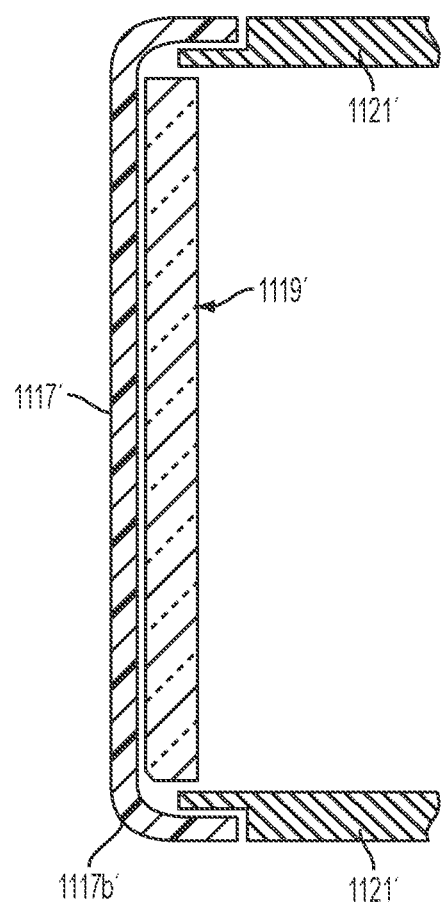

Optionally, other means may be implemented to provide a mirror assembly with a circumferential curved or beveled front perimeter at the mirror reflective element. For example, and with reference to FIG. 20A, an interior prismatic mirror assembly may include a typical prismatic interior rearview mirror glass reflective element 1114, which may be enclosed or encased or encapsulated within a see-through clear plastic encapsulation 1115 (such as a clear plastic optical grade acrylic or PMMA or optical grade polycarbonate to provide a water clear encapsulation), which may be configured with curved or rounded or beveled outer or front perimeter regions. For example, a conventional interior prismatic mirror element may be loaded into an injection mold and an optical grade polymeric resin may be integrally molded around the mirror element. Optionally, the encapsulation may be selected to have a degree of resilience or impact resistance to enhance the safety features of the mirror assembly. The encapsulation 1115 is configured to attach to the remainder of the mirror casing or housing or the like, such as via insertion of mounting flanges or tabs 1115a of encapsulation 1115 into a receiving or attaching portion of the mirror casing or housing or attachment plate or the like. Optionally, and as shown in FIG. 20B, an optically clear or transparent plastic encapsulation or cover 1117 may be disposed over the front surface of a reflective element substrate 1119 (which may be prism-shaped). The encapsulation or cover 1117 may have a wedge-shaped or prism-shaped cover portion 1117a at and over the front surface of the substrate 1119, and may have a rounded or curved or beveled outer or front perimeter regions 1117b and attachment portions or flanges 1117c for attaching to the mirror casing or housing or attachment plate 1121 or the like. Optionally, and as exemplified in FIG. 20C, a mirror reflective element 1119' (which may comprise a prismatic reflective element or an electro-optic reflective element) may be disposed within a clear plastic cover element 1117', which is curved or formed or configured to encompass or encapsulate the perimeter of the reflective element and to attach to the outboard or forward end region of the mirror casing or holder 1121'. Although shown as spaced from the reflective element 1119', the plastic cover element 1117' may be disposed at and in contact with the front surface of the reflective element and/or may be optically coupled with the front surface of the reflective element, such as via a suitable optical adhesive or the like disposed between the cover element and the front surface of the reflective element. Optionally, and desirably, the curved or beveled front perimeter 1117b' of cover element 1117' may have a concealing layer or finish or the like (such as a film or paint or the like) disposed at either the front or rear surface of the cover element 1117' to conceal or render covert the presence of the perimeter of the reflective element and the mirror casing or housing or holder to a driver of the vehicle when the mirror assembly is normally mounted at the vehicle.

Figure 20D:
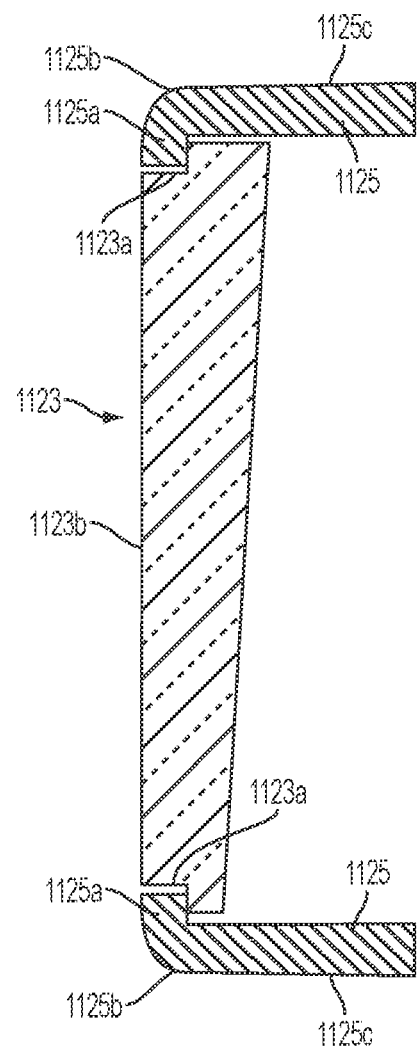

Optionally, and with reference to FIG. 20D, a prismatic reflective element 1123 may have a prism-shaped substrate with notches or recesses 1123a established at the front perimeter regions of the substrate, and a mirror housing or holder or casing or bezel 1125 may be formed to have forward lips or flanges 1125a that are received in notches or recesses 1123a when reflective element 1123 is received in the mirror holder, whereby the mirror holder 1125 has a curved front perimeter 1125b to provide a smooth convex-curved transition from the outer surface of the side portions 1125c of the mirror holder to the generally planar front surface 1123b of the reflective element 1123.

Figure 20E:
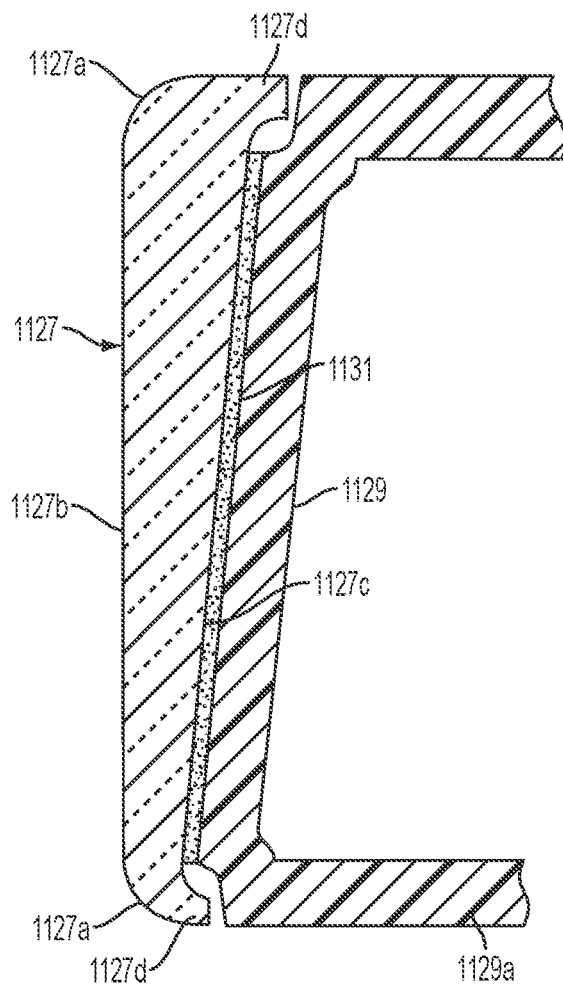

Optionally, and as exemplified in FIG. 20E, a cast glass prismatic reflective element 1127 has a rounded or curved or beveled front perimeter 1127a at the perimeter of its front surface 1127b and has its rear surface 1127c recessed, whereby side perimeter portions or protrusions 1127d extend rearwardly from the rear surface 1127c toward the mirror housing or attachment plate or holder 1129. The rear surface 1127c of reflective element 1127 is adhered to the plastic housing or attachment plate or holder 1129 via a layer of adhesive 1131 or the like. Thus, the cast prism has its reflecting surface (the rear surface 1127c) contained or enclosed within the perimeter of the glass substrate by the rearward extending perimeter portion 1127d of the glass substrate or prism 1127. The curved front perimeter 1127b provides a smooth curved transition from the outer surface of the side portions 1129a of the mirror holder 1129 to the generally planar front surface 1127b of the reflective element 1127.

Figure 20F:
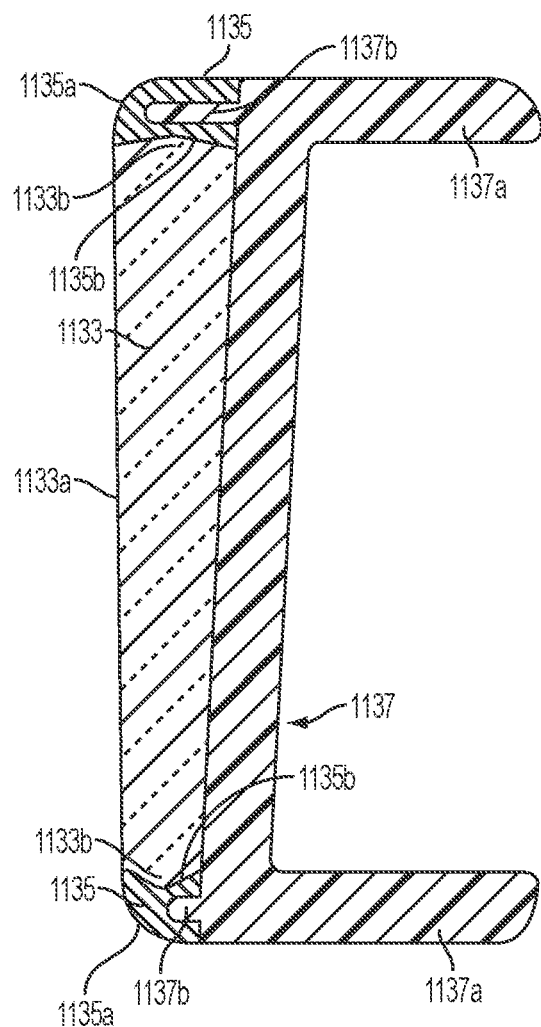
Figure 20G:
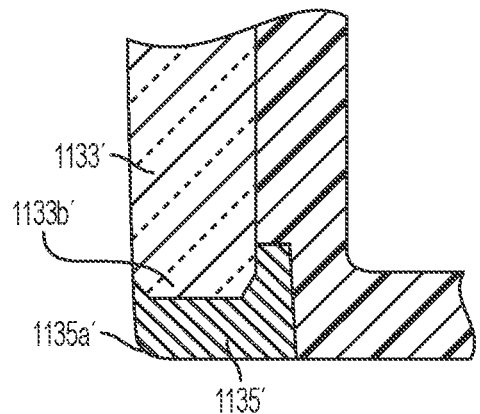
Figure 20H:
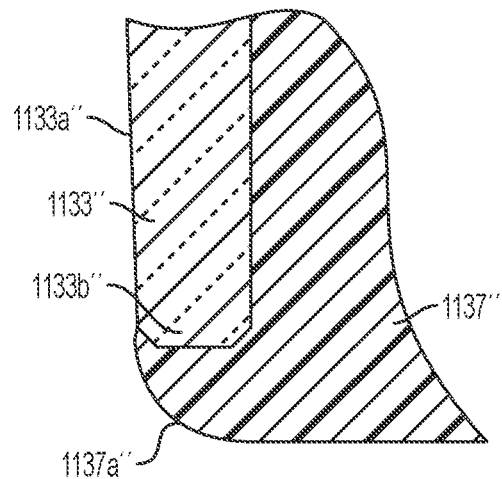

Optionally, and with reference to FIG. 20F, a prismatic reflective element 1133 is circumscribed or encased or surrounded along its perimeter by a soft or resilient element 1135, which may be attached to or overmolded at the plastic mirror casing or holder or attachment plate 1137. The resilient element 1135 may comprise a soft material, such as a material having less than a 50 Shore A durometer hardness, such as a rubber, silicone or thermoplastic elastomer (TPE) or the like. The soft or resilient element 1135 may have a rounded or beveled front perimeter 1135*a* (such as shown in FIG. 20F), and may provide a smooth curved transition between the outer surface of the side portions 1137*a* of the mirror holder 1137 to the generally planar front surface 1133*a* of the mirror reflective element substrate 1133. The resilient element 1135 may be overmolded at or over or along an element or protrusion 1137*b* of the mirror holder 1137. Optionally, the perimeter edge 1133*b* of the reflective element 1133 may be formed or shaped or contoured to engage or be received at the formed or shaped or contoured inner perimeter surface 1135*b* of resilient element 1135. Optionally, a resilient element 1135' (FIG. 20G) may be disposed at a reflective element 1133' and may have a smaller radius curved front perimeter 1135*a*' than the embodiments discussed above due to the softer quality of the resilient element (such as less than a 50 Shore A durometer hardness or the like) disposed around the perimeter edge region 1133*b*' of the reflective element 1133'. Optionally, and as shown in FIG. 20H, the mirror casing or holder 1137" may be formed to receive the reflective element substrate 1133" therein, with the mirror casing or holder 1137" having a rounded or curved or beveled front perimeter 1137*a*" that may slightly overlap a portion of the perimeter edge region 1133*b*" of the reflective element to provide a smooth convex-curved transition between the outer surface of the mirror holder to the generally planar front surface 1133*a*" of the mirror reflective element substrate 1133". Optionally, such configurations may be suitable for use with an electro-optic reflective element, such as an electrochromic reflective element, whereby the resilient element or mirror holder or casing may be disposed along the perimeter of the front substrate of the reflective element.

Figure 20I:
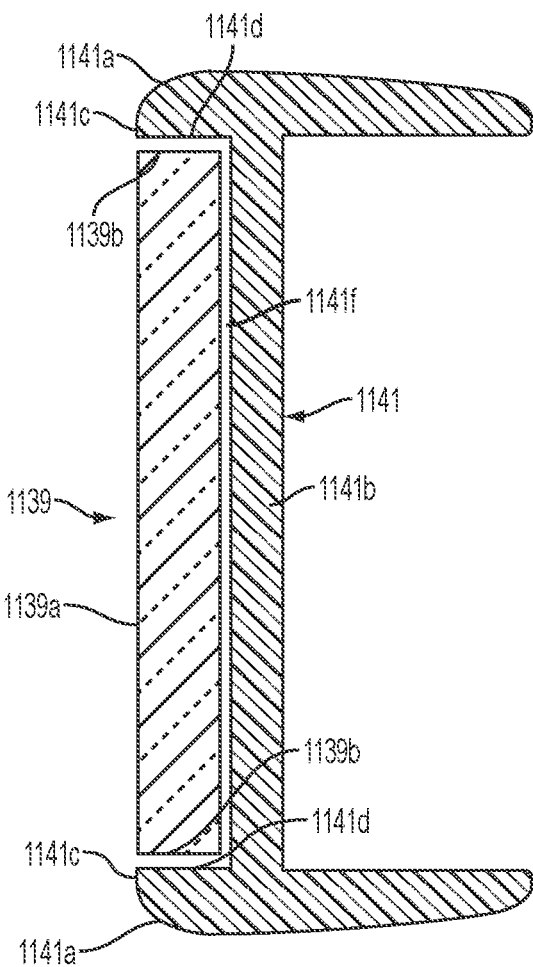
Figure 20J:
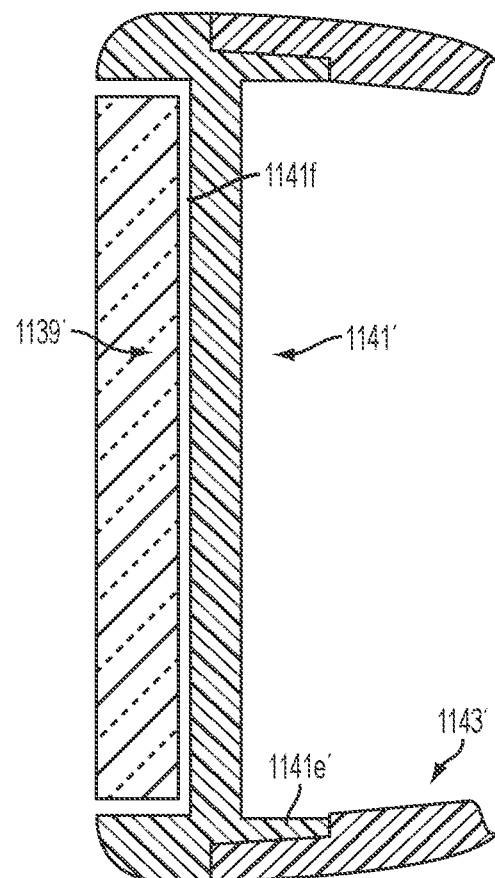
Figure 20K:
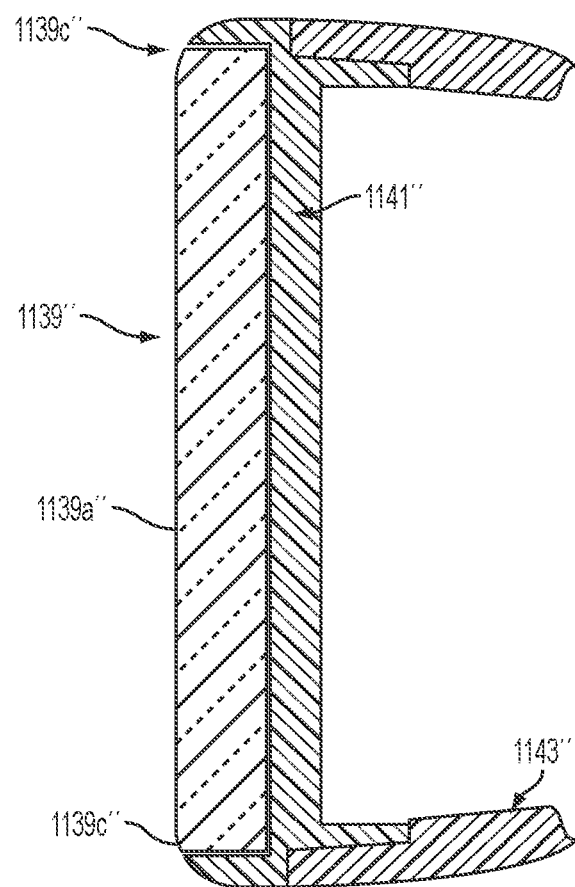

Optionally, and as exemplified in FIG. 20I, a mirror reflective element 1139 may be disposed at or received at or in a receiving portion 1141*f* of a mirror holder or casing 1141, where the mirror holder 1141 has a curved or beveled front perimeter 1141*a* that extends forwardly from an attaching portion 1141*b* of the mirror holder 1141 an amount so that the outer front portion 1141*c* of the front perimeter 1141*a* is generally at or coplanar with or flush with the front surface 1139*a* of the reflective element. The glass substrate 1139 may be cut, with an optionally polished perimeter edge and with a tight fit with the holder and with the perimeter edge 1139*b* of the substrate 1139 being at or engaging or contacting the inner perimeter surface 1141*d* of the mirror holder 1141. Optionally, the mirror holder or casing 1141 may be formed as a unitary housing or casing for the mirror assembly (as shown in FIG. 20I). Optionally, a mirror reflective element 1139' may be retained or held or received at a receiving portion 1141*f*' of a mirror holder or attachment element or casing portion 1141' (FIG. 20J) that may include attachment portions 1141*e*' for attaching the mirror holder or casing portion 1141' to a rear housing or casing or cap 1143' or the like of the mirror assembly (such as via a snap fit or fastenerless attachment or other suitable attachment means). Optionally, the mirror holder or attachment element 1141' may comprise a clear plastic attachment plate and the housing or casing or cap 1143' may comprise a black plastic (or other color or clear) element, depending on the particular application and desired appearance of the mirror assembly. Optionally, and as shown in FIG. 20K, the mirror substrate 1139" may have its front perimeter region 1139*c*" ground and/or polished to provide a slight radius at the front perimeter, and with the polished or radiused front perimeter region 1139*c*" providing a smooth curved transition between the outer surface of the mirror holder 1141" to the generally planar front surface 1139*a*" of the mirror reflective element substrate 1139". Optionally, the mirror holder or attachment element 1141" may comprise a clear plastic attachment plate and the housing or casing or cap 1143" may comprise a black plastic (or other color or clear) element, depending on the particular application and desired appearance of the mirror assembly. Such configurations may be suitable for use with either a prismatic reflective element or an electro-optic reflective element, such as an electrochromic reflective element.

Figure 20L:
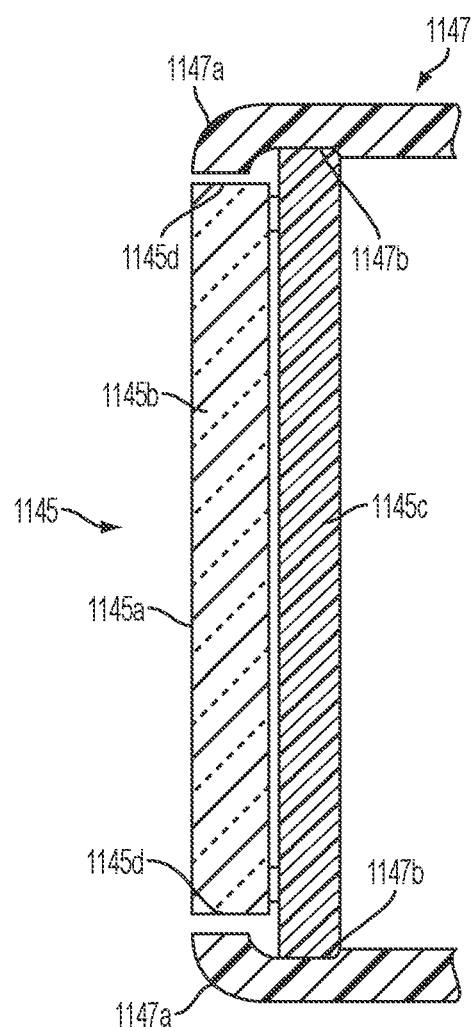
Figure 20M:
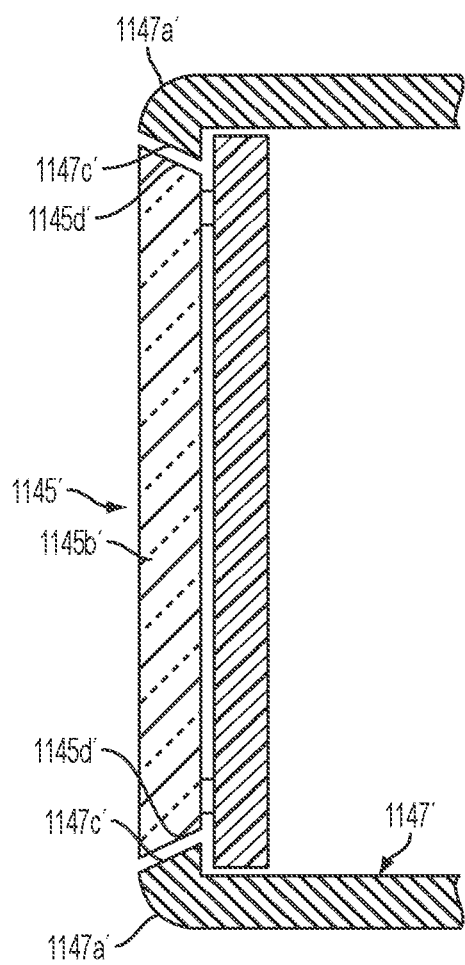

Optionally, and as exemplified in FIG. 20L, an electro-optic reflective element 1145 may be disposed at or received in a mirror holder or housing or casing 1147, and the mirror holder 1147 may have a curved outboard end portion or element 1147*a* that provides a smooth convex-curved transition between the outer surface of the mirror holder 1147 to the generally planar front surface 1145*a* of the front substrate 1145*b* of the electro-optic mirror reflective element 1145. The mirror holder is formed with a recess or groove or notch 1147*b* established at its inner surface to receive and support or retain the perimeter region of the rear substrate 1145*c* of the reflective element 1145 therein, so that the reflective element is retained at the mirror holder. The curved outboard end portion or element 1147*a* of mirror holder 1147 may curve or extend inboard toward the perimeter edge 1145*d* of the front substrate 1145*b*, which may have a smaller cross dimension than the rear substrate 1145*c*, as can be seen with reference to FIG. 20L. Optionally, and with reference to FIG. 20M, the curved outboard end portion or element 1147*a*' of the mirror holder 1147' may have an angled or slanted or otherwise formed or shaped perimeter 1147*c*', which may be formed to correspond to a slanted or angled or otherwise formed or shaped perimeter edge 1145*d*' of the front substrate 1145*b*' of the reflective element 1145'. Optionally, and as can be seen in FIG. 20M, the mirror holder 1147' may not include a groove or notch for receiving the perimeter regions of the rear substrate.

Figure 20N:
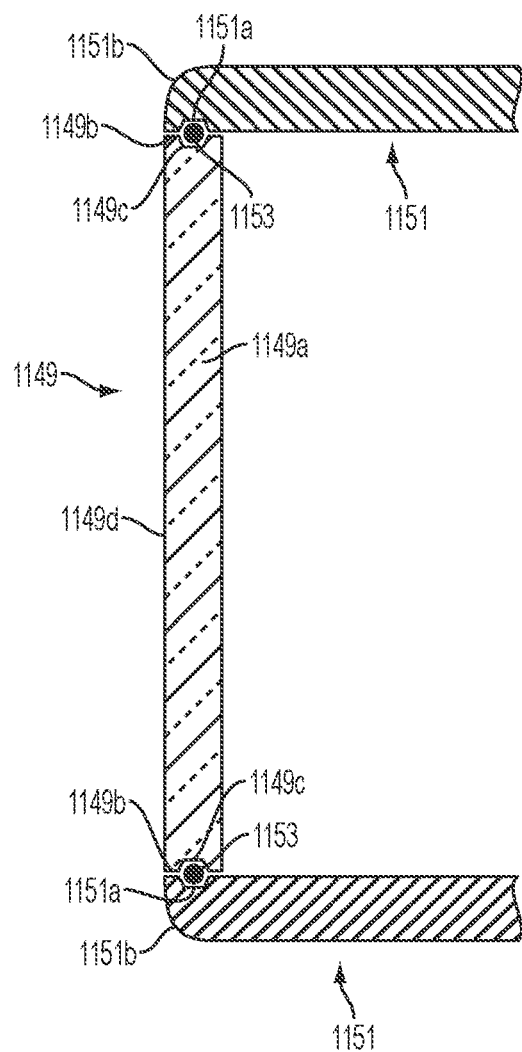

Optionally, and as exemplified in FIG. 20N, a mirror reflective element 1149 has a glass substrate 1149*a* that may be received at or in a mirror holder or housing or casing 1151, with a gasket or retaining element 1153 disposed along the perimeter edge 1149*b* of the substrate 1149*a* and received in a groove or notch or channel 1149*c* at the perimeter edge 1149*b* of the substrate 1149*a* and received in a groove or notch or channel 1151*a* of the mirror holder 1151. The glass substrate 1149*a* thus may be held or retained at the mirror holder 1151 via the gasket or retaining element 1153. The mirror holder 1151 includes a curved or beveled front perimeter 1151*b* that provides a smooth convex-curved transition between the outer surface of the mirror holder 1151 to the generally planar front surface 1149*d* of the mirror substrate 1149*a*. Such configurations may be suitable for use with either a prismatic reflective element or an electro-optic reflective element, such as an electrochromic reflective element, where the retaining element or gasket 1153 may be disposed along the perimeter of the front substrate and/or the rear substrate to retain the substrate or substrates and the reflective element relative to the mirror holder.

Figure 11:
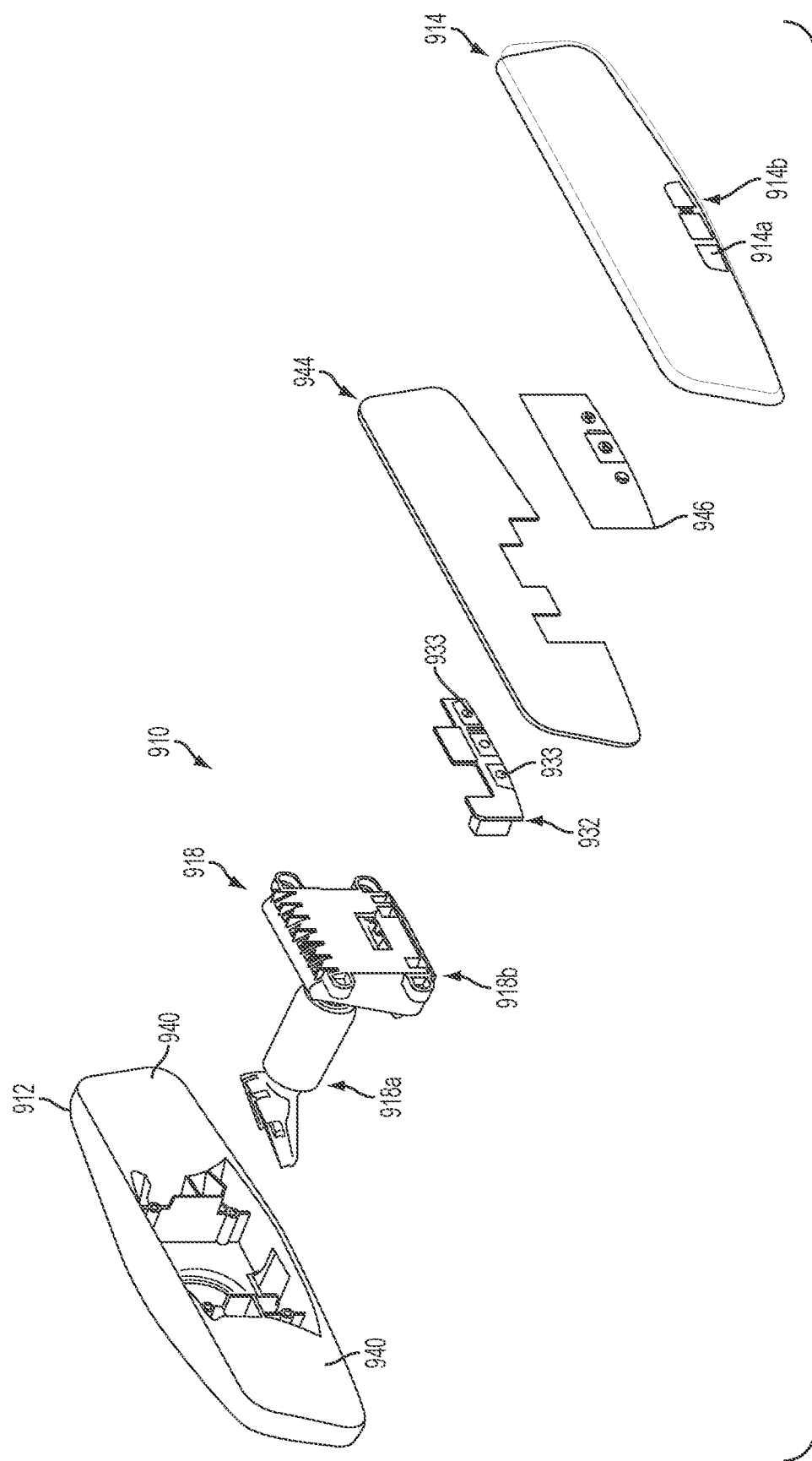
FIG. 11 is an exploded perspective view of another interior rearview mirror assembly of the present invention.

Optionally, and with reference to FIG. 11, an interior rearview mirror assembly 910 for a vehicle includes a casing 912, a reflective element 914 (such as a prismatic reflecting element comprising a prismatic or wedge-shaped substrate with a mirror reflector coating or layer disposed at its rear surface) positioned at a front portion of the casing 912. Mirror assembly 910 is adjustably mounted to an interior portion of a vehicle (such as to an interior surface of a vehicle windshield or a headliner of a vehicle or the like) via a mounting structure or mounting configuration or assembly 918 (such as a channel mount assembly 918a and a toggle assembly 918b, such as known in the art or such as a toggle device of the types described in U.S. Pat. Nos. 6,318,870 and/or 7,249,860, and/or U.S. patent application Ser. No. 12/558,892, filed Sep. 14, 2009 and published Apr. 8, 2010 as U.S. Pat. Pub. No. US-2010-0085653, which are hereby incorporated herein by reference in their entireties). The reflective element 914 attaches to the mounting surfaces or portions 940 of the mirror casing 912, such as via an adhesive or tape 944.

Mirror assembly 910 includes a circuit element 932 (such as a printed circuit board or the like) with one or more electrical user input devices 933, such as capacitive switches or inputs or the like, as discussed below. A button or input element or appliqué 946 is disposed behind the mirror reflective element 914 and between the mirror reflective element 914 and the circuit element 932 and user input devices 933. The mirror reflective element 914 may have apertures or windows 914a established at a display region 914b of reflective element, where the mirror reflector coating or layer is partially or wholly removed from the surface of the reflective element (such as the rear surface of a prismatic reflective element) so that a person viewing the front surface of the reflective element can view the applique disposed behind the reflective element.

The user input devices 933 comprise touch sensor devices, such as capacitive touch sensor devices or the like, disposed at the circuit element 932 and generally aligned with icons or the like representative of the function of the devices and established on the applique 946. Thus, when a user touches his or her finger to the front surface of the reflective element at a particular one of the icons (or approaches the front surface of the reflective element at or near a particular one of the icons), the respective sensor device 933 disposed at that icon detects the presence or touch of the finger and is actuated to actuate or control the particular function or operation associated with the icon and user input or sensor device.

Optionally, the touch sensor mirror 910 may use projected capacitive sensors (which may replace mechanical switches traditionally mounted in the "chin" of the mirror below the reflector). Such projected capacitive sensors work by sensing a change in capacitance when the user's finger comes in close proximity to the sensor. Capacitive sensors are known and typically comprise a capacitor having two conductors with a given surface area separated by an insulator of a given thickness. In a typical capacitor, these two conductors are parallel plates separated by an insulator forming a "sandwich". One lead of the capacitor is electrically connected to one plate and the other lead is connected to the other plate. When an electric current flows through the capacitor, a positive electrical charge accumulates on one plate and a corresponding negative charge accumulates on the other plate. The attraction between the positive and negative charges allows a certain amount of charge to be accumulated on the plates for a given applied voltage. If the layer of insulation between the plates is reduced in thickness, the attraction between the charges increases and allows more charge to accumulate for a given applied voltage. Likewise, if the plate surface area is increased, an additional amount of charge can be accumulated at a given applied voltage.

This ability for the capacitor to accumulate charge is defined as capacitance. In a simple capacitor, capacitance is proportional to the area of the plates and inversely proportional to the distance between the plates. Another factor that determines capacitance is the dielectric constant of the insulator between the plates. The dielectric constant is a measure of the tendency for an insulating material to electrically polarize in the presence of an electric field. A higher dielectric constant results in greater electric field intensity between the plates and therefore increases the ability for the capacitor to hold a charge.

For a given capacitance, the voltage across the capacitor is proportional to the amount of charge on the plates of the capacitor: $Q=C \cdot V$ (Equation 1), where Q is the charge in coulombs, V is the voltage in volts, and C is the capacitance in farads. The current through a capacitor is equal to the rate of change of the charge Q relative to time, i.e., the derivative of Q with respect to t: $I=dQ/dt$ (Equation 2), where I is the current in amperes (amps) or coulombs per second. Taking the derivative of both sides of Equation 1 relative to time results in the following relationship: $I=dQ/dt=C \cdot dV/dt$ (Equation 3). In other words, the current through a capacitor of a given capacitance is proportional to the rate of change of voltage across the capacitor.

Capacitance can be measured in several ways. One way is to place a given amount of charge on the capacitor and measure the resulting voltage across the capacitor. Another way is to charge the capacitor with a given current and measure the time it takes for the capacitor to reach a given voltage. Still another way is to increase the voltage across the capacitor at a given rate and measure the resulting current flow.

A capacitor is often wired in series with a resistor to form an RC network. When a voltage $V_0$ is applied across the network, a current will flow through the resistor and charge the capacitor. If the capacitor starts in a discharged state, the voltage across the capacitor will start at zero and increase according to the following equation: $V_t=V_0(1-e^{-t/RC})$ (Equation 4). When t=RC, the capacitor will have charged to about 63.2 percent of full charge. This time interval is known as the RC time constant and is often designated as $\tau$ (lower case tau). If the resistance R in the network is known, the capacitance can be calculated by measuring the time T that it takes for the capacitor to charge to 63.2 percent of the applied voltage. The capacitance can then be calculated as follows: $C=T/R$ (Equation 5), where R is the resistance of the resistor in ohms, T is the time in seconds and C is the capacitance in farads. The time required to charge to 63.2 percent of the applied voltage is therefore proportional to the capacitance.

The capacitive touch sensor consists of a plate made of metal or some other conductive material, covered with an insulating layer. This plate forms one half of a capacitor, with the other half being the nearest conductive object electrically connected to ground. Normally, the nearest such object is not very close to the plate and the resulting capacitance is relatively low. When the user brings his or her finger close to the sensor (such as by approaching or touching the front surface of the mirror reflective element at the sensor location), the capacitance increases due to the fact that the user's body is electrically conductive and the distance between the user's finger and the sensing plate is relatively small compared to the previous condition. The user's body is relatively large and can accumulate a significant charge and therefore is practically a "ground" in this case.

There are several ways for a touch sensor to measure capacitance. One way is to set up a relaxation oscillator, where the frequency of the oscillator is inversely proportional to the capacitance. The cycles of the oscillator are counted for a fixed time interval, and the resulting count is used as an indication of capacitance. Such an oscillator can be implemented using an inverter with a Schmitt trigger input. Such Schmitt triggers are known and provide hysteresis on the input, with the high trigger or threshold being higher than the low trigger or threshold. Thus, the voltage has to increase beyond a certain point before a change is made to the high state and then the voltage has to decrease to below another lower threshold before a change is made to the other state.

Another way to measure the capacitance is to use an RC network and measure the time constant. First, the capacitor is discharged, and then allowed to charge through the resistor. The time it takes for the capacitor to charge to a given voltage threshold is then measured.

Figure 12:
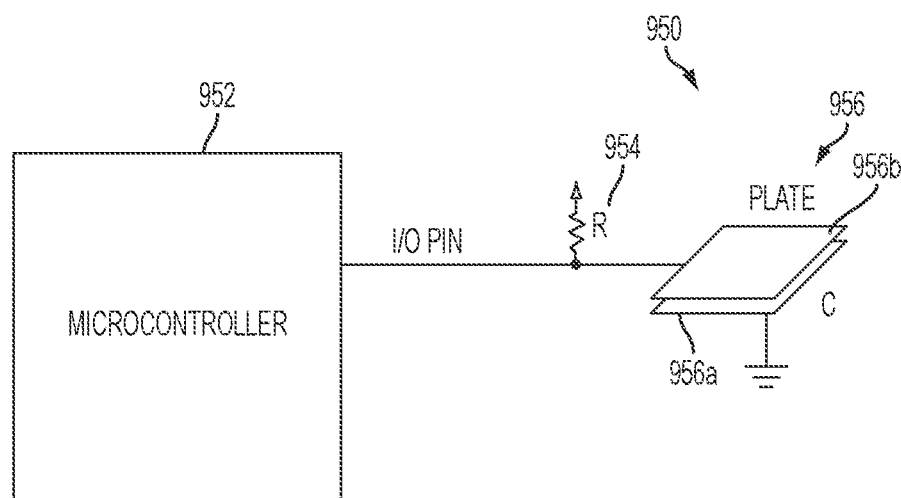
FIG. 12 is a schematic of a touch sensor system suitable for use in an interior rearview mirror assembly of the present invention.

Such a sensor 950 can be implemented with a common microcontroller 952 with a resistor 954 as an additional component (such as shown FIG. 12). In such an application, instead of using 63.2 percent of the applied voltage as a threshold, half of the supply voltage may be used instead. This is because on modern CMOS microcontrollers, the logic threshold is approximately half of the supply voltage. In either case, the time it takes the capacitor to charge to a particular threshold voltage is proportional to the capacitance, and therefore the capacitance can be reliably measured. The grounded plate 956*a* of the capacitor 956 in FIG. 12 represents the presence (or absence) of the user's finger over the sensing element or plate 956*b*.

Due to the introduction of electrical noise from the environment, the measure of capacitance may vary slightly from one reading to the next. Therefore, it is desirable to take the average of several readings of the capacitance to effectively filter out this noise. In the case of using an oscillator, this is typically done automatically due to the fact that several cycles are counted over a time interval. The resulting count is a reflection of the average frequency during the count interval. In the case of the latter approach, the process of measuring the time to charge the capacitor is repeated for several time intervals and the resulting time measurements are summed together. The two approaches may be similar, except in the former case the time interval is fixed and the number of cycles is variable, and in the second case the number of cycles is fixed and the time interval is variable.

Although an increase in capacitance occurs when the user places his or her finger at or on the touch sensor, the absolute value of that capacitance is not easily predictable. Furthermore, the change in capacitance that occurs when the sensor is touched may be relatively small compared to changes that may occur due to changes in humidity, temperature, product build variations, presence of nearby objects and/or the like. Therefore, it is desirable for the sensor to be able to detect small but abrupt or relatively rapid changes in capacitance while ignoring large changes that occur relatively slowly over a period of time.

To detect an abrupt change in capacitance, each reading is compared to an average of a relatively large number of previous readings (the detection average), composing a sort of "inertial reference". The detection average is not to be confused with the average used to filter out noise mentioned in the previous section. The noise filtering average is used as a low-pass filter to remove electrical noise and interference, and the detection average is used as a basis for a high-pass filter to eliminate or reduce the effects of slow changes in capacitance so such slow changes won't be confused as a touch. In the former case, the average is taken as the reading, while in the latter case (the detection average), the detection average is a quantity to which we are to compare that reading. Subsequently, when referring to a reading, the reference is typically to an averaged reading.

For example, a system may take the sum (or average) of 16 counts in order to filter out the noise to determine the value that the system will accept as an indication of the capacitance at a particular moment. This is the current reading. The system may then keep an average of the last 16 of those readings to determine the detection reference. This average (A) can be calculated as a running average as follows: $A_i=(A_{i-1}\cdot 15+R_i)/16$ (Equation 6), where $A_i$ is the average after the current interval, $A_{i-1}$ is the average after the previous interval, and $R_i$ is the current reading. In this example, R is weighted $1/16$ in the running average. This weighting can be adjusted to change how quickly the system responds to changing conditions. However, if the system responds too quickly, touch sensitivity will be reduced.

Even though an attempt has been made to filter out most of the noise in the capacitance readings, there may still be some noise present. However, the change in capacitance due to a touch should be higher than this remaining noise level. In order to detect a touch, the system may set a threshold that is below the change in value caused by a touch, but still above this remaining noise level. This threshold is a quantity that is added to the running average calculated above. While the detection reference average changes over time, the threshold quantity is usually fixed and determined by experimentation and testing. Although the overall capacitance reading may change substantially over time, the magnitude of the small change due to a touch will remain relatively consistent.

When the sensor is in operation, the capacitance readings are continually compared to the sum of the detection average and the threshold value. If the reading does not exceed this sum, the detection average is updated according to Equation 6 above. If the reading exceeds the sum of the detection average and the threshold value, a touch event is triggered.

In order to simulate continued pressing of a button, the detection average is not adjusted as long as a touch event is triggered. This causes the sensor output to remain in a triggered state as long as the user's finger is at or on or near to the sensor and may prevent the detection average from adjusting to the presence of the finger. This allows the system to incorporate "nested input states" on the input or button. Once the readings fall below the trigger level, updating of the detection average resumes.

In some cases, the remaining noise in the readings may cause a slight overlap between readings that may occur during a touch and those that may occur when the sensor is not touched. If this is the case, it may not be possible to set a reliable threshold to detect a touch, as too low a threshold would allow false triggering, and too high a threshold would result in vacillation between touched and untouched states while the user's finger is still present. To address this, the detection threshold may incorporate some hysteresis, where the threshold level used to detect a touch is higher than the threshold level used to detect when the touch ends or when the user releases and moves their finger from the sensor or sensor region.

Figure 13:
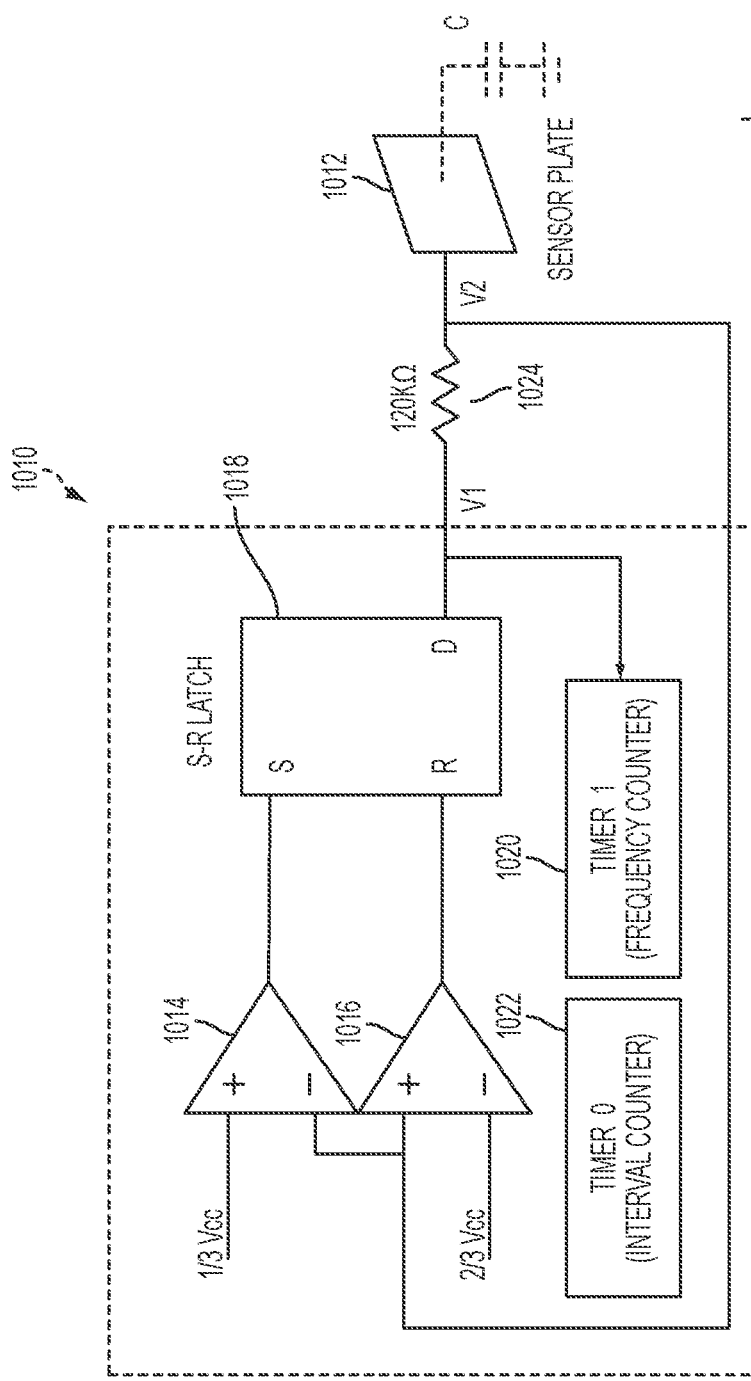
FIG. 13 is a schematic of a touch sensor system suitable for use in an interior rearview mirror assembly of the present invention.
Figure 14:
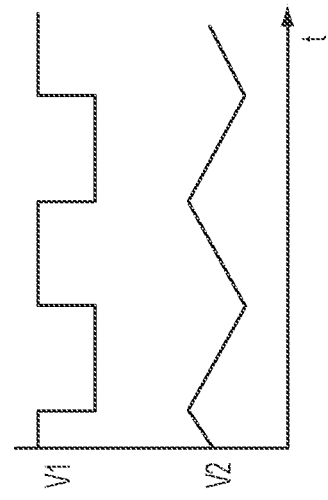
FIG. 14 is a graph of the voltages applied over time by the system of FIG. 13.
Figure 15:
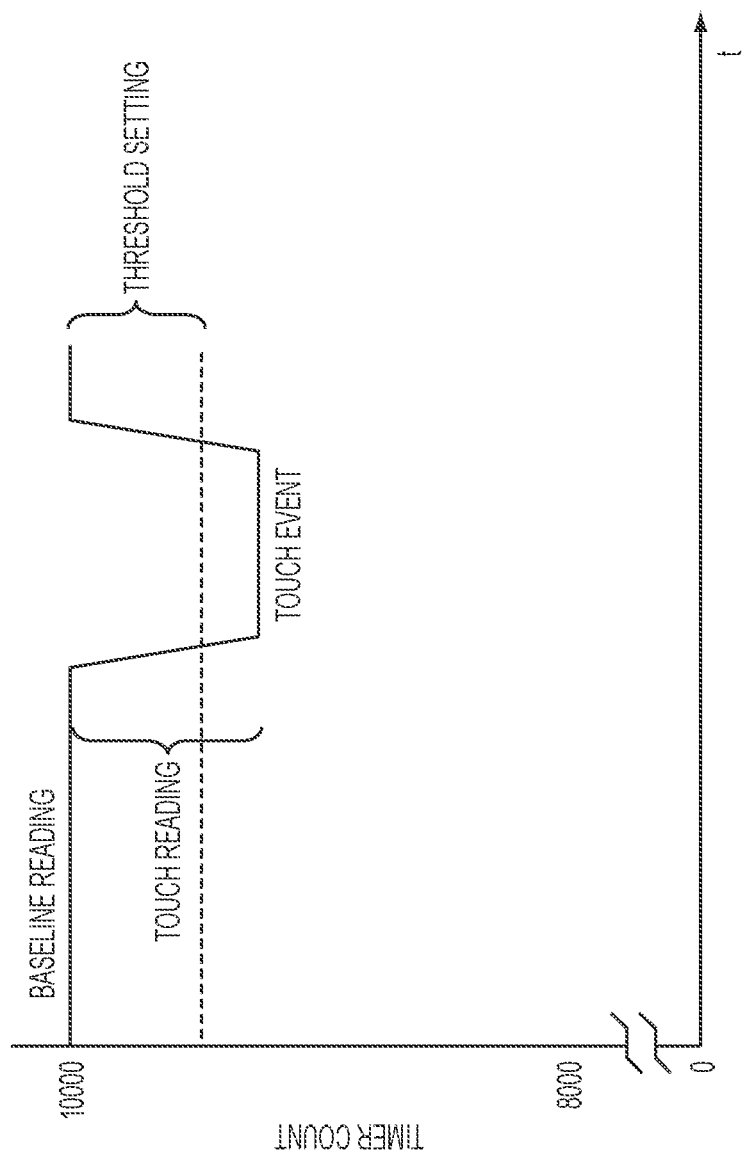
FIG. 15 is a graph of a timer count over time by the system of FIG. 13.
Figure 16:
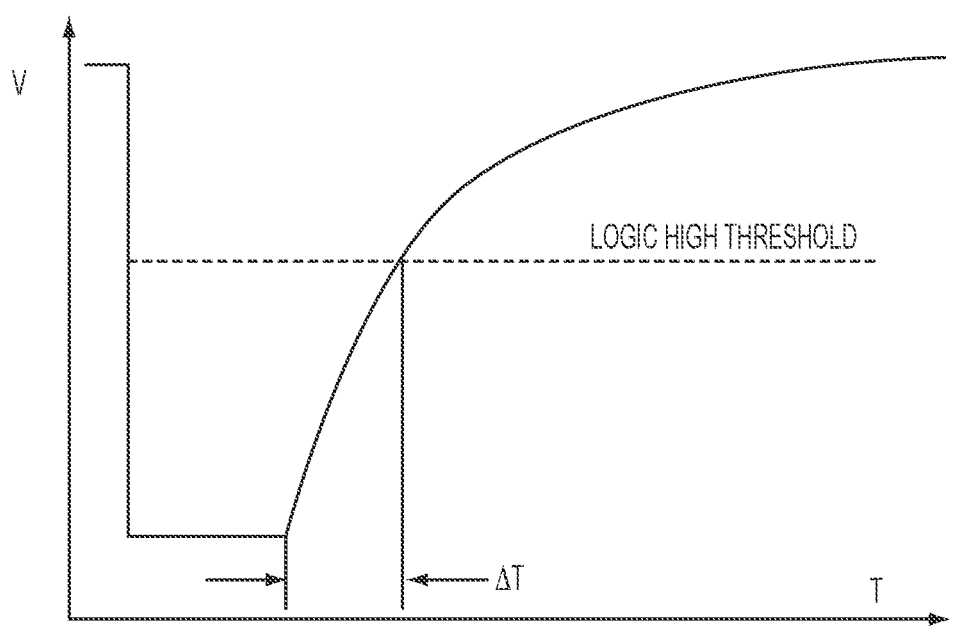
FIG. 16 is a graph of voltage over time for the touch sensor system of FIG. 13.

Referring now to FIGS. 13-17, a capacitive sensor system 1010 includes a capacitor sensor plate 1012, which may be disposed at or behind an input region of a reflective element of an interior rearview mirror assembly (where the other portion or "plate" of the capacitor would be a user's finger that approaches or contacts or touches the mirror reflective element at or near the input region in front of the capacitor sensor plate 1012). The capacitive sensor system 1010 includes a pair of comparators 1014, 1016 and a set/reset latch or switch 1018, and a frequency counter or timer 1020 and interval counter or timer 1022. As can be seen in FIG. 13, the comparators 1014, 1016 output to the set/reset latch 1018 and if the voltage V2 in is greater than about ⅔ Vcc, then the output goes to low on the D output of set/resent latch 1018, and if the voltage in is less than about ⅓ Vcc, then the output goes to high on the D output. When the voltage V1 (the output of the set/reset latch 1018) goes high, it charges the capacitor through the resistor 1024, and the voltage V2 continues to ramp up (with the rate of the ramp up of V2 being determined by the resistor (which is fixed) and the capacitance at the capacitor 1012 (which may be variable depending on if its touched or not). Thus, when a user touches the capacitor (or touches the mirror reflective element at or in front of the capacitor plate), the capacitance increases and the rate of ramping of the voltage V2 is reduced so the rate at which the voltage V2 increases is reduced. The voltage V2 feeds back to the comparators and the system, and when voltage V2 changes between ⅓ Vcc and ⅔ Vcc, the output D of the set/reset latch 1018 changes accordingly. The output D of the set/reset latch 1018 is fed into the frequency counter 1020, which counts or increments every time the voltage V1 pulses (every time V1 goes from low to high). The increments or count total of frequency counter 1020 are checked and determined at the end of each given time interval (as determined by the interval counter 1022, so that the system executes or determines whether or not there is a touch or presence at the sensors at regular intervals), and this counter is reset after each cycle. The step function and ramping function of the voltages V1 and V2 are shown in FIG. 14. When the increments of the frequency counter 1020 are determined at the end of the time interval to be below a threshold amount (or reduced from an average level by a threshold amount), such as can be seen with reference to FIG. 15, then the system determines that the capacitance has increased, such as due to a user touching the mirror reflective element at the user input region.

Figure 17:
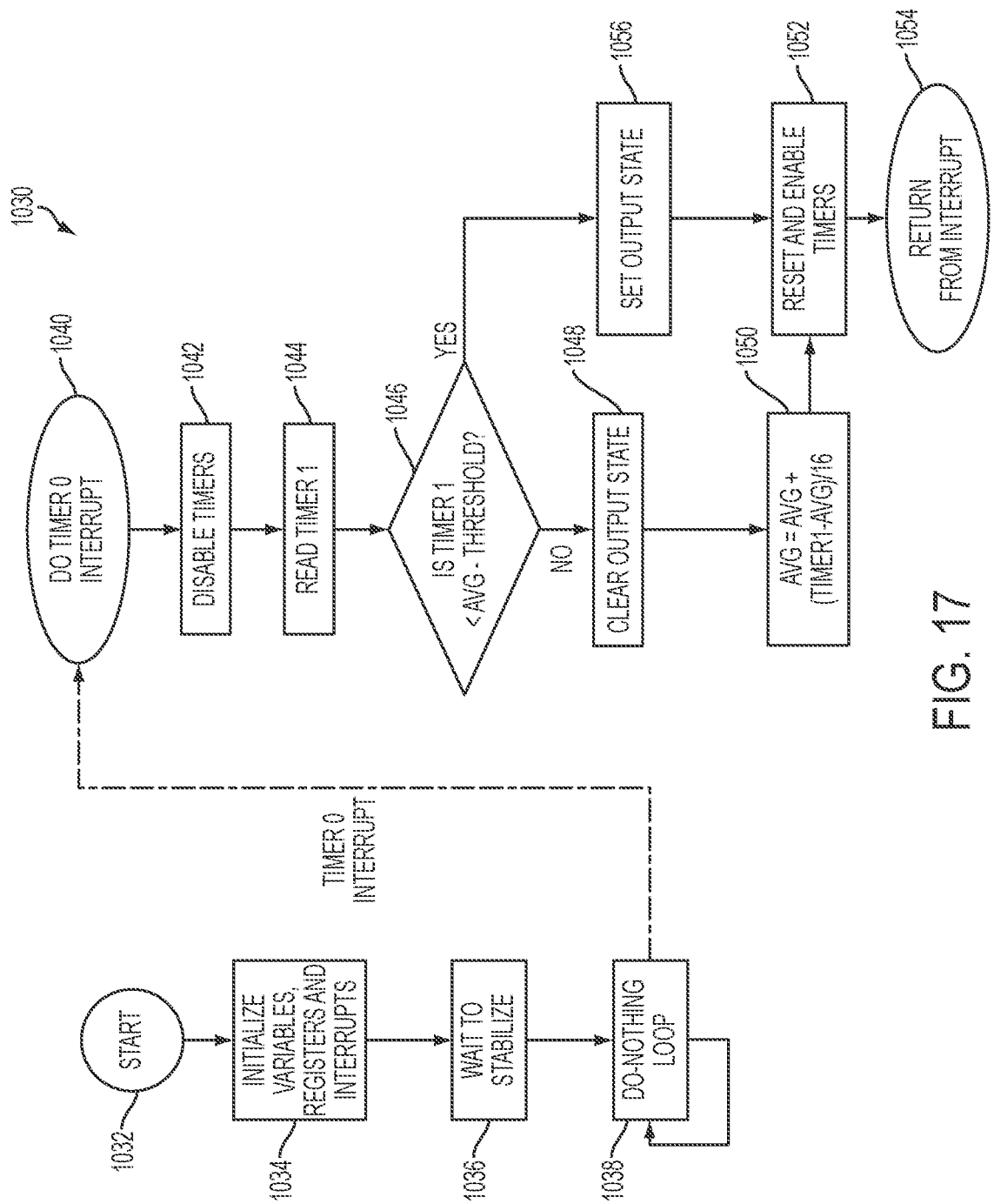
FIG. 17 is a flow chart of a control process of the user inputs of the interior rearview mirror assembly of FIG. 11.

As shown in FIG. 17, the process flow 1030 for the capacitive sensor system 1010 starts at 1032 and initializes variables, registers and interrupts at 1034 and waits to stabilize at 1036 (and during these steps the system may obtain or determine a baseline capacitance reading for the sensor). The system then enters a "do nothing loop" at 1038 and waits during the counting period (as counted by the interval counter or timer 1022) until the timer interval is completed. At the end of the counter or timer interval, the system runs an interrupt process at 1040 and disables the timers at 1042 to prevent the interval counter or timer from counting another time interval during the processing of the frequency counter readings. The system reads the frequency counter 1020 at 1044 and determines at 1046 whether or not the counter value is less than the value of the average value minus a given or predetermined threshold value. If the counter value is not less than the average minus threshold value, then the system clears the output state at 1048 and calculates at 1050 the average by adding the previous average plus the difference between the current counter value and the previous average divided by some given number (such as 16 in the illustrated embodiment). The system then resets and enables both counters or timers 1020 and 1022 at 1052 and returns from the interrupt (to the do-nothing loop) at 1054. If the counter value is less than the average minus threshold value, then the system determines that there was a touch at the sensor plate and sets the output state at 1056 accordingly (which generates a signal indicative of a touch at a particular button region or input region at the mirror reflective element). The system then resets and enables both counters or timers 1020 and 1022 at 1052 and returns from the interrupt (to the do-nothing loop) at 1054.

Optionally, and desirably, the mirror assembly may have graphics or icons for the user inputs or sensors disposed at or viewable at the mirror reflective element, such as at a lower region of the reflective element. For example, the graphics or icons may be established at an applique or element that is disposed behind the reflective element and viewable through the reflective element, such as viewable through a transflective mirror reflector or viewable through a window or aperture established at the mirror reflector by ablating or removing some or all of the mirror reflector coating at the user input region (or masking the user input region during deposition of the mirror reflector coating).

Optionally, for an electro-optic reflective element, such as an electrochromic reflective element, the graphics or icons may be disposed behind the rear or fourth surface of the rear substrate, and may be substantially hidden or non-viewable behind a transflective or Display-on-Demand (DoD) mirror reflector coating, so as to be visible when an illumination source or the like at the user input is powered (such as to backlight the graphic or icon). The capacitive switches or touch sensors may be located below the rear glass substrate (such as in a similar manner as shown in FIG. 5), since the capacitive switches may not operate behind or through the front and rear substrates and the electrochromic medium established therebetween, and the capacitive switches or touch sensors may be disposed behind the concealing perimeter band (such as a reflective band, such as a chrome band or the like, or such as a non-reflecting or light absorbing band or the like) that hides or conceals or renders covert the perimeter seal of the electro-optic reflective element or cell.

The perimeter band may be laser etched or ablated or otherwise removed or reduced at the user input region or regions to allow a user to view or discern or recognize the switch areas. Optionally, some of the laser etched area or areas at the perimeter band may be backlit so the user would recognize that the backlit area is the switch or user input area (the area that the user is to touch to actuate the desired feature), and the graphics above the backlit area is not the switch or user input area. Optionally, the backlighting may be direct backlighting, such as via an illumination source (such as a light emitting diode) disposed behind each area, and optionally with a diffuser in front of the illumination source to provide a generally uniform appearance of the backlit region. Optionally, the backlighting may comprise indirect backlighting, such as via a thin light guide film that would be side-lit with one or more illumination sources (such as one or more light emitting diodes or the like) that are disposed outside or remote from the switch area (such an indirect backlighting approach may facilitate backlighting of multiple switch areas with one or more common illumination sources, with the light piping or light guiding film or element directing the illumination emitted by the illumination source or sources toward the switch area or areas). Optionally, the switches and/or illumination sources may be disposed at the perimeter concealing layer or band and the etched area or areas of the perimeter concealing layer or band may be electrically connected to a circuit or a separate circuit like a flexible printed circuit (FPC) or standard printed circuit board (PCB) or the like, or the perimeter layer or band may comprise decoration and the switch itself may be on the circuit or FPC or PCB or the like.

Optionally, a coating, such as a transparent conductive layer or coating, such as an indium tin oxide (ITO) coating or the like), may be disposed at or on the front or first surface of the front substrate of the electro-optic reflective element or cell (such as with masked or laser-etched areas to singulate or electrically isolate one or more switch areas). Such electrically isolated switch areas at the first surface of the reflective element or cell may allow the active switch area to be in front of the graphics or icons that may be disposed at or in the dimming area of the variable reflectant electro-optic reflective element or cell. The transparent conductive layer or coating may wrap around or overcoat or overlay the bottom perimeter edge dimension of the front substrate and may be electrically connected to a circuit or circuit element or electrical connector, such as via a conductive epoxy or conductive adhesive or the like (such as by utilizing aspects of the mirror assemblies described in U.S. Pat. Nos. 7,274, 501; 7,255,451; 7,184,190 and/or 6,690,268, which are hereby incorporated by reference in their entireties.

Optionally, in order to limit or avoid accidental actuations of one or more of the capacitive sensors disposed at and behind the perimeter region of the mirror reflective element when the user is otherwise touching the front surface of the mirror reflective element, such as when wiping or washing the first or front surface of the reflective element or when adjusting the mirror to adjust the rearward field of view at the mirror, it is envisioned that the mirror assembly may include an additional capacitive switch that is disposed at or behind the rest of the reflective element, such as behind the entire or substantially the entire viewing area of the mirror reflective element (such as behind the entire or substantially the entire dimming area of an electro-optic mirror reflective element or cell). Thus, if the surface of the reflective element at the main viewing or dimming region is being contacted, further contact at or near the user input or touch sensor input regions (such as at the lower perimeter region and such as where the icons or graphics are disposed) may be ignored by the touch sensor system. Thus, the system would recognize and respond to a user's touch at one of the touch sensors when the system did not at the same time receive an indication that another region or regions of the mirror reflective element were also being touched by the user (since such multiple touching areas would be indicative of the user cleaning or wiping the reflective element surface or otherwise adjusting the mirror assembly and reflective element).

Optionally, when a touch or presence is detected at two or more buttons at the same time, but there is no detection of a touch or presence at the rest of the reflective element (such a double touch may be an erroneous double actuation of the inputs by the user when the user likely intended to actuate only one of two adjacent inputs or buttons), the system may implement a priority or hierarchy in determining which button or input to actuate in response to such a detection. For example, the system may process the detections and determine which input had a stronger reading or stronger detection of a touch and actuate or control the accessory according to that input or switch or button. Optionally, if the readings are generally or approximately the same strength or intensity or value (such as within a threshold tolerance or difference), the system may operate on a priority basis, and may actuate or control the accessory in accordance with a higher priority input over a lower priority input or the like.

Optionally, for touch sensitive inputs or applications or switches, the mirror assembly or user input or system may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated. For example, the system may include a haptic feedback to the touch sensor switches at and behind the mirror reflective element. Thus, when a user touches one of the user input regions to actuate the touch sensor or switch, the mirror may vibrate slightly to confirm to the user that the touch was detected and the switch was actuated. Such a haptic feedback feature may utilize aspects of U.S. patent application Ser. No. 12/091,525, filed Apr. 25, 2008 and published Jan. 15, 2009 as U.S. Pat. Pub. No. US-2009-0015736, which is hereby incorporated herein by reference in its entirety.

Thus, the present invention provides an interior rearview mirror assembly with a touch sensor element or switch disposed behind a glass substrate of the mirror reflective element of the mirror assembly. The capacitive "plate" or sensing element of the touch sensor may be established via electrical isolation of input regions of the transparent conductive coating established at a second or rear surface of a front substrate of an electro-optic mirror reflective element or via electrical isolation of one or more input regions of a mirror reflector coating or layer established at a rear surface of a prismatic glass substrate of a prismatic mirror reflective element. For example, and with reference to FIG. 18, the buttons or input regions 914a' of a mirror assembly 910' may be etched or otherwise established at the reflective element 914' (such as by etching or laser etching or ablating an isolation line 915' through the conductive coating of the glass substrate to electrically isolate the individual buttons or input regions 914a' from the rest of the conductive coating disposed at the rear surface of the mirror substrate at the viewing area or reflecting area of the mirror assembly. For the prismatic mirror reflective element application of FIG. 18, the input regions 914a' are established by electrically isolating portions of the reflector coating or layer disposed over the rear surface of the prismatic substrate, and thus provide reflection of light incident thereon so that the presence of the user inputs does not take away from the reflective area of the mirror reflective element. Optionally, one or more icons 914b' may be viewable at the input regions by removing or etching or ablating portions of the mirror reflector coating so that the applique may be viewable through the reflective element at those areas. Optionally, and as can be seen with reference to FIG. 19, the input regions 914a" of a mirror assembly 910" may have the reflector coating of the reflective element 914" removed thereat (such as by etching or ablating the mirror reflector or by masking during deposition of the mirror reflector) so that the applique 946" (and icons or indicia established thereat) is viewable through the reflective element at the input regions 914a". In such an application, the input regions 914a" may have only a portion of the mirror reflector removed thereat or may have a transparent electrically conductive layer or coating established thereat or the input regions may be established via electrically isolating portions of a conductive concealing layer established at a perimeter region of the rear surface of the reflective element so that an electrically conductive portion or layer or coating is disposed at the input regions to act as the capacitive sensing element or plate of the touch sensors or user inputs.

Optionally, the user inputs of the mirror assembly may comprise other types of switches or sensors for controlling or activating/deactivating one or more electrical accessories or devices of or associated with the mirror assembly. The mirror assembly may comprise any type of switches or sensors, such as touch or proximity sensing switches, such as touch or proximity switches of the types described above, or the inputs may comprise other types of switches or sensors, such as those described in U.S. Pat. No. 7,253,723 and/or U.S. patent application Ser. No. 12/414,190, filed Mar. 30, 2009 and published Oct. 1, 2009 as U.S. Pat. Pub. No. US-2009-0243824, which are hereby incorporated herein by reference in their entireties, or such as fabric-made position detectors, such as those described in U.S. Pat. Nos. 6,504,531; 6,501,465; 6,492,980; 6,452,479; 6,437,258 and 6,369,804, which are hereby incorporated herein by reference in their entireties. For example, the inputs may comprise a touch or proximity sensor of the types commercially available from TouchSensor Technologies, LLC of Wheaton, IL. The touch or proximity sensor may be operable to generate an electric field and to detect the presence of a conductive mass entering the field. When a voltage is applied to the sensor, the sensor generates the electric field, which emanates through any dielectric material, such as plastic or the like, at or near the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

As discussed above, the mirror assembly comprises an electro-optic or electrochromic mirror assembly and includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036 and/or 7,274,501, which are all hereby incorporated herein by reference in their entireties.

Optionally, it is envisioned that aspects of the present invention may be suitable for an interior rearview mirror assembly that comprises a prismatic mirror assembly or a non-electro-optic mirror assembly (such as a generally planar or optionally slightly curved mirror substrate) or an electro-optic or electrochromic mirror assembly. For example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (which are hereby incorporated herein by reference in their entireties), that can benefit from the present invention.

Optionally, the mirror assembly may include user interface inputs, such as buttons or switches or touch or proximity sensors or the like, with which a user may adjust or control one or more accessories, such as via the principles described in U.S. Pat. No. 7,360,932 and/or U.S. patent application Ser. No. 12/091,525, filed Apr. 25, 2008 and published Jan. 15, 2009 as U.S. Pat. Pub. No. US-2009-0015736; Ser. No. 11/239,980, filed Sep. 30, 2005 and published Jun. 15, 2006 as U.S. Pat. Pub. No. US-2006-0125919; and/or Ser. No. 12/576,550, filed Oct. 9, 2009 and published Apr. 15, 2010 as U.S. Pat. Pub. No. US-2010-0091394, which are hereby incorporated herein by reference in their entireties.

The interior rearview mirror assembly may include a casing, such as described above, or the mirror assembly may comprise or utilize aspects of other types of casings or the like, such as described in U.S. Pat. Nos. 7,338,177; 7,289,037; 7,249,860; 6,439,755; 4,826,289 and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, and/or in U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. patent application Ser. No. 10/538,724, filed Jun. 13, 2005 and published Mar. 9, 2006 as U.S. Pat. Pub. No. US-2006-0050018; and/or Ser. No. 12/091,525, filed Apr. 25, 2008 and published Jan. 15, 2009 as U.S. Pat. Pub. No. US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451; 7,289,037, which are hereby incorporated herein by reference in their entireties.

Optionally, the mirror assembly and/or prismatic or electrochromic reflective element may include one or more displays, such as for the accessories or circuitry described herein. The displays may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,338,177; 7,274,501; 7,195,381; 6,690,298; 5,668,663 and/or 5,724,187, and/or in U.S. patent application Ser. No. 11/226,628, filed Sep. 14, 2005 and published Mar. 23, 2006 as U.S. Pat. Pub. No. US-2006-0061008; and/or Ser. No. 12/091,525, filed Jul. 15, 2008 and published Jan. 15, 2009 as U.S. Pat. Pub. No. US-2009-0015736, which are all hereby incorporated herein by reference in their entireties. Optionally, the prismatic reflective element may comprise a display on demand or transflective prismatic element (such as described in U.S. Pat. Nos. 7,274,501 and/or 7,338,177, which are hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Such a video display screen device or module may comprise any type of video screen and is operable to display images in response to an input or signal from a control or imaging system. For example, the video display screen may comprise a multi-pixel liquid crystal module (LCM) or liquid crystal display (LCD), preferably a thin film transistor (TFT) multi-pixel liquid crystal display (such as discussed below), or the screen may comprise a multi-pixel organic electroluminescent display or a multi-pixel light emitting diode (LED), such as an organic light emitting diode (OLED) or inorganic light emitting diode display or the like, or a passive reflective and/or backlit pixelated display, or an electroluminescent (EL) display, or a vacuum fluorescent (VF) display or the like. For example, the video display screen may comprise a video screen of the types disclosed in U.S. Pat. Nos. 7,370,983; 7,338,177; 7,274,501; 7,255,451; 7,195,381; 7,184,190; 6,902,284; 6,690,268; 6,428,172; 6,420,975; 5,668,663; 5,724,187; 5,416,313; 5,285,060; 5,193,029 and/or 4,793,690, and/or U.S. patent application Ser. No. 10/538,724, filed Jun. 13, 2005 and published Mar. 9, 2006 as U.S. Pat. Pub. No. US-2006-0050018; Ser. No. 11/226,628, filed Sep. 14, 2005 and published Mar. 23, 2006 as U.S. Pat. Pub. No. US-2006-0061008; Ser. No. 12/091,525, filed Apr. 25, 2008 and published Jan. 15, 2009 as U.S. Pat. Pub. No. US-2009-0015736; Ser. No. 09/585,379, filed Jun. 1, 2000, now abandoned; and/or Ser. No. 10/207,291, filed Jul. 29, 2002, now abandoned, which are hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897 and 5,796,094, and/or U.S. patent application Ser. No. 10/534,632, filed May 11, 2005 and published Aug. 3, 2006 as U.S. Pat. Pub. No. US-2006-0171704, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, a rear camera, such as a rear backup video camera/imager or the like (such as a camera and system of the types described in U.S. Pat. Nos. 5,550,677; 5,670,935; 6,498,620; 6,222,447 and/or 5,949,331, which are hereby incorporated herein by reference in their entireties), may be disposed at the vehicle and may have a rearward field of view rearward of the vehicle for capturing images rearward of the vehicle such as for driver assistance during a reversing maneuver of the vehicle or the like. Because such a rear camera has a rearward field of view, the rearward facing camera may be operable to capture images of rearwardly approaching or following vehicles that are behind the vehicle equipped with the rearward facing camera when the vehicle so equipped is driving forwardly along the road or highway. It is envisioned that an image processor or controller (such as an EYEQ™ image processing chip available from Mobileye Vision Technologies Ltd. of Jerusalem, Israel, and such as an image processor of the types described in PCT Application No. PCT/US10/25545, filed Feb. 25, 2010 and published Sep. 2, 2010 as International Pub. No.

WO 2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing. Using principles of the systems described in U.S. Pat. No. 5,550,677, which is hereby incorporated herein by reference in its entirety, the system may operate to independently control any one or more of the interior rearview mirror assembly and the exterior rearview mirror assemblies of the equipped vehicle, such as based on the intensity and location of glare light detected by the camera and image processor. Such a rear reversing or backup camera and controller can also operate to detect the ambient light level present at the vehicle and may adjust the dimming of the mirror system accordingly, and/or may adjust other displays, lighting and/or accessories of the vehicle in accordance with and responsive to the ambient light detection by the rear backup camera (or by other cameras on the vehicle that view exterior to the vehicle). Such glare detection and ambient light detection and image processing of image data captured by a rear backup assist camera of the vehicle may obviate the need for a separate glare sensor elsewhere at the vehicle, such as at or in the interior rearview mirror assembly of the vehicle or the like. Such image processing and such a mirror control system may utilize aspects of the imaging systems described in U.S. Pat. Nos. 5,550,677; 5,670,935; 5,760,962; 6,201,642; 6,396,397; 6,498,620; 6,097,023; 5,877,897 and 5,796,094, which are hereby incorporated herein by reference in their entireties.

Optionally, the mirror assembly may include or may be associated with a compass sensor and circuitry for a compass system that detects and displays the vehicle directional heading to a driver of the vehicle. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two magneto-responsive sensor elements (such as a Hall sensor or multiple Hall sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an ASIC chip, such as utilizing principles described in U.S. Pat. Nos. 7,329,013 and/or 7,370,983, and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety. The ASIC chip may be small (preferably less than approximately a two square centimeter area, more preferably less than approximately a 1.5 square centimeter area, and most preferably less than approximately a one square centimeter area or thereabouts) and readily packagable into the mirror assembly (or a feed from such a compass-on-a-chip may be provided to the mirror assembly from a compass-on-a-chip packaged elsewhere in the vehicle cabin remote from the mirror assembly such as in an instrument panel portion or in roof console portion). Such large scale integration onto the likes of the silicon substrate/chip can allow a compass functionality to be provided by a relatively small chip, and with appropriate pin out or electrical leads provided as is common in the electrical art.

Optionally, a compass chip or compass module may be disposed at an upper end of the mounting base of a mirror assembly, such as at an upper or connecting end of a wire management element connected to or extending from the mounting base of the mirror assembly, such as by utilizing aspects of the mirror systems described in U.S. patent application Ser. No. 12/578,732, filed Oct. 14, 2009 and published Apr. 22, 2010 as U.S. Pat. Pub. No. US-2010-0097469, which is hereby incorporated herein by reference in its entirety. The wire management system may include a wire management element or channel or cover element, such as by utilizing aspects of the wire management systems or elements described in U.S. Pat. No. 7,510,287 and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties.

The compass chip may be in communication with a compass display, which may provide a display region at the reflective element, and which includes ports or portions, which may comprise icons, characters or letters or the like representative of only the cardinal directional points, such as, for example, the characters N, S, E, W, formed or etched in the reflective film coating of the reflective element (and forming a transparent window therein), such as via techniques such as disclosed in commonly assigned U.S. Pat. Nos. 4,882,565 and/or 7,004,593, which are hereby incorporated by reference herein in their entireties. Optionally, however, reflective element may comprise a transflective or display on demand (DOD) reflective element, and the compass display may be a display on demand (DOD) type of display, such as disclosed in commonly assigned U.S. Pat. Nos. 7,195,381; 6,690,268; 5,668,663 and 5,724,187, which are hereby incorporated by reference herein in their entireties, without affecting the scope of the present invention.

Optionally, the compass system and compass circuitry may utilize aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and/or 6,513,252, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion or mounting base of the mirror assembly so that the sensor/sensors is/are substantially fixedly positioned within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092;

5,802,727; 6,173,501; 6,427,349 and/or 6,513,252 (which are hereby incorporated herein by reference in their entireties), or a magneto-inductive sensor, such as described in U.S. Pat. No. 5,878,370 (which is hereby incorporated herein by reference in its entirety), or a magneto-impedance sensor, such as the types described in PCT Publication No. WO 2004/076971, published Sep. 10, 2004 (which is hereby incorporated herein by reference in its entirety), or a Hall-effect sensor, such as the types described in U.S. Pat. Nos. 6,278,271; 5,942,895 and/or 6,184,679 (which are hereby incorporated herein by reference in their entireties). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and/or 6,642,851, which are all hereby incorporated herein by reference in their entireties. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131,154; 5,255,442; 5,632,092 and/or 7,004,593, which are all hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. patent application Ser. No. 10/538,724, filed Jun. 13, 2005 and published Mar. 9, 2006 as U.S. Pat. Pub. No. US-2006-0050018, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. patent application Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. patent application Ser. No. 11/239,980, filed Sep. 30, 2005 and published Jun. 15, 2006 as U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577; 7,004,606 and/or 7,720,580, and/or U.S. patent application Ser. No. 10/534,632, filed May 11, 2005 and published Aug. 3, 2006 as U.S. Patent Publication No. US-2006-0171704; Ser. No. 12/091,359, filed Jun. 10, 2008 and published Oct. 1, 2009 as U.S. Pat. Pub. No. US-2009-0244361; and/or Ser. No. 12/377,054, filed Feb. 10, 2009 and published Aug. 26, 2010 as U.S. Pat. Pub. No. US-2010-0214791, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. patent application Ser. No. 10/534,632, filed May 11, 2005 and published Aug. 3, 2006 as U.S. Pat. Pub. No. US-2006-0171704; and/or Ser. No. 12/091,359, filed Oct. 27, 2006 and published Oct. 1, 2009 as U.S. Pat. Pub. No. US-2009-0244361, which are hereby incorporated herein by reference in their entireties.

Optionally, the accessory or accessories, such as those described above and/or below, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A vehicular frameless interior rearview mirror assembly, the vehicular frameless interior rearview mirror assembly comprising:

a mirror head and a mounting portion;

wherein the mounting portion comprises a mounting base configured to attach the vehicular frameless interior rearview mirror assembly to an attachment element that is adhered at an in-cabin side of a windshield of a vehicle equipped with the vehicular frameless interior rearview mirror assembly;

wherein the mirror head is pivotable relative to the mounting portion via at least one ball-and-socket pivot joint;

wherein the mirror head comprises a mirror reflective element and a mirror casing;

wherein, when the mirror head is moved relative to the mounting portion, the mirror reflective element and the mirror casing move in tandem with movement of the mirror casing;

wherein the mirror reflective element comprises a glass substrate having a planar front side and a planar rear side;

a circumferential perimeter glass edge circumscribing a periphery of the glass substrate, the circumferential perimeter glass edge spanning a thickness dimension of the glass substrate separating the planar front side from the planar rear side;

wherein no portion of the mirror casing overlaps the planar front side of the glass substrate;

wherein a portion of the mirror casing circumscribes the circumferential perimeter glass edge circumscribing the periphery of the glass substrate;

wherein the portion of the mirror casing that circumscribes the circumferential perimeter glass edge circumscribing the periphery of the glass substrate comprises a plastic molding;

wherein the plastic molding that circumscribes the periphery of the glass substrate without overlapping the planar front side of the glass substrate comprises an outermost part;

wherein the outermost part of the plastic molding has a radius of curvature of at least 2.5 mm;

wherein the outermost part of the plastic molding, with the mounting portion of the vehicular frameless interior rearview mirror assembly mounted at the in-cabin side of the windshield of the equipped vehicle, is contactable by a driver of the equipped vehicle;

wherein a camera is disposed within the mirror casing behind the mirror reflective element;

wherein, with the mounting portion of the vehicular frameless interior rearview mirror assembly mounted at the in-cabin side of the windshield of the equipped vehicle, the camera views the driver of the equipped vehicle through the mirror reflective element;

wherein, with the mounting portion of the vehicular frameless interior rearview mirror assembly mounted at the in-cabin side of the windshield of the equipped vehicle and when the mirror head is moved by the driver of the equipped vehicle to adjust the rearward view provided by the mirror reflective element to the driver, the camera moves in tandem with movement of the mirror head; and wherein the camera is part of a driver monitoring system of the equipped vehicle.

2. The vehicular frameless interior rearview mirror assembly of claim 1, wherein the plane of the planar front side of the glass substrate is generally flush with the outermost part of the plastic molding of the portion of the mirror casing that circumscribes the circumferential perimeter glass edge circumscribing the periphery of the glass substrate.

3. The vehicular frameless interior rearview mirror assembly of claim 1, wherein, with the plastic molding of the mirror casing circumscribing the circumferential perimeter glass edge of the glass substrate, the outermost part of the plastic molding provides a curved transition between the planar front side of the mirror reflective element and another part of the mirror casing.

4. The vehicular frameless interior rearview mirror assembly of claim 3, wherein the outermost part of the plastic molding providing the curved transition between the planar front side of the mirror reflective element and the other part of the mirror casing comprises an outer curved surface.

5. The vehicular frameless interior rearview mirror assembly of claim 4, wherein the outer curved surface of the outermost part of the plastic molding provides a curved transition between the planar front side of the glass substrate and a less-curved part of the plastic molding.

6. The vehicular frameless interior rearview mirror assembly of claim 5, wherein the less-curved part of the plastic molding is contiguous with the outer curved surface of the outermost part of the plastic molding.

7. The vehicular frameless interior rearview mirror assembly of claim 1, wherein the mirror casing contacts the circumferential perimeter glass edge of the glass substrate.

8. The vehicular frameless interior rearview mirror assembly of claim 1, wherein the mirror reflective element nests in the mirror casing.

9. The vehicular frameless interior rearview mirror assembly of claim 8, wherein the mirror casing contacts the circumferential perimeter glass edge of the glass substrate.

10. The vehicular frameless interior rearview mirror assembly of claim 8, wherein the at least one ball-and-socket pivot joint comprises two ball-and-socket pivot joints.

11. The vehicular frameless interior rearview mirror assembly of claim 8, wherein the attachment element that is adhered at the in-cabin side of the windshield of the equipped vehicle comprises a mirror mounting button.

12. The vehicular frameless interior rearview mirror assembly of claim 8, wherein the mounting base attaches to the attachment element at the windshield of the equipped vehicle via a breakaway joint.

13. The vehicular frameless interior rearview mirror assembly of claim 1, wherein the camera is part of an internal cabin surveillance system of the equipped vehicle.

14. The vehicular frameless interior rearview mirror assembly of claim 1, wherein the driver monitoring system detects driver drowsiness.

15. The vehicular frameless interior rearview mirror assembly of claim 1, wherein video images are captured by the camera for a video telephone function of the equipped vehicle.

16. The vehicular frameless interior rearview mirror assembly of claim 1, wherein the vehicular frameless interior rearview mirror assembly comprises an image processor operable to process image data captured by the camera, and wherein, responsive to processing by the image processor of captured image data, at least one object present in an internal cabin of the equipped vehicle that is viewed by the camera is detected.

17. The vehicular frameless interior rearview mirror assembly of claim 16, wherein the image processor comprises an image processing chip.

18. The vehicular frameless interior rearview mirror assembly of claim 1, wherein the vehicular frameless interior rearview mirror assembly comprises a vehicular frameless interior prismatic rearview mirror assembly, and wherein the mirror reflective element of the vehicular frameless interior prismatic rearview mirror assembly comprises a prismatic mirror reflective element, and wherein the plane of the planar front side of the glass substrate is at an acute angle relative to the plane of the planar rear side of the glass substrate, and wherein the planar rear side of the glass substrate comprises a mirror reflector.

19. The vehicular frameless interior rearview mirror assembly of claim 18, wherein the mirror casing comprises an attachment surface, and wherein the prismatic mirror reflective element is attached at the attachment surface of the mirror casing to secure the prismatic mirror reflective element to the mirror casing.

20. The vehicular frameless interior rearview mirror assembly of claim 1, wherein the vehicular frameless interior rearview mirror assembly comprises a vehicular frameless interior electrochromic rearview mirror assembly, and wherein the glass substrate comprises a front glass substrate of the mirror reflective element, and wherein the mirror reflective element of the vehicular frameless interior electrochromic rearview mirror assembly comprises a rear glass substrate, and wherein the rear glass substrate of the mirror reflective element comprises a glass substrate having a planar front side and a planar rear side, and wherein the planar front side of the rear glass substrate of the mirror reflective element comprises a mirror reflector, and wherein an electrochromic medium is disposed in an interpane cavity between the planar rear side of the front glass substrate and the planar front side of the rear glass substrate, and wherein the electrochromic medium disposed in the interpane cavity contacts the mirror reflector of the planar front side of the rear glass substrate.

21. The vehicular frameless interior rearview mirror assembly of claim 20, wherein the rear glass substrate of the mirror reflective element is received within an open end of the mirror casing.

22. The vehicular frameless interior rearview mirror assembly of claim 1, wherein the mirror reflective element comprises a user input portion, the user input portion operable to detect presence of a human finger at the planar front side of the glass substrate, the user input portion comprising at least one capacitive touch sensor disposed at and behind the planar rear side of the glass substrate.

* * * * *